US007746378B2

(12) United States Patent

Shu et al.

(10) Patent No.: US 7,746,378 B2

(45) Date of Patent: Jun. 29, 2010

(54) VIDEO ANALYSIS, ARCHIVING AND ALERTING METHODS AND APPARATUS FOR A DISTRIBUTED, MODULAR AND EXTENSIBLE VIDEO SURVEILLANCE SYSTEM

(75) Inventors: Chiao-Fe Shu, Yorktown Heights, NY (US); Arun Hampapur, Norwalk, CT (US); Max Lu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1628 days.

(21) Appl. No.: 10/967,048

(22) Filed: Oct. 14, 2004

(65) Prior Publication Data

US 2006/0078047 A1 Apr. 13, 2006

Related U.S. Application Data

(60) Provisional application No. 60/618,095, filed on Oct. 12, 2004, provisional application No. 60/618,342, filed on Oct. 12, 2004.

(51) Int. Cl.
*H04N 7/18* (2006.01)

(52) U.S. Cl. ....................... 348/143; 348/153; 348/159; 348/158; 348/152; 348/154; 725/105; 725/118; 725/112; 725/108; 375/240; 375/240.01; 375/240.24

(58) Field of Classification Search ................. 348/143, 348/153, 159, 158, 152, 154; 375/240, 240.01, 375/240.24; 725/105, 118, 112, 108
See application file for complete search history.

(56) References Cited

U.S. PATENT DOCUMENTS 6,271,752 B1 * 8/2001 Vaios ......................... 340/541
2005/0132414 A1 * 6/2005 Bentley et al. .............. 725/105
2006/0072013 A1 * 4/2006 Renkis ....................... 348/156

OTHER PUBLICATIONS

"A Distributed Surveillance System for Improving Security in Public Transport Networks", Velastin et al., Measurement and Control, Special Issue on Remote Surveillance, vol. 35, No. 8, Sep. 2002, pp. 209-213.

* cited by examiner

*Primary Examiner*—Shawn An
(74) *Attorney, Agent, or Firm*—Harrington & Smith

(57) ABSTRACT

Systems and methods are disclosed for analyzing, managing and cataloguing video tracks generated by a video surveillance system. Systems and methods operating in accordance with the present invention receive video tracks from a video surveillance system; analyze them for particular categories of, for example, objects or events, assign unique identifying tags to the video tracks; and save them in highly-cross-referenced databases so that video tracks containing, for example, particular objects or events can be easily searched for and recalled. In addition, the present invention provides browsing facilities for viewing events that have just elapsed, events that are occurring in near real-time.

95 Claims, 52 Drawing Sheets

| FIG.9A |
| --- |
| FIG.9B |

```
-<FrameTime>
    <Timestamp Type= "text">2004-04-19-15.01.30.000000</Timestamp>
    <FrameNumber Type= "int">1 </FrameNumber>
  </FrameTime>
 </Keyframe>
</Keyframes>
-<VideoProxy>
  <Path Type= "text">1\2004\04\19\videos\Fri_Apr_16_2004_15_17_47_EST.wmv</Path>
 -<Start>
   <Timestamp Type= "text">2004-04-19-15.00.00.000000</Timestamp>
   <FrameNumber Type= "int">1 </FrameNumber>
  </Start>
 -<End>
   <Timestamp Type= "text">2004-04-19-15.02.00.000000</Timestamp>
   <FrameNumber Type= "int">0 </FrameNumber>
  </End>
 </VideoProxy>
+<AreaStatistics>
+<VelocityStatistics>
+<AnalysisInfo>
+<InitialBGImage>
 </Tracks Summary>
</Tracks>
```

My Computer

FIG.9B

```
    </FGModel>
   -<FGMask>
     <Path Type="text">1\2004\04\19\models\Track_5235_610_msk_mask.pbm </Path>
    </FGMask>
  </TrackDataFragment>
 -<TrackDataFragment>
   <ViewID Type="int">1 </ViewID>
   <TrackID Type="int">5000 </TrackID>
  -<TrackDataTime>
     <Timestamp Type="text">2004-04-19-15.00.02.000000 </Timestamp>
     <FrameNumber Type="int">1 </FrameNumber>
   </TrackDataTime>
  +<Centroid>
   <Area Type="float">356.0 </Area>
   -<BBox>
      <LTX Type="int">301</LTX>
      <LTY Type="int">59 </LTY>
      <RBX Type="int">315</RBX>
      <RBY Type="int">15 </RBY>
    </BBox>
    <Missing Type="int">0 </Missing>
    <OcclusionFraction Type="float">0.000000 </OcclusionFraction>
```

RETRIEVE TRACK SUMMARY — 890
INFORMATION (TRACK ID)

RETRIEVE TRACK SUMMARY FILE — 892
INFORMATION (TRACK ID)

GET TRACK DATA INFORMATION — 894
(TRACK ID)

GET TRACK DATA FILE — 896
INFORMATION (TRACK ID)

GET KEYFRAME INFORMATION — 898
(TRACK ID)

GET VIDEO INFORMATION — 900
(TRACK ID)

RETRIEVE XML TEMPLATE — 952

RETRIEVE HTML TEMPLATE — 954

RETRIEVE TABLE FORMAT — 956

RETRIEVE REPORT FORMAT — 958

RETRIEVE HTML TEMPLATE FOR VIDEO PRESENTATION — 960

RETRIEVE HTML TEMPLATE FOR KEYFRAME PRESENTATION — 962

LAUNCH VIDEO PLAYER — 964

1210
- GetTrackSummaryPropertyList()

1212
- GetTrackDataPropertyList()

1214
- GetSpatialPropertyList()

1216
- GetTemporalPropertyList()

1218
- GetTemporalSummary(Constraint, StartTime, EndTime, Resolution, Region)

1220
- GetSpatialSummary(Constraint, StartTime, EndTime, Region, Resolution)

1222
- GetPropertySummary(Constraint, Property, StartTime, EndTime, Region, Resolution)

FIG.39

HOURLY "PEOPLE" ACTIVITY SUMMARY

1232

| FIG.41a | FIG.41b | FIG.41c |
|---|---|---|

FIG.41

HOURLY "CAR" ACTIVITY SUMMARY

1240

```
GetTemporalSummary ("IdentityClassID = 'CAR' AND
                    START>? AND START<?",
                    "2004-07-07 00:00:00",
                    "2004-07-08 00:00:00",
                    3600)
```

| FIG.42a | FIG.42b | FIG.42c |
|---|---|---|

FIG.42

DAILY OBJECT ACTIVITY SUMMARY

1250

```
GetTemporalSummary ("IdentityClassID='PEOPLE' AND
                    start>? AND start<?",
                    "2004-07-07 00:00:00",
                    "2004-07-23 00:00:00".
                    86400
```

1260

```
GetTemporalSummary ("IdentityClassID='CAR' AND
                    start>? AND start<?",
                    "2004-07-07 00:00:00",
                    "2004-07-23 00:00:00".
                    86400
```

VIDEO ANALYSIS, ARCHIVING AND ALERTING METHODS AND APPARATUS FOR A DISTRIBUTED, MODULAR AND EXTENSIBLE VIDEO SURVEILLANCE SYSTEM

CROSS REFERENCE TO RELATED APPLICATIONS

This application hereby claims priority from provisional U.S. Patent Application Ser. Nos. 60/618,095 and 60/618,342 filed on Oct. 12, 2004 and assigned to the same assignee as the present application. These provisional applications are hereby incorporated by reference in their entirety as if fully restated herein. This application is also related to U.S. patent application Ser. No. 10/966,630 filed on even date and assigned to the same assignee as the present application. U.S. patent application Ser. No. 10/966,630 is also incorporated by reference in its entirety as if fully restated herein.

TECHNICAL FIELD

The present invention generally concerns video surveillance systems and more particularly concerns methods and systems for analyzing, managing and cataloguing of video, tracks. The present invention also more particularly concerns systems and methods for organizing video tracks and associated event and statistical information in well-indexed databases whereby video tracks containing certain types of, for example, objects; events; and activities, are easily managed and accessed through web services and browsers.

BACKGROUND

In the present environment of heightened concern over criminal and terrorist activities, those skilled in the art have recognized the need for a more widespread application of video surveillance systems. This recognition has resulted in the desire for a more flexible suite of physical video surveillance assets (for example, highly programmable video cameras having the innate ability to handle a multitude of surveillance situations) and firmware for integrating and managing a distributed system of video surveillance assets. U.S. Patent Application Ser. No. 60/618,342, assigned to the same assignee as the present invention, discloses such methods and systems and is hereby incorporated by reference in its entirety as if fully restated herein.

The desire for flexibility also extends to the establishment and management of video surveillance activities. Current systems for establishing and managing video surveillance activities lack flexibility and therefore are difficult to modify to respond to evolving threat environments. In particular, current systems for establishing and managing video surveillance activities were often constructed to respond to a relatively limited number of threats and to perform little or no video analysis. In order to take advantage of the flexibility and programmability of video surveillance cameras and video analysis engines, new video surveillance system architectures are required.

Those skilled in the art desire video surveillance system architectures that adopt a modular approach to video analysis applications and operations. For example, those skilled in the art desire a software and middleware framework that accommodates the rapid addition of video analysis applications to a suite of pre-existing video analysis applications. Such a framework would make it far easier to tailor video surveillance system assets to evolving threat environments.

In addition, state-of-the-art video surveillance systems, particularly those with large numbers of a video surveillance cameras and video analysis engines, create a great deal of video and data. Obviously, it would be prohibitively expensive and impractical to employ a human user to monitor the output each video camera of such a highly integrated and distributed video surveillance system. In addition, it would thwart one of the objectives of such systems, that is, to give a cadre of surveillance system analysts a holistic view of a particular surveillance environment through highly distributed video analysis operations. Instead, the surveillance system analysts would develop only a tunnel vision view of a particular surveillance environment.

Another problem results simply from the number of video cameras that comprise such a distributed and large video surveillance system. Since it would be prohibitively expensive to employ security personnel to monitor each video camera, there must be a system for recording, analyzing and cataloguing the output of the video surveillance system, and for alerting surveillance system analysts in dependence on evolving threats revealed by analysis. Otherwise, the data created by such a system would simply go to waste as so much un-reviewed data.

An additional problem arises from the fact that security system analysts in next generation video surveillance systems will not be continuously monitoring a relatively limited number of video feeds giving them the ability to develop a contextual understanding of fields of view as events evolve in the field of view. Rather, due to the large number of available views, it is simply impossible to monitor all of them. As a result, some way must be devised to analyze, manage, catalogue and present video tracks so that the situational awareness of surveillance system analysts is substantially improved over current video surveillance systems.

Thus, those skilled in the art desire a modular, extensible and distributed video surveillance system architecture that easily accommodates the addition and management of video analysis applications. Those skilled in the art also desire a system for analyzing, managing, cataloguing and presenting video tracks. In particular, those skilled in the art desire a system for assigning meaningful track identifying tags to simplify and ease the cataloguing of such tracks. In addition, those skilled in the art desire a suite of video analysis applications capable of generating a wide degree of track information from key frames suitable for improving the situational awareness of surveillance analysts, to statistical information summarizing monitored object activities and events.

SUMMARY OF THE PREFERRED EMBODIMENTS

The foregoing and other problems are overcome, and other advantages are realized, in accordance with the presently preferred embodiments of these teachings. The present invention comprises methods and apparatus for performing and managing video surveillance activities.

In particular, a first alternate embodiment of the present invention comprises a video surveillance system comprising: at least one video surveillance system module comprising: a video surveillance camera, wherein the video surveillance camera is remotely programmable; a video encoder to encode video gathered by the video surveillance camera; and a video analysis engine coupled to the video surveillance camera to analyze video gathered by the video surveillance camera and to create data derived from the video; at least one video surveillance system network coupled to the at least one video surveillance system module; at least one database and application system coupled to the at least one video surveillance system network to store video gathered by the video surveillance camera and data created by the video analysis engine, and to receive and process queries for the video and data; a video surveillance system control interface coupled to the at least one video surveillance system network to control the operations of the video surveillance system; and a video surveillance application and control interface coupled to the at least one video surveillance system network for controlling video surveillance activities, the video surveillance application and control interface comprising: a program for controlling video surveillance activities; a display for displaying video gathered by the video surveillance camera and data created by the video analysis engine; and at least one input device for creating queries of the database and application system.

A second alternate embodiment of the present invention comprises: a signal-bearing medium tangibly embodying a program of machine-readable instructions executable by a digital processing apparatus of a computer system to perform operations comprising management of video surveillance activities using an electronic video surveillance system, the operations comprising: applying a video analysis application tool to video gathered by a video surveillance camera in real time, wherein the video analysis application tool comprises at least one user-specified video analysis criterion, and where application of the video analysis application tool to the video generates a data stream related to the at least one user-specified video analysis criterion; transmitting the data stream to an electronic database and application system; storing information comprising the data stream in the electronic database and application system; selecting at least a portion of the information comprising the data stream for forwarding to a video surveillance analyst performing video surveillance activities, wherein the selection is made based on at least one user-specified information forwarding criterion; and forwarding the selected information to the video surveillance analyst for display on an interface device of the electronic video surveillance system.

Thus it is seen that embodiments of the present invention overcome the limitations of the prior art. In particular, the methods and apparatus of the present invention provide a highly flexible middleware architecture for adding new video analysis applications in order to accommodate the availability of new technology or to respond to new threat environments.

In addition, methods and apparatus of the present invention achieve continuous situational awareness through around-the-clock automated object and event detection; object tracking and object classification. In prior video surveillance systems, the systems often depended on the constant vigilance of a video surveillance analyst, a situation fraught with danger due to the inherent limitations of human beings, for example the inability to remain at a high degree of attentiveness. In contrast to the prior art, in the present invention computer-controlled automated systems perform most of the object and event detection, object tracking and object classification, meaning that the lack of attentiveness of a video surveillance analyst will be much less of an issue.

Continuing, the methods and apparatus of the present invention heighten the situational awareness of video surveillance analysts by performing video surveillance in a more structured manner. In the prior art, video surveillance often consisted of setting up a bank of video cameras and associated video displays and monitoring them. Such a low-level approach did not take into consideration likely threats; instead the video monitors are simply observed for "anything which might happen". In contrast, the methods and apparatus of the present invention institute highly regimented video surveillance procedures and activities which take into consideration likely threats and desired responses. For example, video analytics are selected based on the threat environment. In addition, alarm events are pre-instituted, meaning that the potential negative effect of human judgment is reduced.

Further, the methods and apparatus of the present invention apply video analytics continuously, and sometimes supply the results in real time, thereby providing the video surveillance analyst with a wealth of focused information that simply was not available in prior-art systems. The systematic way in which video analytics is performed and the resulting data saved means that information is available both for real-time alarm situations and near- and far-term investigative situations. This is particularly important as video surveillance analysts simply cannot observe patterns which only become visible over many months or years.

In addition, the continuous recording and cataloguing of objects and events means that a video surveillance analyst always has available just-occurred-event information. Often the most important information for deciding how to respond to a threat situation is event information that is only minutes or tens of minutes old. In prior art situations where the information simply was not recorded or, if recorded, was not immediately or easily accessible (for example, video tape) the ability to make decisions based on an almost immediate review of just-occurred-event information was either very difficult or impossible. In the present invention, just-occurred-event information is saved continuously and is immediately available in response to simple queries to assist a decision maker in deciding how to respond to a threat situation.

In summary, the foregoing alternate embodiments of the present invention are exemplary and non-limiting. For example, one of ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 39 depicts additional operations available in the summary management service of the present invention;

DETAILED DESCRIPTION OF THE PREFERRED EMBODIMENTS

Figure 1A:
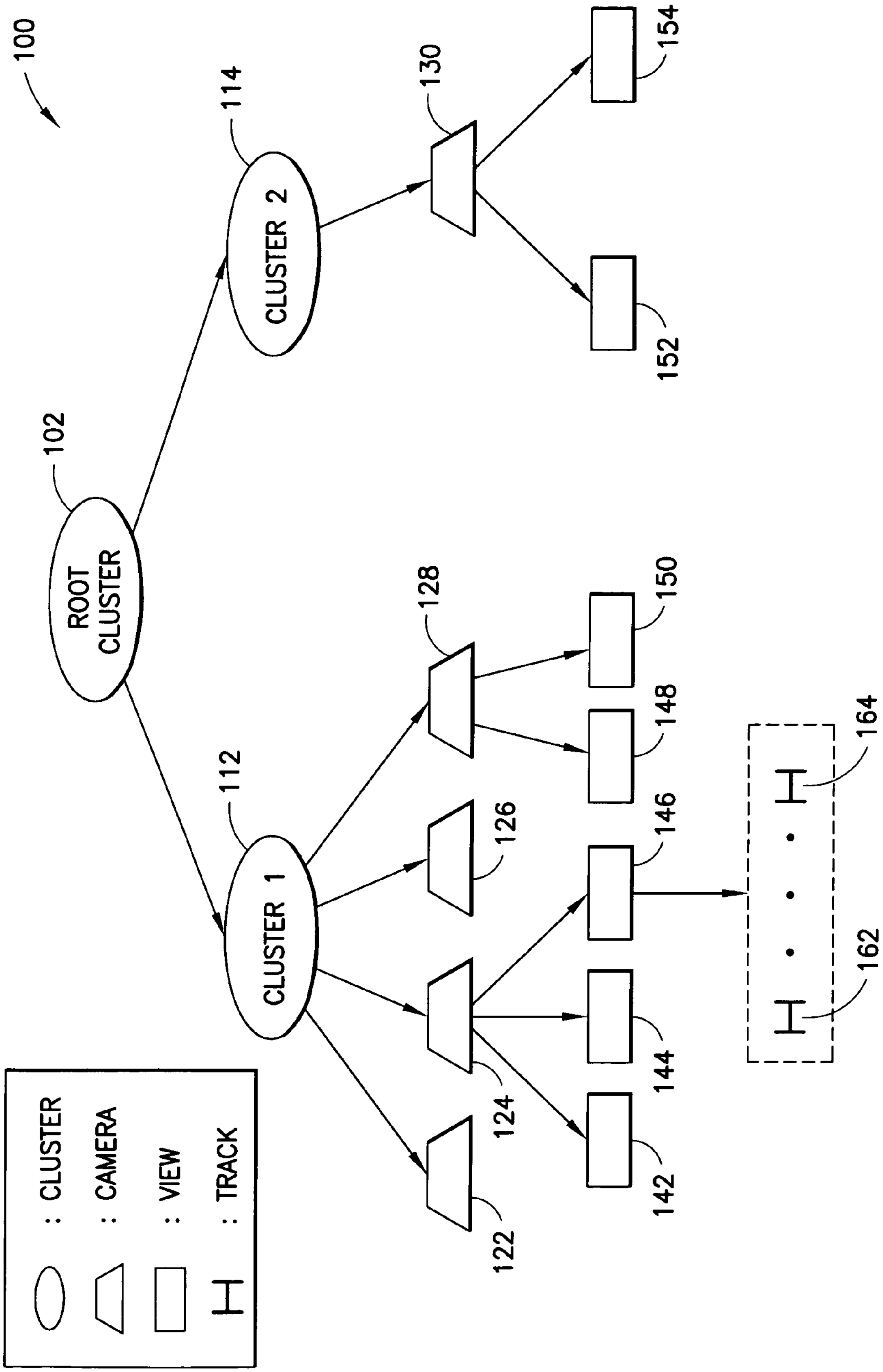
FIG. 1A depicts a block diagram of a front end of an electronic video surveillance camera system organized in relation to video surveillance cameras comprising the video surveillance camera system and made in accordance with the present invention.

Particular embodiments and features of the present invention are illustrated in the schematic block diagrams depicted in FIGS. 1-5. The block diagram in FIG. 1A depicts a portion of a video surveillance system front end 100 comprised of a root video surveillance cluster 102, which is in turn comprised of individual video surveillance camera clusters 112, 114. Each cluster 112, 114 is in turn comprised of at least one video surveillance camera; for example, cluster 1 comprises four video surveillance cameras 122, 124, 126, 128, while cluster 114 comprises one video surveillance camera 130.

Individual cameras comprising the videos surveillance camera clusters are preferably highly programmable with programmable pan, tilt, zoom and digital zoom features. The individual cameras also have view-programming capability, wherein a view comprised of a specific set of operations or movements selected from at least one of the pan, tilt, zoom or digital zoom options are programmed into a sequence of operations or movements. In certain embodiments, each camera may have multiple programmed views as illustrated by camera 124 in FIG. 1A, which has views 142, 144, and 146, camera 128 which has views 148 and 150; and camera 130 which has views 152 and 154.

In addition to view programming, the video corresponding to a particular view 146 gathered by a video surveillance camera 124 is analyzed by a video analysis engine 214 according to one or more user-specified criteria. The video analysis 214 engine creates track data 162, 164 by analyzing the video gathered by the video surveillance cameras, for example, video surveillance camera 124. As is shown in FIG. 1A, the video analysis occurs on a specific view 146 of video surveillance camera 124. The track data comprises at least a pointer to video satisfying the user-specified criteria. For example, if the criteria correspond to the event of an automobile entering the view of the camera, the video analysis engine will create track data comprising at least a pointer to each segment of video recording the occurrence of an automobile entering the field of view.

Figure 1B:
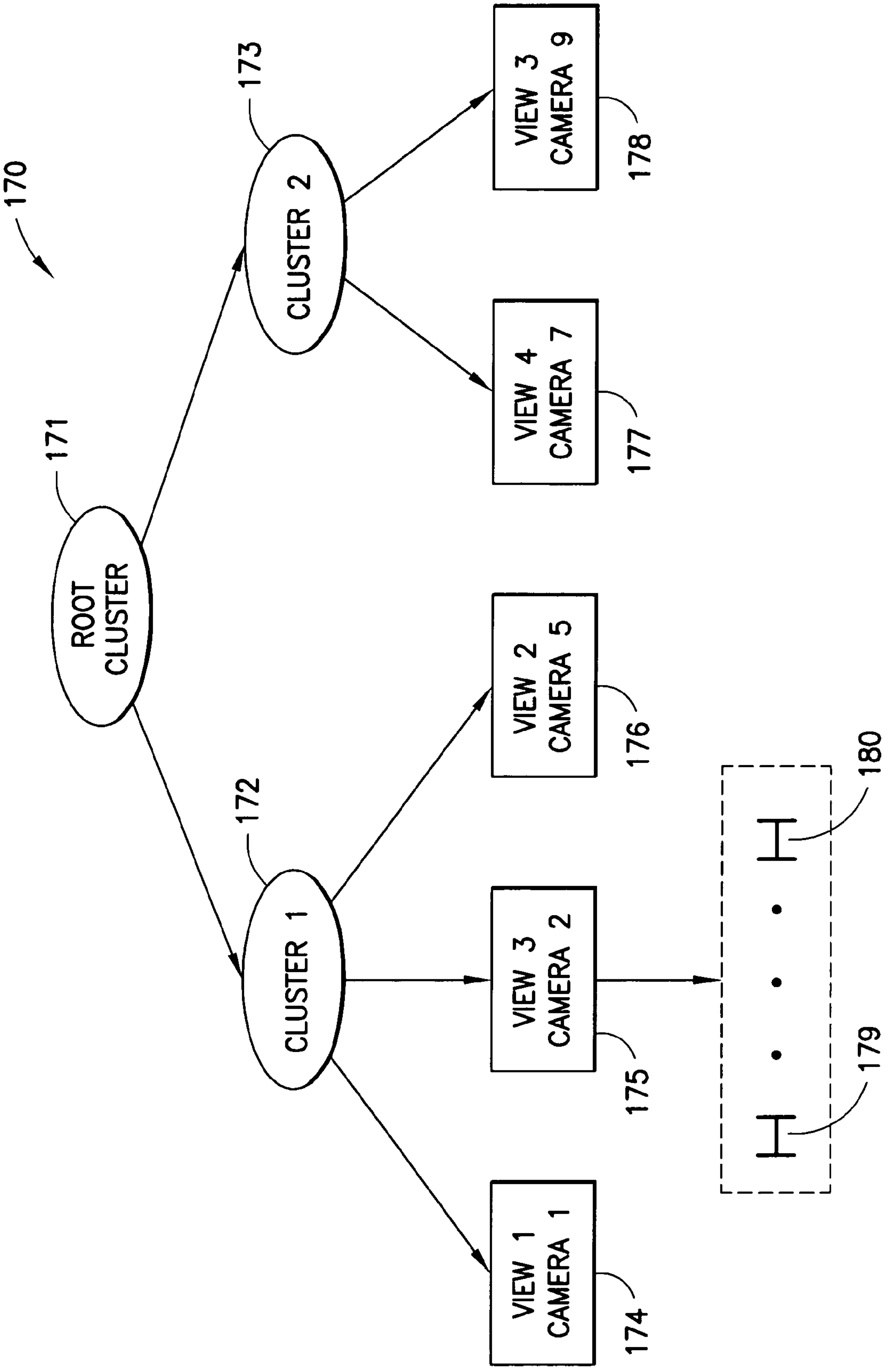
FIG. 1B depicts a block diagram of a front end of a video surveillance camera system organized in relation to programmed views of video surveillance cameras comprising the video surveillance camera system and made in accordance with the present invention.

In contrast to the embodiment depicted in FIG. 1A, the embodiment depicted in FIG. 1B is organized in clusters of programmed camera views. As in the case of the embodiment depicted in FIG. 1A, the video surveillance camera front end 170 comprises a root cluster 171 further comprised of clusters 172 and 173. Each of the clusters 172, 173 is comprised of programmed camera views selected from different cameras. For example, cluster 172 is comprised of a view 1 (174) selected from camera 1; view 3 (175) selected from a camera 2; and a view 2 (176) selected from a camera 5; and cluster 173 is comprised of a view 4 (177) from a camera 7 and a view 3 (178) from a camera 9. In addition, video analysis operations can be applied to a cluster of views, or to individual views comprising the cluster. Further, data and alarm conditions derived from video analysis applied to a cluster of views can be reported from a cluster-centric perspective.

This feature illustrates a particular advantage of the present invention in that video surveillance and analysis activities can be easily and continually customized to a particular threat environment. A video surveillance analyst is not confronted with a situation as in the case of the prior art where video surveillance options were predetermined at the establishment of the video surveillance system; rather, when practicing the methods and apparatus of the present invention the video surveillance analyst can continually adjust the system to evolving threat situations.

Figure 2:
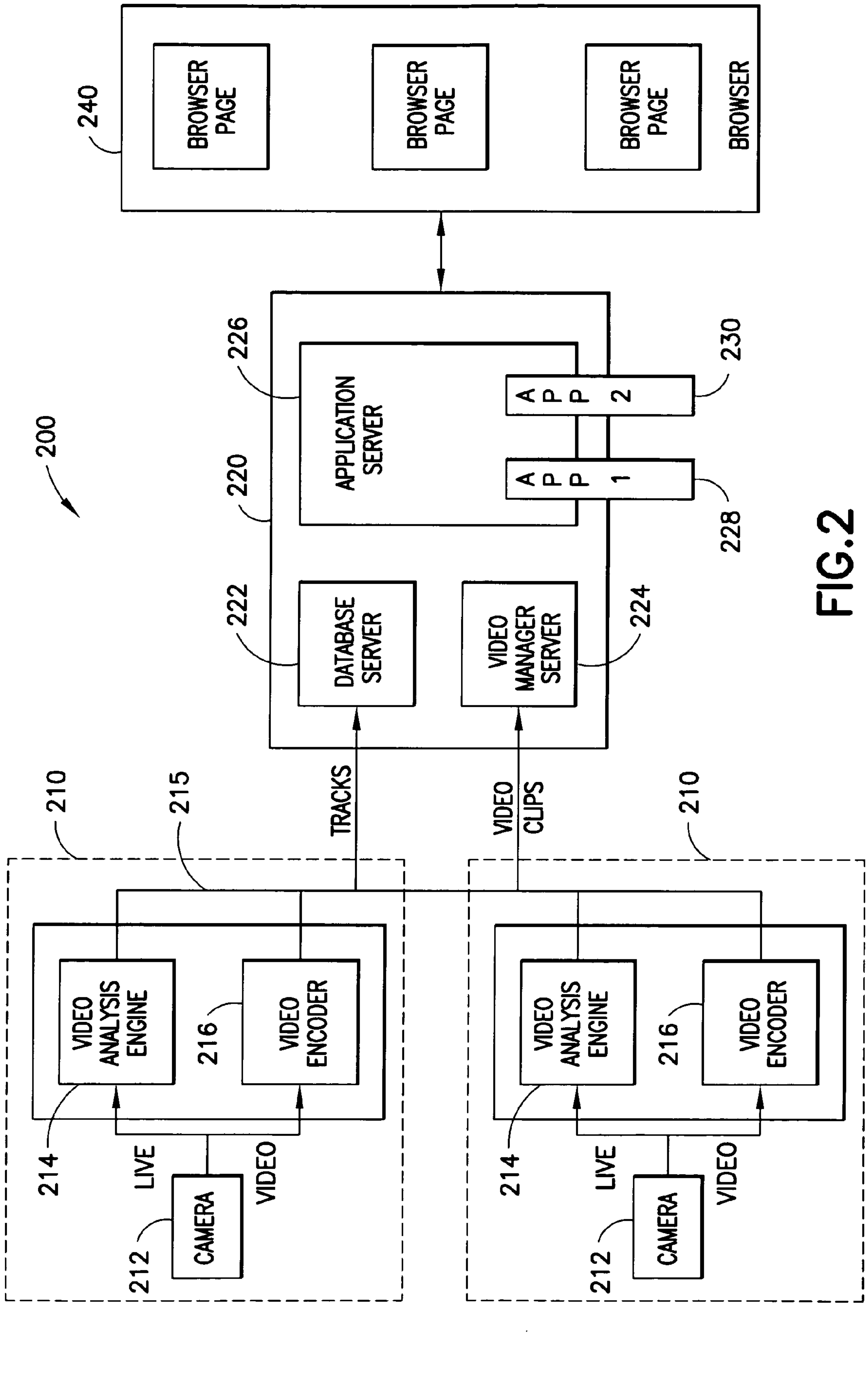
FIG. 2 depicts the data flow architecture of a distributed video surveillance camera system made in accordance with the present invention.
Figure 3:
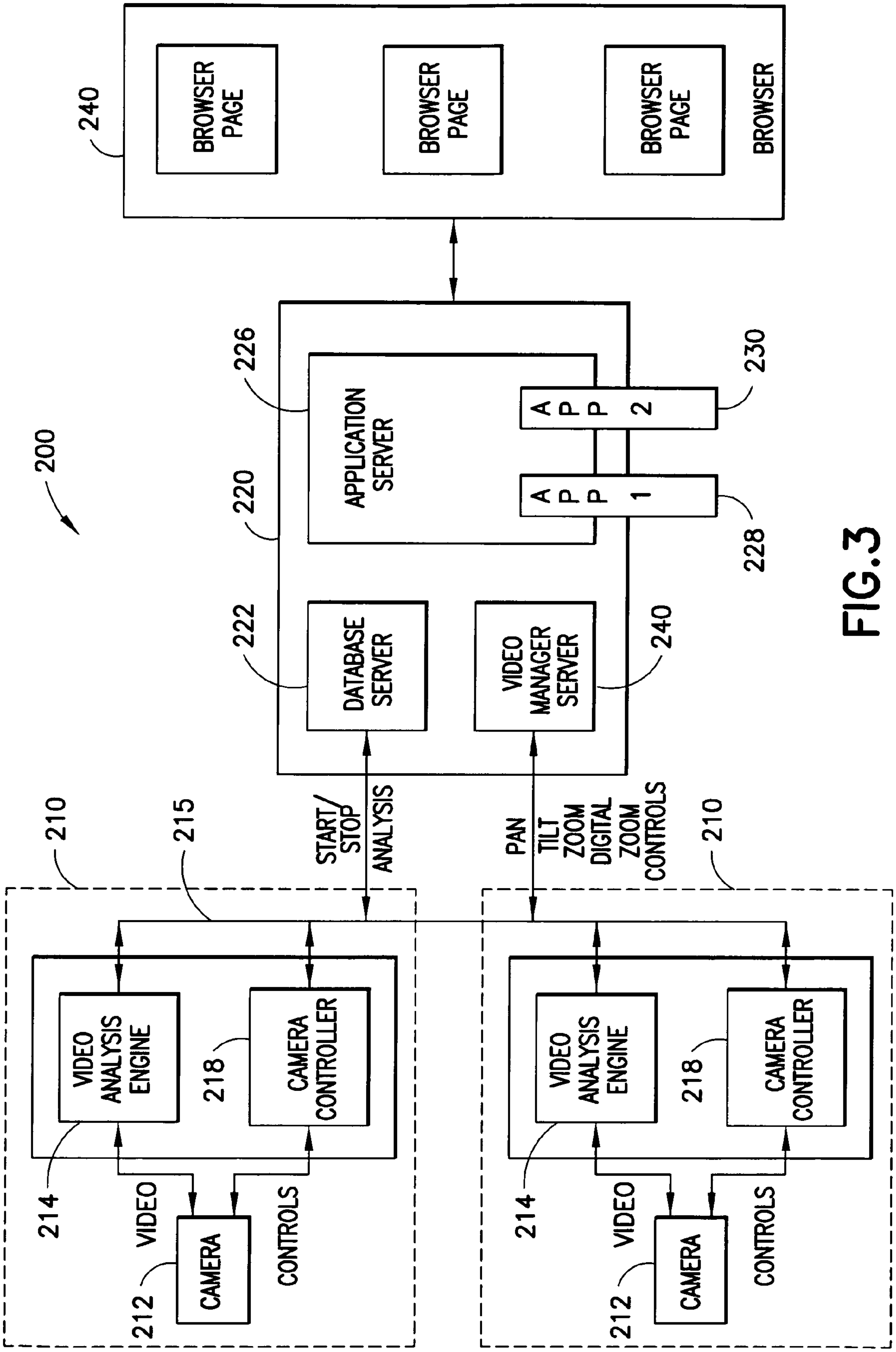
FIG. 3 depicts the control flow architecture of a distributed video surveillance camera system made in accordance with the present invention.

FIG. 2 depicts data management details and FIG. 3 depicts control management details of a video surveillance system 200 made in accordance with the present invention. In particular, video surveillance system 200 comprises, in part, multiple video surveillance system modules 210 comprising video cameras 212; video analysis engines 214; video encoders 216; and camera controllers 218. At least one video surveillance system module comprises a video surveillance camera cluster in the embodiment depicted in FIGS. 2 and 3. The video surveillance system modules 210 are a particular advantage of the present invention because they provide a high degree of programmability, modularity, flexibility and extensibility. Each video surveillance camera 212 in a video surveillance system module is remotely programmable through camera controller 218. In addition, the video analysis engine 214 is remotely programmable, permitting a user to specify video analysis criteria remotely. In the data flow depicted in FIG. 2, data derived from the analysis of video gathered by the video surveillance cameras 212 is transmitted by the video analysis engine to the electronic database system 220 over a video surveillance system network 215. Although the video surveillance system module is depicted as incorporating both a video analysis engine and video encoder, in other embodiments video analysis engines and video encoders may be distributed in other ways; for example, a video encoder may perform encoding operations for multiple cameras.

In other embodiments the video surveillance system module further comprises a keyframe generation system to create a keyframe of a specific field of view viewed by the video surveillance camera. Keyframes are generated whenever a user-specified video analysis criterion is satisfied, and generally correspond to a still image of a field of view best capturing an object or event being observed. In further embodiments, a keyframe may be a headshot of a person entering a facility. The headshot may be created by momentarily zooming the video surveillance camera on the person's face.

A unitary system network 215 is depicted in FIGS. 2 and 3, but in various alternate embodiments of the present invention the video surveillance system network can be segmented into various component networks operating in accordance with various protocols. For example, portions of the video surveillance system network can be hard-wired while other portions can be wireless. In addition, different wired and wireless network protocols can be used at various levels of the system.

The electronic database system 220 comprises a database server 222 for receiving and cataloguing data generated by the video analysis engines 214; a video manager for receiving video encoded by video encoders 216; and an application server 226 for managing video surveillance applications. In the particular embodiment depicted in FIGS. 2 and 3 both implementation and management of the video surveillance system 200, and video surveillance activities are managed through the electronic database system 220 of the video surveillance system 200. In alternate embodiments, these activities can be managed through separate instrumentalities.

In addition, the database system is depicted in FIGS. 2 and 3 as integrating both a database server 222 and video manager 224. In alternate embodiments, these can be separated; and in still other embodiments there may be multiple database servers 222 and video managers 224 in a large-scale distributed video surveillance system operating in accordance with the present invention. In fact, the use of globally-unique identifiers for identifying video surveillance camera clusters; video surveillance cameras; video surveillance camera views and track data greatly reduces database management overhead since there is no need to centrally manage identification activities, and makes it possible to implement a distributed video surveillance system.

In the embodiment depicted in FIGS. 2 and 3 two applications 228 and 230 interact with the video surveillance system 200 through the electronic database system 220. In particular, application 228 is a control application for implementing and managing the video surveillance system, while application 230 is a surveillance application for controlling surveillance activities accomplished using the video surveillance system 200. For example, in various embodiments, the surveillance application 230 would automatically disseminate video and data gathered by the video surveillance system 200 to video surveillance analysts performing surveillance activities. In other embodiments, the surveillance application would receive queries of the electronic database system 200 formulated by the video surveillance analysts; locate the data and video satisfying the queries, and display the data and video in browser format 240 as shown in FIGS. 2 and 3. In further embodiments, the surveillance application 230 would generate alarm conditions for alerting the video surveillance analysts performing video surveillance activities. These various options can also be simultaneously available in a single embodiment.

Particular advantages of the methods and apparatus of the present invention are apparent in FIGS. 2 and 3. For example, video analysis can be performed continuously by the video analysis engines 214, thereby creating a rich database of object and event data that can be accessed either in near-real-time in aid of, for example, policing activities, or much later in aid of investigative activities. In addition, it is apparent the simplicity with which a video surveillance system having the architecture depicted in FIGS. 2 and 3 can be extended through the addition of modular video surveillance system modules 210. This is further eased by the assigning of unique identifiers to video surveillance camera clusters; video surveillance cameras; and video surveillance camera views. The assignment of unique identifiers aids not only in the cataloguing and archiving of data and video in the electronic database system 220, but also in the development of situational awareness by video surveillance analysts whose awareness is increased through the association of video surveillance cameras and views with unique identifiers.

In addition, the unique identifiers assigned to the clusters, cameras and views can also function as web address in a web-based system, greatly simplifying interactions with the electronic video surveillance system. For example, if a video surveillance analyst desired to see a live feed associated with a particular camera view, the analyst need merely enter the address of the camera view using the unique identifier to form a portion of the address to access the camera view.

Figure 4:
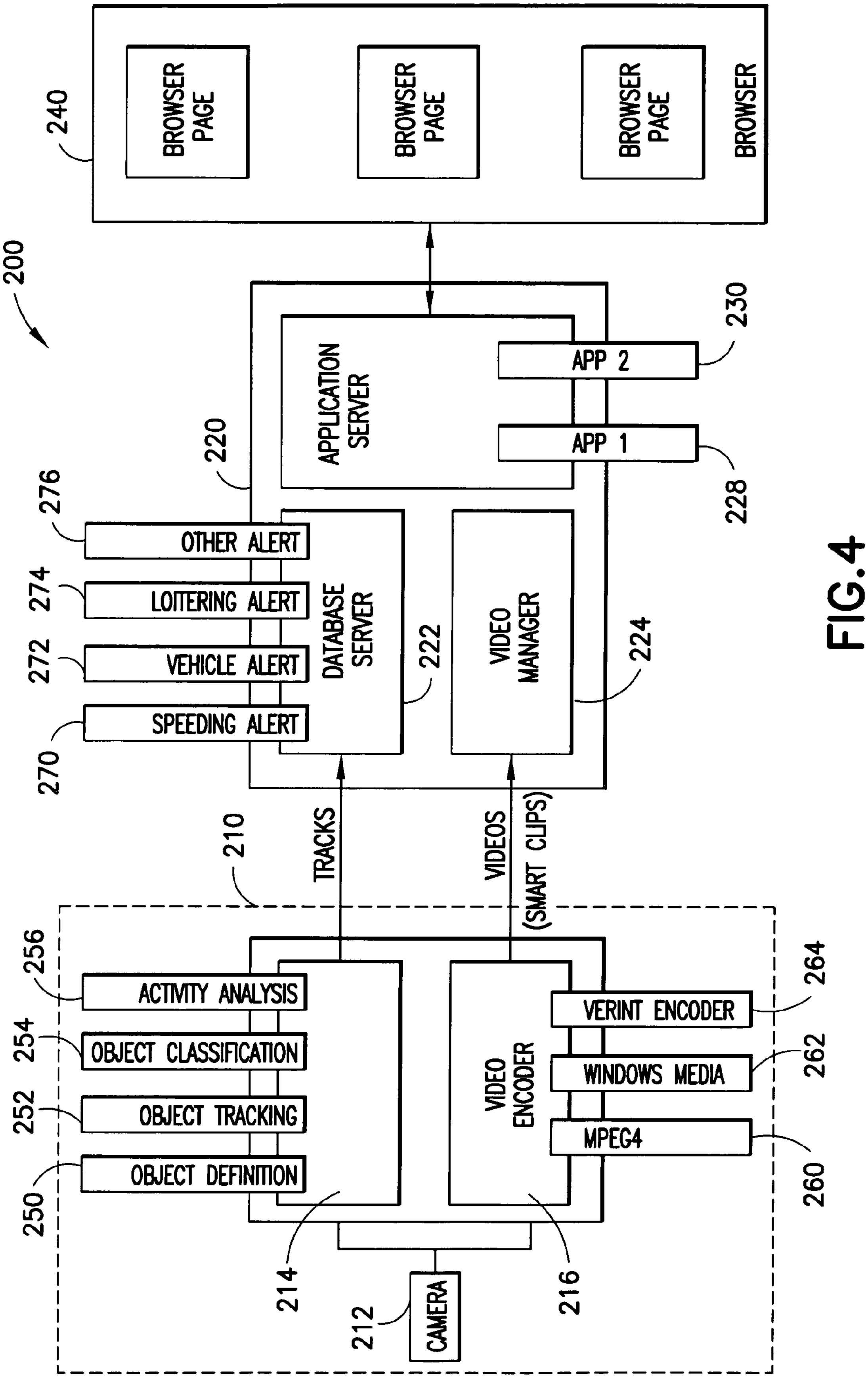
FIG. 4 depicts the data flow architecture of an alternate distributed video surveillance camera system made in accordance with the present invention.

An alternate video surveillance system operating in accordance with the methods and apparatus of the present invention is depicted in FIG. 4. In FIG. 4, the video analysis engine 214 is programmed with an object detection application 250 to perform object detection; an object tracking application 252 to perform object tracking; an object classification application 254 to perform object classification; and an activity analysis application 256 to perform activity analysis. In the embodiment depicted in FIG. 4, the analysis activities are applied to video gathered from a single video surveillance camera 212, illustrating that multiple video analysis activities can be simultaneously applied to the video.

The video encoder 216 comprises multiple video encoding applications, providing a wide range of options for video surveillance analysts using the video surveillance system. In particular, video encoder 216 comprises an MPEG4 encoder 260; a Windows Media encoder 262; and a Verint Encoder 264.

The database server 222 depicted in FIG. 4 is programmed to perform various alerts in response to data received from the video analysis engine 214. For example, the programming of the database server comprises a speeding alert application 270 to issue speeding alerts; a vehicle alert application 272 to issue vehicle alerts; a loitering application 274 to issue loitering alerts; and another application 276 to issue other alerts. In other embodiments (for example, those depicted in FIGS. 2-3) alarms can also be implemented locally to be performed by at least one of the video analysis engines 214.

Figure 5:
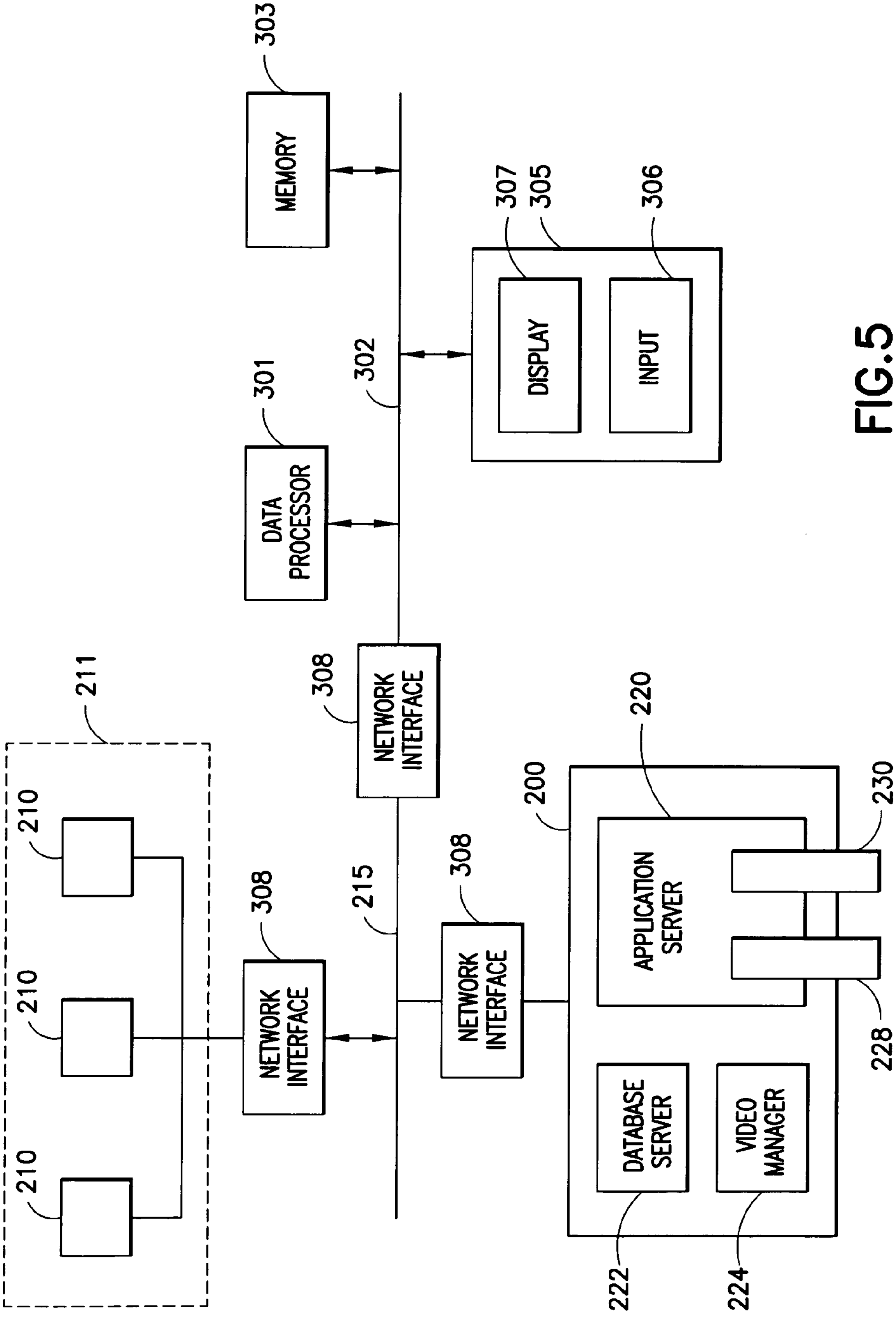
FIG. 5 depicts an alternate video surveillance system architecture made in accordance with the present invention.

Additional details of a video surveillance system 200 made in accordance with the present invention are depicted in the conceptual block diagram depicted in FIG. 5. The video surveillance system 200 includes at least one data processor 301 coupled to at least one system bus 302 through which the data processor 301 may address a memory sub-system 303, also referred to herein simply as the memory 303. The memory 303 may include RAM, ROM and fixed and removable disks and/or tape. The memory 303 is assumed to store at least one program comprising instructions for causing the data processor 301 to execute methods in accordance with the teachings of the invention. The data processor 301 is also coupled through the bus 302 to a user interface, preferably a graphical user interface ("GUI") 305 that includes a user input device 306, such as one or more of a keyboard, a mouse, a trackball, a voice recognition interface, as well as a user display device 307, such as a high resolution graphical CRT display terminal, an LCD display terminal, or any suitable display device. With these input/output devices, a user can perform the steps of the methods of the present invention where user-specified values are required.

The data processor 301 may also be coupled through the bus 302 to a network interface 308 that provides bidirectional access to the video surveillance system network 215, such as an intranet and/or the internet. In various embodiments of the present invention, both system implementation and management, as well as surveillance activities can be performed through the display 307 and input devices 306.

In general, these teachings may be implemented using at least one software program running on a personal computer, a server, a microcomputer, a mainframe computer, a portable computer, an embedded computer, or by any suitable type of programmable data processor 301 operating in combination with video surveillance system management application 228 and video surveillance application 230 residing on the electronic database system 200. A video surveillance system technician can also manage the video surveillance system modules 210 comprising at least one video surveillance camera cluster 211 through the display 305 and input device 306.

One of the advantages of the present invention is the ease in which a distributed video surveillance system can be quickly and easily constructed. This is the result of the modular concept embodied in the system, reflected in FIGS. 3-5, wherein the firmware and software for establishing and managing the video surveillance system are designed to operate with video surveillance cameras having a high degree of programmability and video analysis engines providing a wide range of video analytics.

The foregoing description generally concerned the architecture of a video surveillance system operating in accordance with the methods and apparatus of the present invention. The following description will concern establishment of video surveillance activities—particularly the establishment of automatic video analysis operations—and the handling of data created during video surveillance operations.

Figure 6:
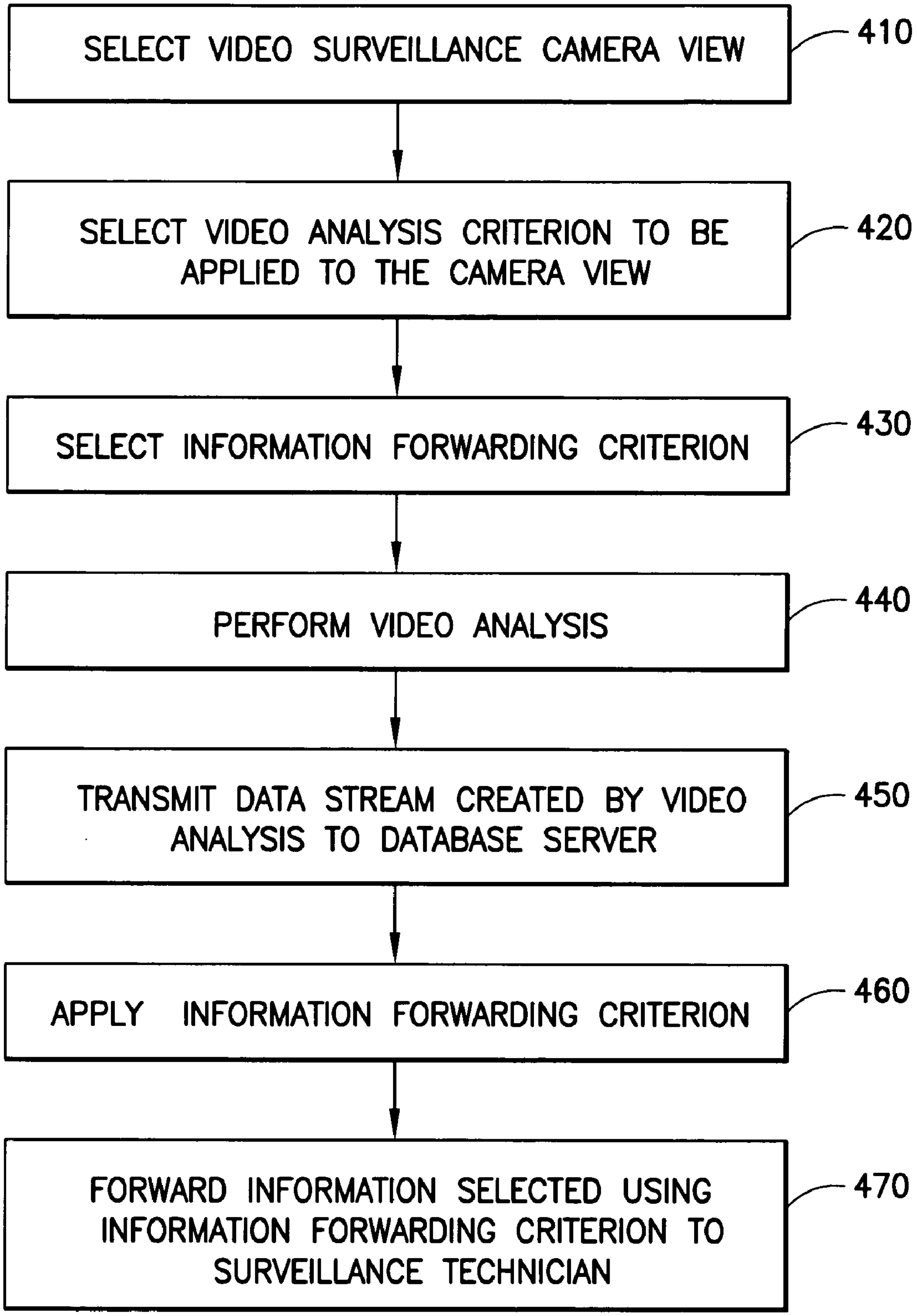
FIG. 6 depicts the steps of a method for automating video analysis operations and data collection and distribution activities of a distributed video surveillance camera system.

For example, FIG. 6 depicts a block diagram illustrating the steps of a method for establishing video analysis operations and data distribution in a distributed video surveillance system operating in accordance with the present invention. In particular, the first step 410 comprises selecting a view of a video surveillance camera. Next, at step 420 the video surveillance analyst selects a video analysis criterion to be applied to video gathered by the view of the video surveillance camera. Then, at step 430, the video surveillance analyst selects an information forwarding criterion, related to the video analysis criterion selected at step 420, which governs when and what categories of data generated by the video analysis engine 214 and, in some instances the database server 220, will be forwarded to the video surveillance analyst. Then, the video analysis engine 214 performs video analysis on video gathered by the video surveillance camera at step 440, and transmits a data stream created by the video analysis operations to the database server 222 of the electronic database system 220 for storage at step 450. Next, at step 460, the database server 220 applies the information forwarding criterion selected by the video surveillance analyst to the data stream received from the video analysis engine 214, and selects information meeting the information forwarding criterion established by the video surveillance analyst. Information meeting the criterion is then forwarded to the video surveillance analyst at step 470.

Figure 7A:
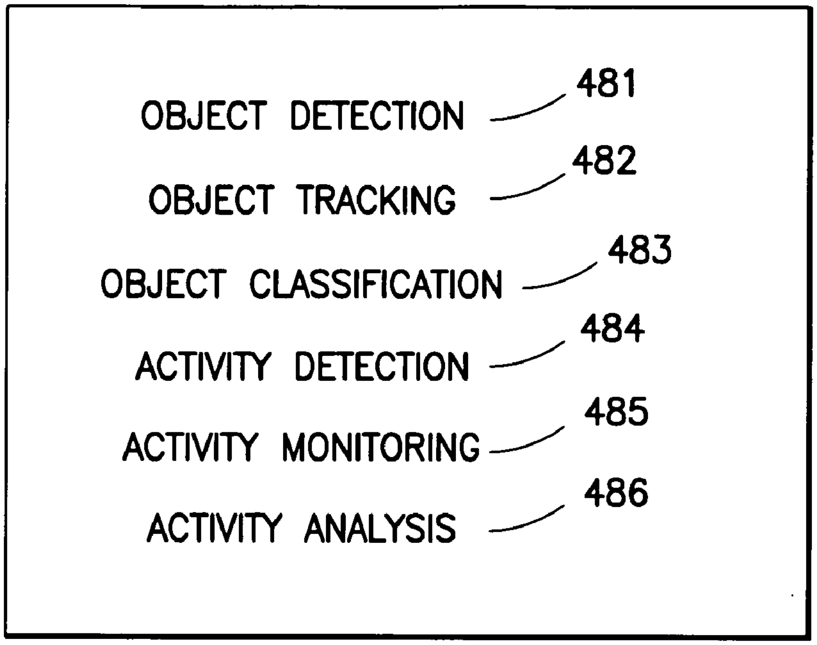
FIGS. 7A and 7B depict video analysis criteria and information forwarding criteria available for automating video analysis and data collection and distribution activities of a distributed video surveillance camera system.
Figure 7B:
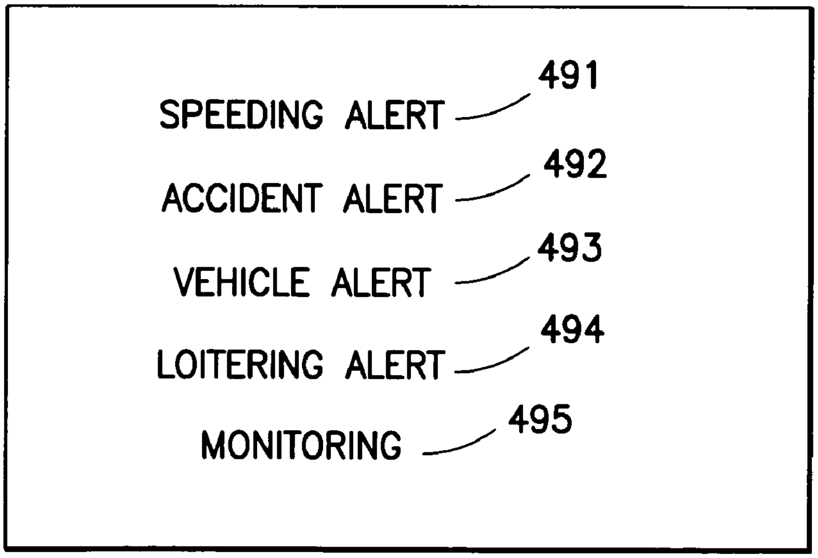

FIGS. 7A and 7B depict various video analysis criteria and information forwarding criteria available for selection by video surveillance analysts performing video surveillance activities aided by a video surveillance system operating in accordance with the present invention. In particular, available video analysis criteria listed in FIG. 7A are object detection 481; object tracking 482; object classification 483; activity detection 484; activity monitoring 485; and activity analysis 486. Available information forwarding criteria are depicted in FIG. 7B and comprise a speeding alert 491; an accident alert 492; a vehicle appearance alert 493; a loitering alert 494; and a view monitor 495 for forwarding general information derived from monitoring a particular view of a video surveillance camera. Many other video analysis criteria and information forwarding criteria can be selected for use in a video surveillance system operating in accordance with the present invention. FIGS. 7A and 7B depict the modularity of the present invention at the video analysis and alert levels. In particular, a video surveillance analyst can easily reprogram a video surveillance system to accommodate new threat environments by adding new video analysis applications and alert criteria.

The immediately preceding description concerned the selection of video analysis activities and general information distribution details of a system operating in accordance with the present invention. The following description will concern details associated with data identification and storage in a distributed video surveillance system operating in accordance with the present invention.

Figure 8:
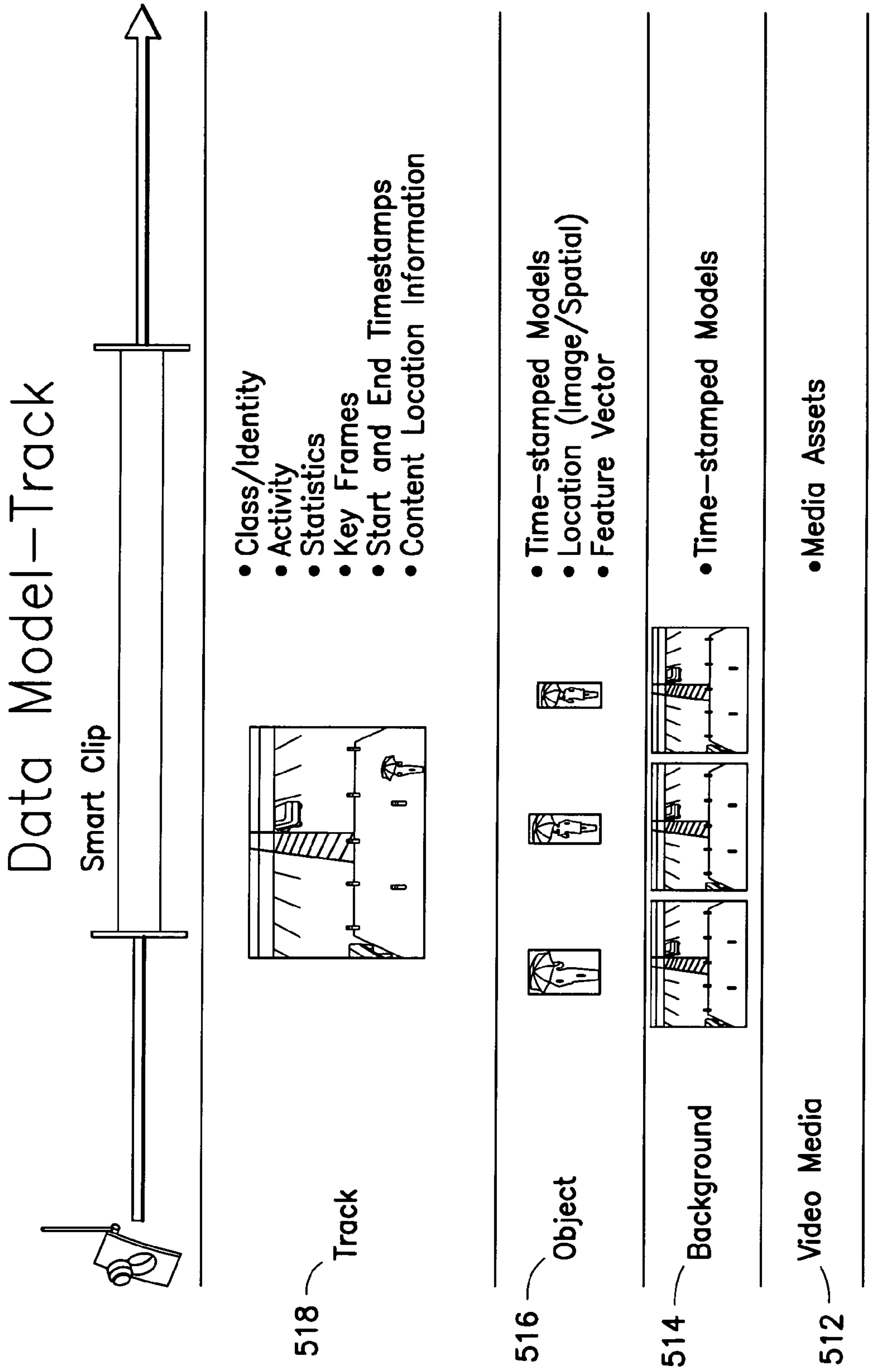
FIG. 8 depicts a schematic representation of a track data model in accordance with the present invention.

In general, in video surveillance systems operating in accordance with the present invention, video gathered by a particular programmed view of a video surveillance camera is continuously analyzed by a video analysis engine 214 of the video surveillance system to generate tracks, and the data derived from the analysis is then transmitted to the electronic database system 220 for storage in the database server 222. Each track is comprised of track data and captures the activity of an object inside the field of view of the video surveillance camera. The track data comprises at least a pointer to a video segment containing the object, and can further comprise in various embodiments location data, trajectory data, motion data, visual features (for example, color texture and shape) and object class or identity. In addition to pointers to video segments, the track data can also comprise digital video clips, keyframes, foreground models and background models. FIG. 8 depicts one possible data model for an electronic video surveillance system operating in accordance with the present invention. In the particular data model depicted in FIG. 8, track data 510 can be comprised of four parts: video media 512; background information 514; object information 516 and track summary information 518.

Figures 9, 9A:
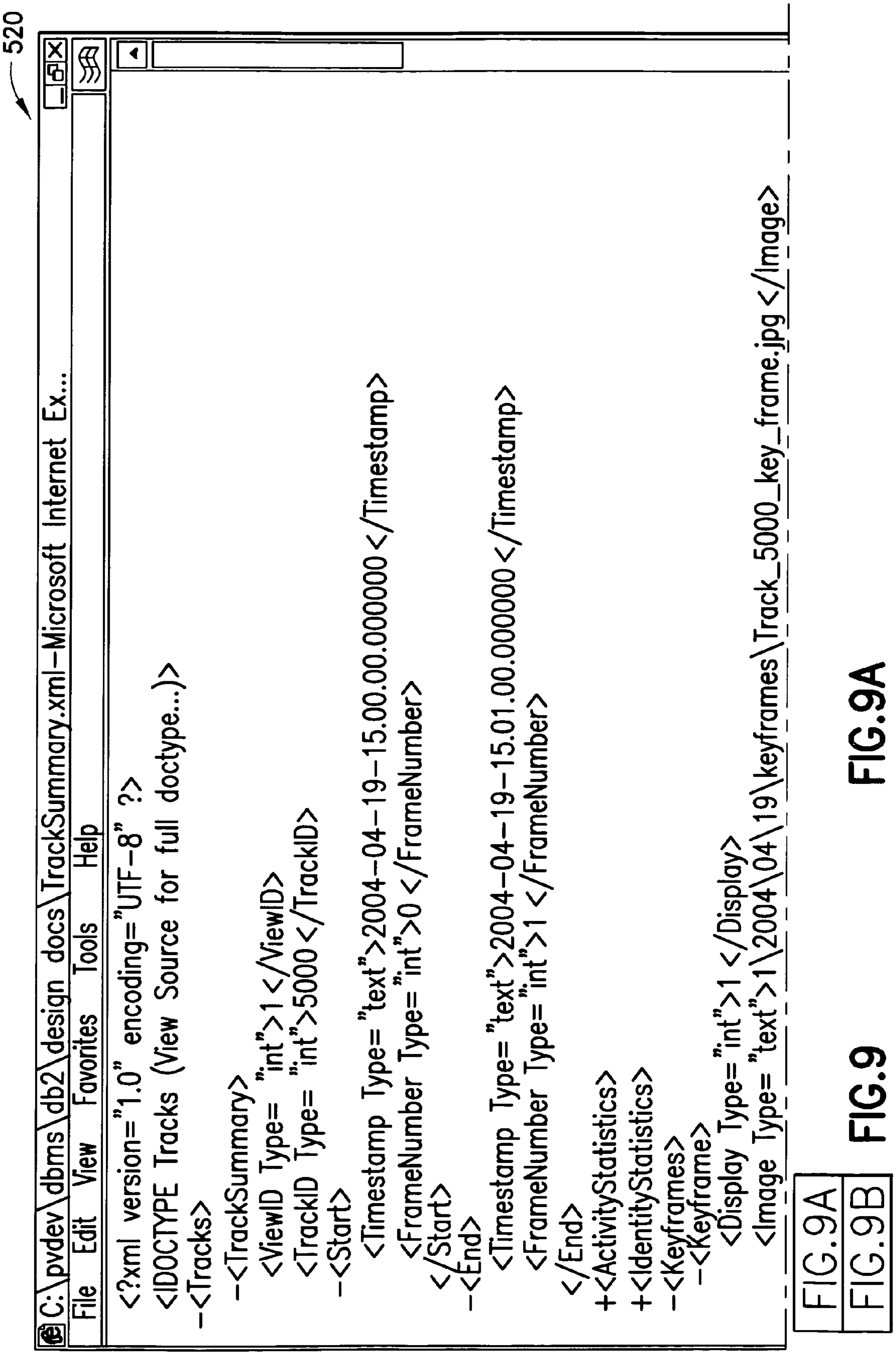
FIG. 9 depicts a track summary document in accordance with one embodiment of the present invention.
Figure 10A:
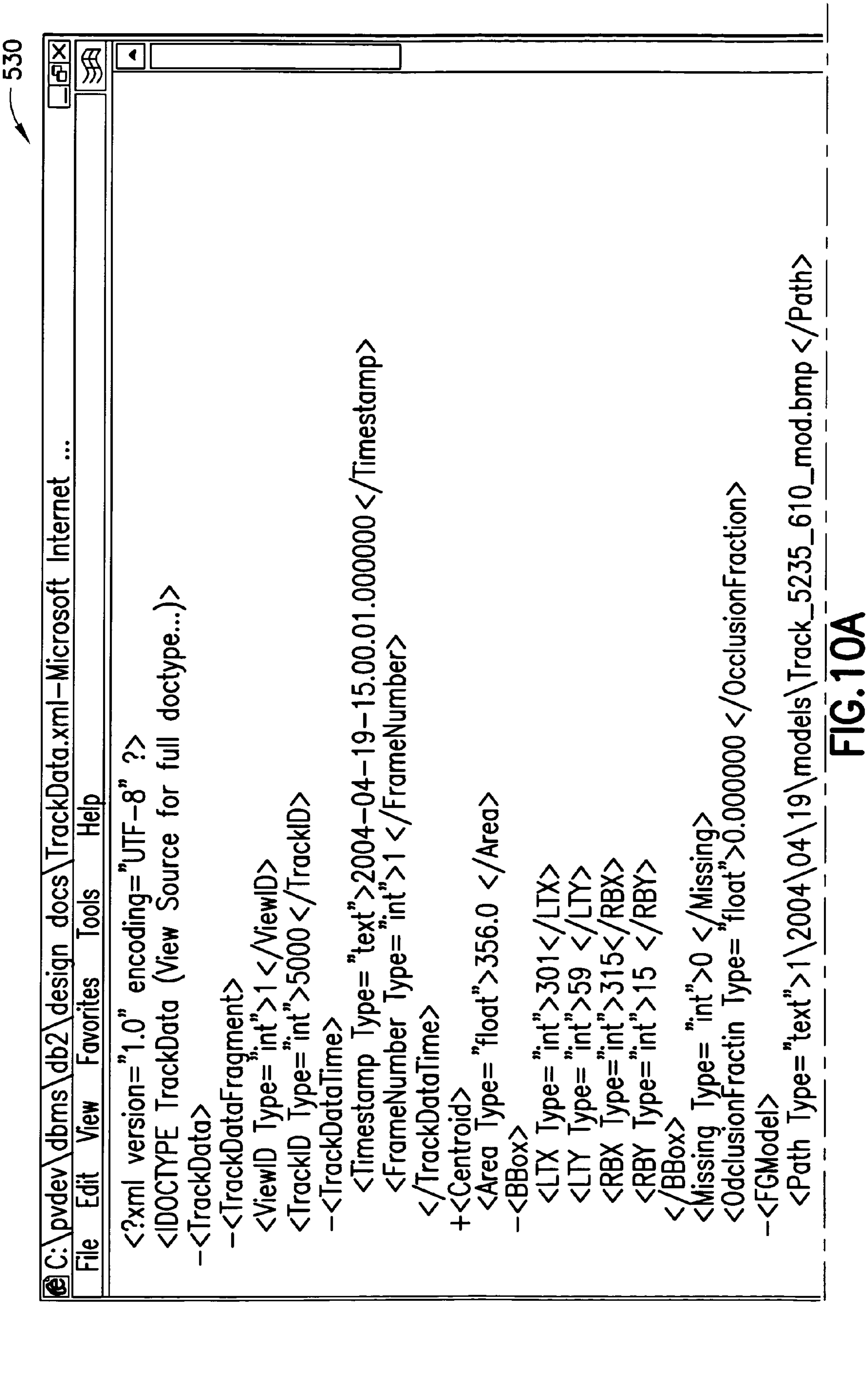
FIG. 10 depicts a track data document in accordance with one embodiment of the present invention.
Figure 10C:
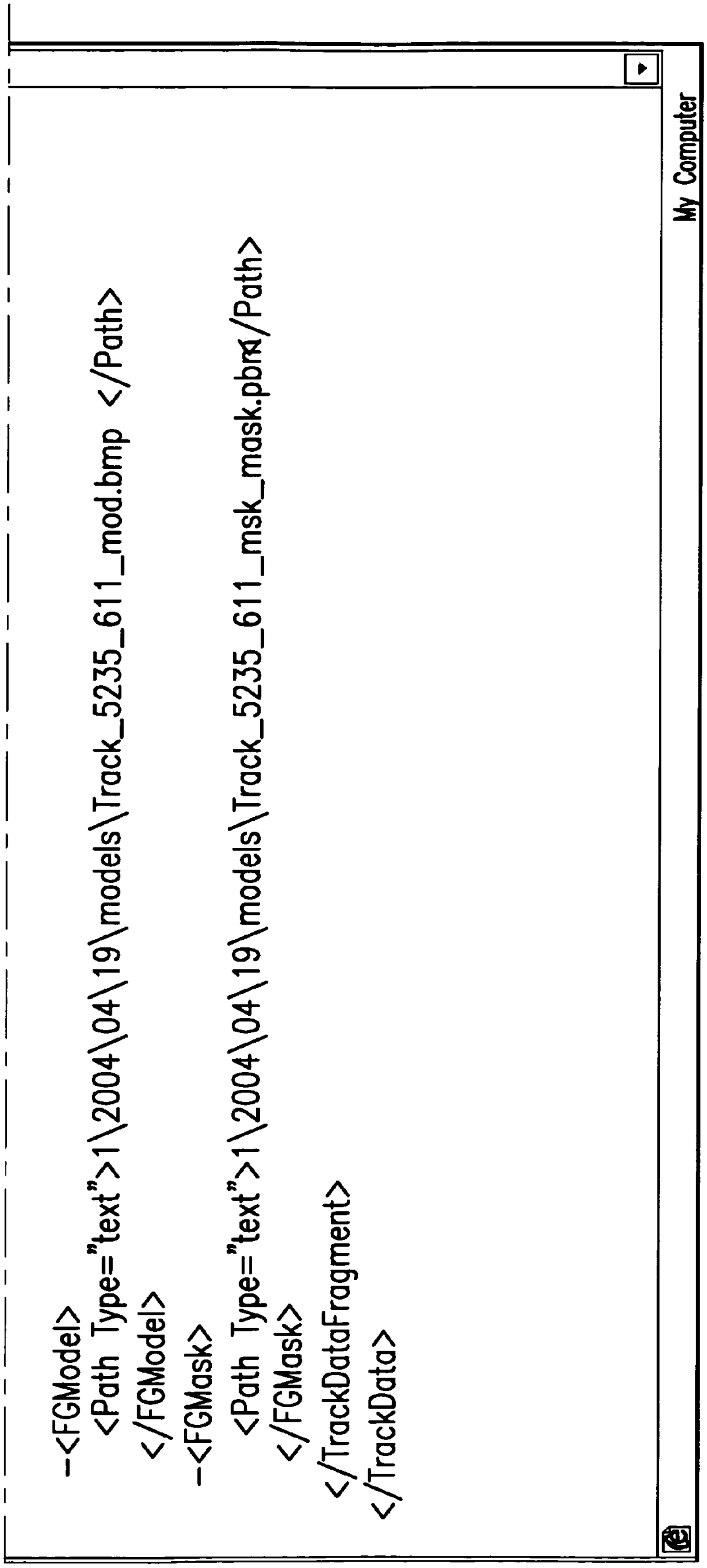
Figure 10:
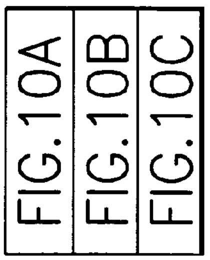
Figure 11:
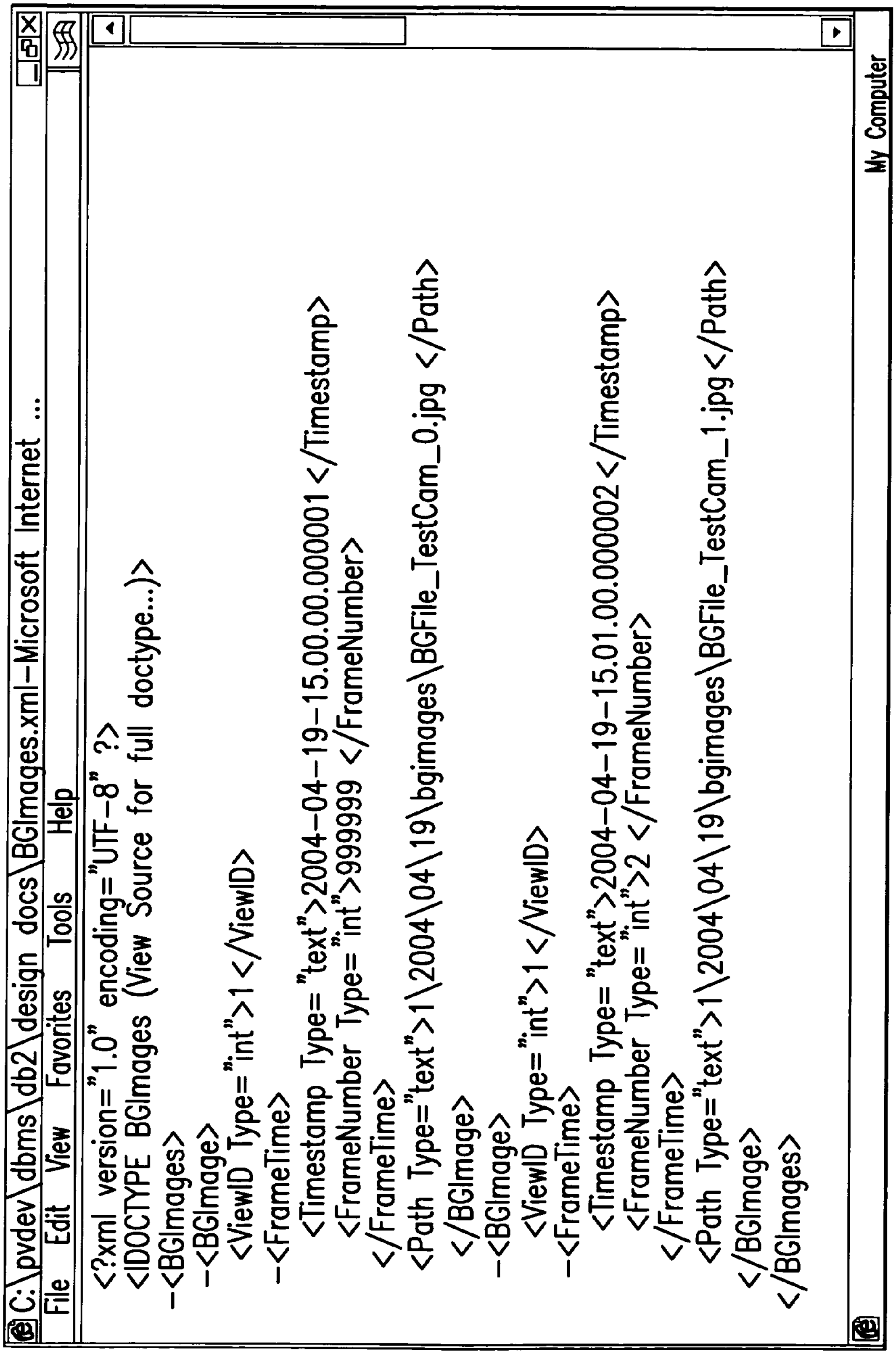
FIG. 11 depicts a background image document in accordance with one embodiment of the present invention.

In one alternate embodiment of the present invention, primitive tracks output from a video analysis engine 214 are represented as XML documents. In this particular alternate embodiment there are three types of XML documents: track summary documents, track data documents and background image documents. FIG. 9 depicts an example of a track summary document 520; FIG. 10 depicts an example of a track data document 530; and FIG. 11 depicts an example of a background image document 540. The track summary document 520 depicted in FIG. 9 is structured as follows:

```
<?xml version="1.0" encoding="UTF-8"?>
<Tracks>
    <TrackSummary> ... </TrackSummary>
        *
        *
        *
    <TrackSummary> ... </TrackSummary>
</Tracks>
```

This document type allows multiple occurrences of <TrackSummary> so that a video analysis engine 214 can send an optimal number of track summary documents to the database server 222 of the electronic database system in dependence on load conditions and the urgency of real time data delivery. Each track summary document 520 is associated with a particular video surveillance camera view that is identified through use of a globally-unique identifier.

Track data documents 530 each contain a root tag <TrackData> . . . </TrackData> and are structured as follows:

```
<?xml version="1.0" encoding="UTF-8"?>
<TrackData>
    <TrackDataFragment> ... </TrackDataFragment>
        *
        *
        *
    <TrackDataFragment> ... </TrackDataFragment>
</TrackData>
```

As in the case of the track summary document, the track data document type allows multiple occurrences of <TrackDataFragment> so that the video analysis engine 214 can send the optimal amount of TrackDataFragment> to the database server 222 of the electronic database system 220 in dependence on load conditions and the urgency of real time data delivery. Each <TrackDataFragment> contains all the meta-data of a primitive track.

The background image XML document 540 contains a root tag <BGImages> . . . </BGImages> and is structured as follows:

```
<?xml version="1.0" encoding="UTF-8"?>
<BGImages>
    <BGImage> ... </BGImage>
        *
        *
        *
    <BGImage> ... </BGImage>
</BGImages>
```

As in the case of the track summary and track data documents, the background image document type allows multiple occurrences of <BGImage> so that the video analysis engine 214 can send the optimal amount of <BGImage> to the database server 222 of the electronic database system 220 in dependence on load conditions and the urgency of real time data delivery.

The track summary 520, track data 530 and background image 540 XML documents created during video analysis activities of a video analysis engine operating on video gathered by a particular view of a video surveillance camera each contain at least a sub-tag <ViewID> nnnnn <NiewID> to uniquely identify in a global manner the view under analysis by the video analysis engine 214.

Figure 12:
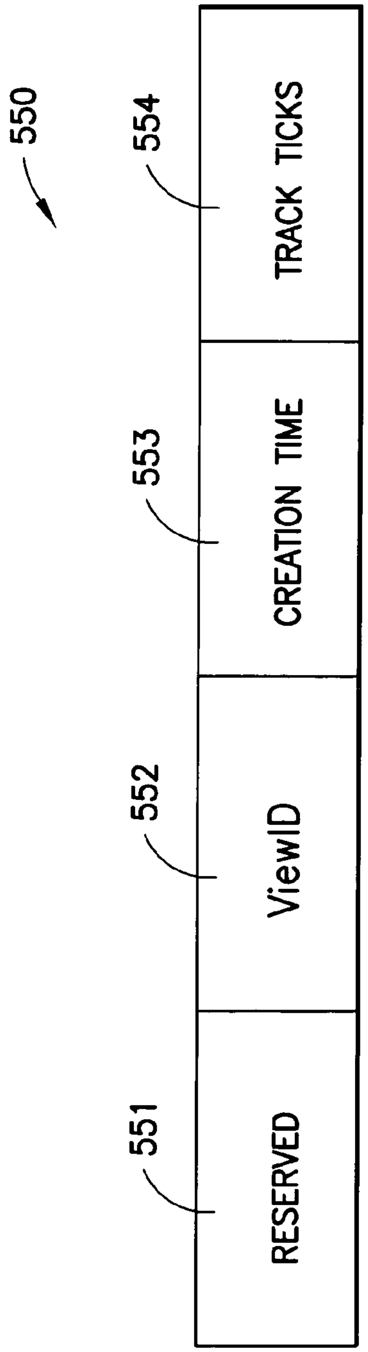
FIG. 12 depicts a track identification format in accordance with the present invention.

<TrackSummary> and <TrackDataFragment> also contain at least a sub-tag <TrackID> nnnnn </TrackID> to identify the primitive track extracted by the video analysis engine 214. This identifier is globally unique across the electronic database system 220. In response to a query, the electronic database system can use the unique identifier to access all data associated with a primitive track. Combining the unique track identifier with the multiple occurrences XML document design, the electronic database system 220 of the present invention can support near-real-time search and alert by the video analysis engine 214. The unique track identifier 550 of a video surveillance system operating in accordance with the present invention is depicted in FIG. 12, and is generated by combining the unique view identifier 552, the number of seconds of track creation time in relation to a standard reference time 553, and the ticks 554 of a video analysis engine track counter. A "tick" indicates multiple occurrences of objects, events or activities occurring nearly simultaneously. The tick serves to distinguish between multiple tracks created in such situations. There are reserved bits 551 for a distributed electronic database system. The distributed creation of unique track identifiers is a particular advantage of the present invention because it eliminates the need for a centralized solution, which can add a significant load to a server. The particular track identifier is just one possible embodiment within the scope of the present invention; for example, a separate entry can be added to indicate the particular video analytic applied to the video corresponding to the video track. Alternatively the view identifier 552 can be used to indicate both the unique view being analyzed and the particular video analytic applied to the view.

Figure 13:
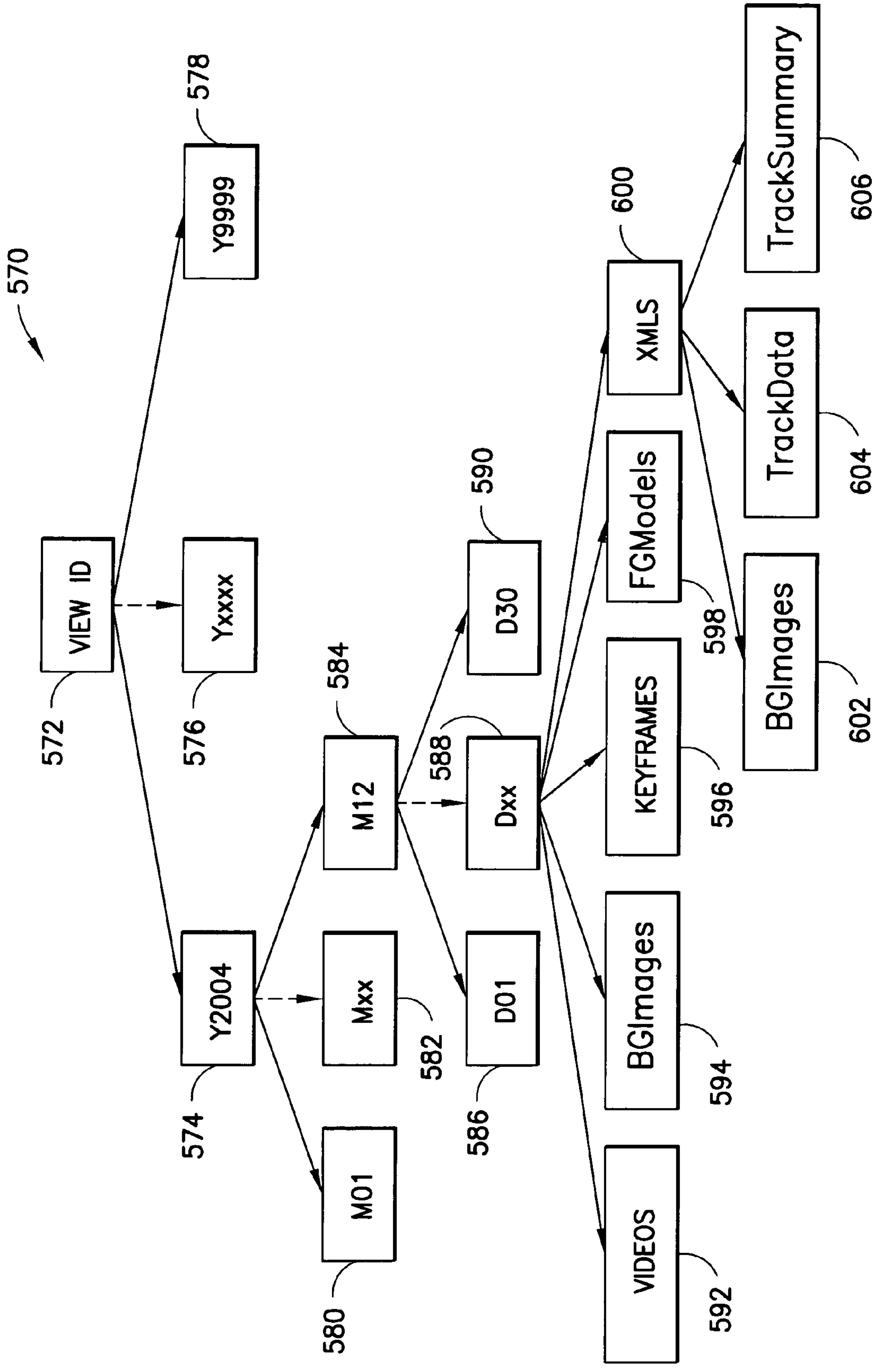
FIG. 13 depicts a temporal-based hierarchical data structure for organizing video track data in accordance with the present invention.

In various embodiments of the present invention, certain classes of data are "pushed" to the database server 222 of the electronic database system 220 of the video surveillance system 200 in real time, while other categories of data are saved locally. The locally-saved data is then pushed to the database server 222 during off-peak situations when the video surveillance system network is experiencing relatively light traffic. A local data storage structure 570 for storing data created by video analysis engines operating in accordance with the present invention is depicted in FIG. 13. In response to the open-ended data growth associated with continuous video analysis activities in some embodiments operating in accordance with the present invention, data files are organized in a temporal manner with the unique view 572 identifier as the root directory for a camera view. The next three layers of the structure correspond to the year (574, 576, 578), month (580, 582, 584) and day (586, 588 and 590) when a particular track was created. In alternate embodiments, the directories can be further subdivided into those corresponding to hours and minutes.

In one possible embodiment where the smallest temporal directory corresponds to a particular day, all track data generated during that day for a particular view of a video surveillance camera would be stored in the same directory, for example, /ViewID/Yxxxx/Mxx/Dxx. In various embodiments of the present invention, a particular day directory can contain videos 592, background images 594, keyframes 596, foreground models 598 and XMLS subdirectories 600. Furthermore, the XMLS subdirectory 600 is divided into three additional subdirectories: BGImages 602, TrackData 604 and TrackSummary 606. To prevent access inefficiency for large directories, file limitations can be instituted which would cause new directories to be created when a file limitation has been exceeded.

Particular advantages of the present invention associated with a temporal-based data structure are: scalable growth of track data over the long term; easy access to data segments based on temporal information; online and offline archival management based on temporal information; ease of temporal-information-based data package composition and decomposition; and ease of web-based access based on temporal information.

Another feature of the present invention is that data associated with a particular view of a video surveillance camera for many consecutive time segments can be easily packaged and unpackaged. This can be accomplished by an XML document residing directly inside the ViewID directory structured as follows:

```
<?xml version="1.0" encoding="UTF-8"?>
<ViewManifest>
    <ViewStruct>
        <ViewID> vvvvvvvv </ViewID>
        <TemporalUnit>Day</TemporalUnit>
        <StartTime>yyyy-mm-dd</StartTime>
        <EndTime>yyyy-mm-dd</EndTime>
        <MaxDirSize>100</MaxDirSize>
        <ContainVideos>Yes</ContainVideos>
        <ContainBGImages>Yes</ContainBGImages>
        <ContainKeyframes>Yes</ContainKeyframes>
        <ContainFGModels>Yes</ContainFGModels>
        <ContainXMLS>Yes</ContainXMLS>
    <ViewStruct>
    *
    *
    *
    </ViewStruct>
</ViewManifest>
```

This format allows multiple occurrences of <ViewStruct> . . . <ViewStruct>. Each <ViewStruct> provides the track data structure for a continuous time span. The manifest file allows packaging and un-packaging of data files for many consecutive time spans.

The foregoing temporal-based database architecture concerned local data storage strategies in video surveillance systems operating in accordance with the present invention. The following description concerns details associated with the database architecture for performing near-real-time alerts and for archiving data generated by the video analysis engines 214 of a video surveillance system for later retrieval in response to queries.

Figure 14:
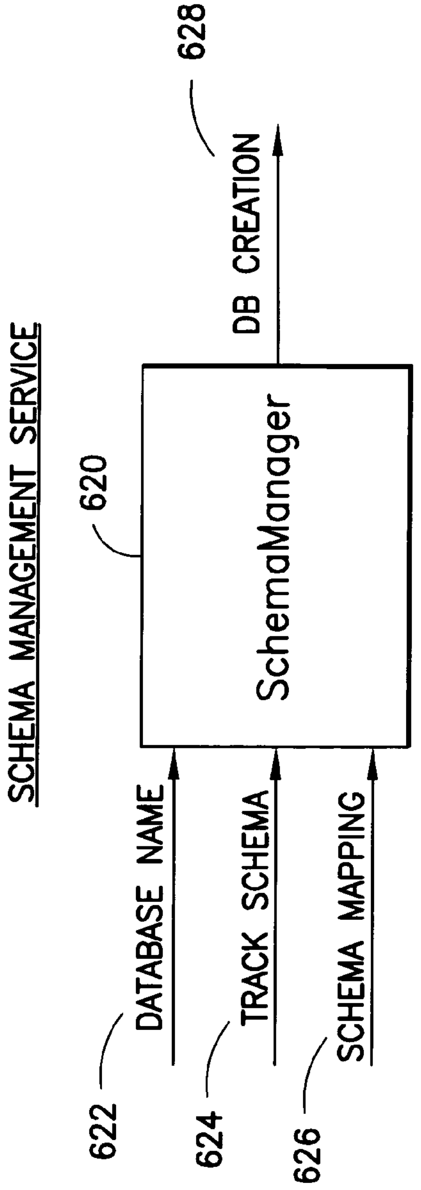
FIG. 14 depicts a conceptual block diagram illustrating the control flow in establishing the schematic architecture of an electronic database system for use in a distributed video surveillance camera system made in accordance with the present invention.

A feature of the present invention comprises methods and apparatus for use in establishing and managing a database architecture for use in a video surveillance system capable of performing, for example, near-real-time alerts based on video analysis activities. The control flow associated with a database schema management service is depicted in FIG. 14. The database schema manager 620 receives a database name specification 622; the details associated with track data 624; and a mapping protocol 626 and creates 628 a database architecture in dependence on this information.

Figure 15:
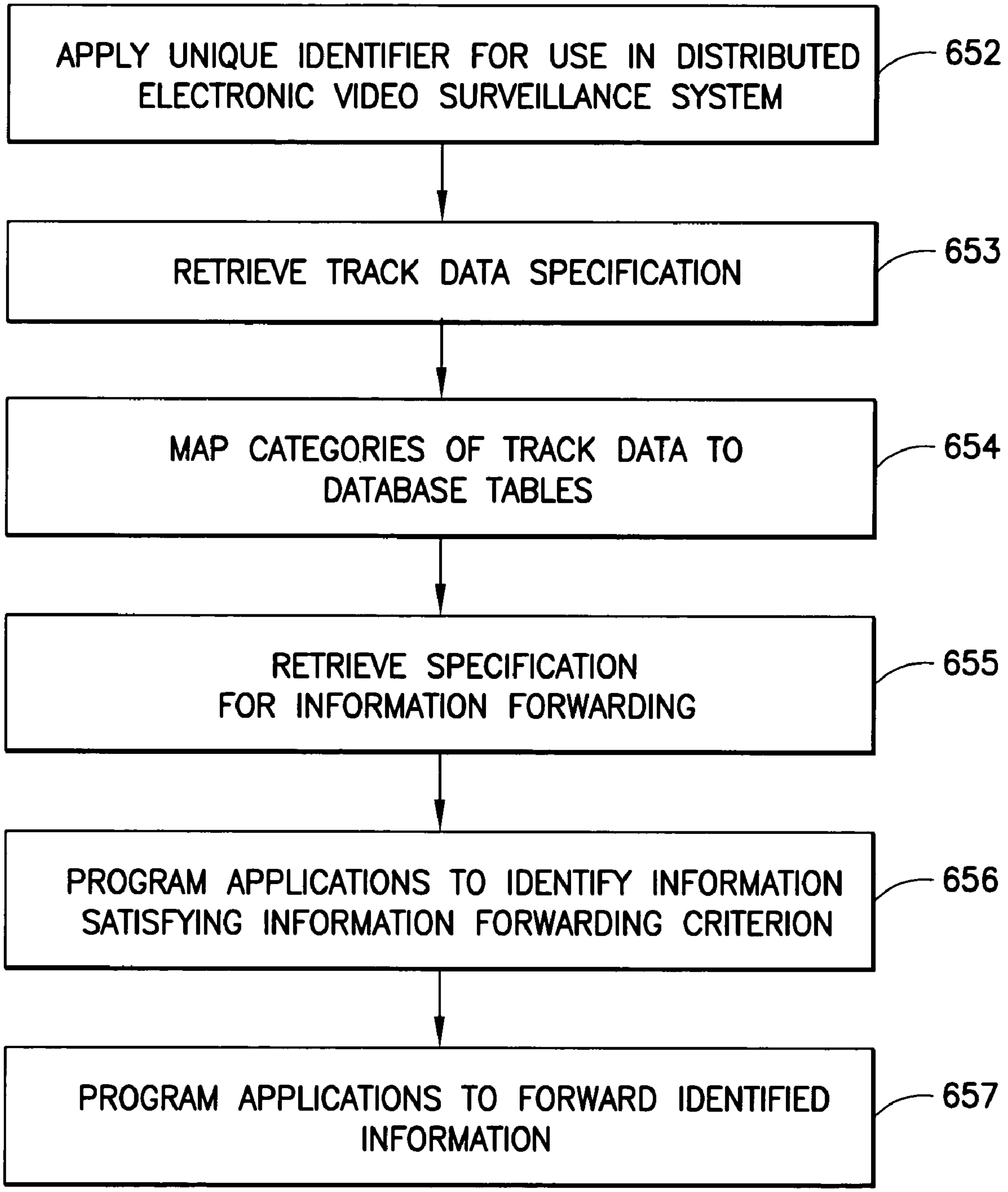
FIG. 15 depicts the steps of a method in establishing the architecture of an electronic database system for use in a distributed video surveillance camera system operating in accordance with the present invention.

A method for creating and managing a database for use in a video surveillance system capable of performing near-real-time alerts based on the results of video analysis activities is depicted in FIG. 15. In step 652 a unique identifier is selected for the particular database being established; this is a particular advantage of the present invention because it alleviates the need for central database management in a distributed video surveillance system comprising many databases. Then, at step 653 the track data specification is retrieved. The track data specification identifies and specifies the categories, classes and file types of data that the database will be receiving from the video analysis engines. Next, at step 654 the categories of track data are mapped to database tables.

The next steps concern another particular advantage of the invention involving the automated forwarding of certain categories of data to video surveillance analysts. At step 655, the information forwarding specification is retrieved. The information forwarding specification specifies what data will be forwarded, and when it will be forwarded. Applications are then programmed at step 656 to identify information satisfying the information forwarding criteria specified in the information forwarding specification, and at step 657 to forward the data.

Figure 16:
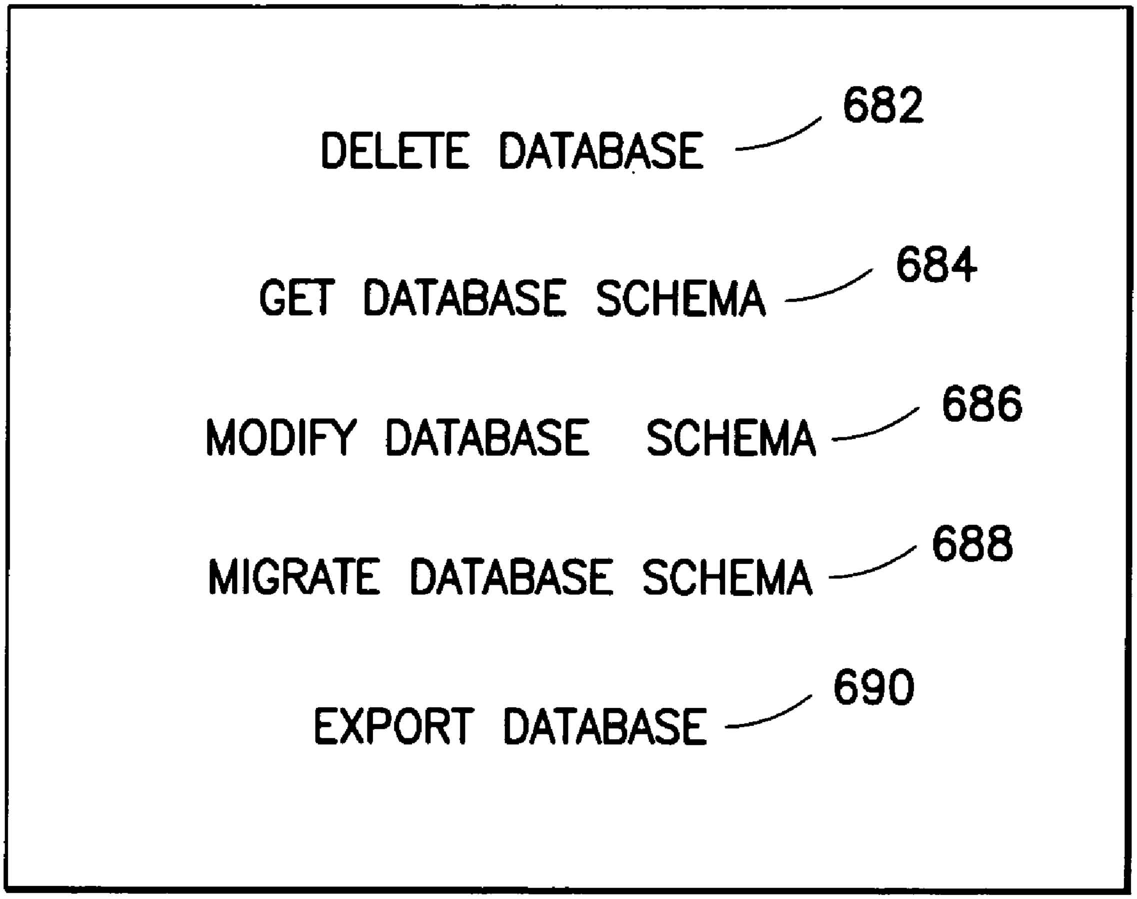
FIG. 16 depicts additional operations available for managing the schematic architecture of an electronic database system for use in a distributed video surveillance camera system operating in accordance with the present invention.

Other operations available for establishing and managing an electronic database system for use in a distributed video surveillance system are depicted in FIG. 16. The operations comprise: deleting the database 682; retrieving a pre-determined database schema 684; modifying a pre-existing database schema 686; migrating an existing database schema to a new database 688; and exporting a database 690.

Figure 17A:
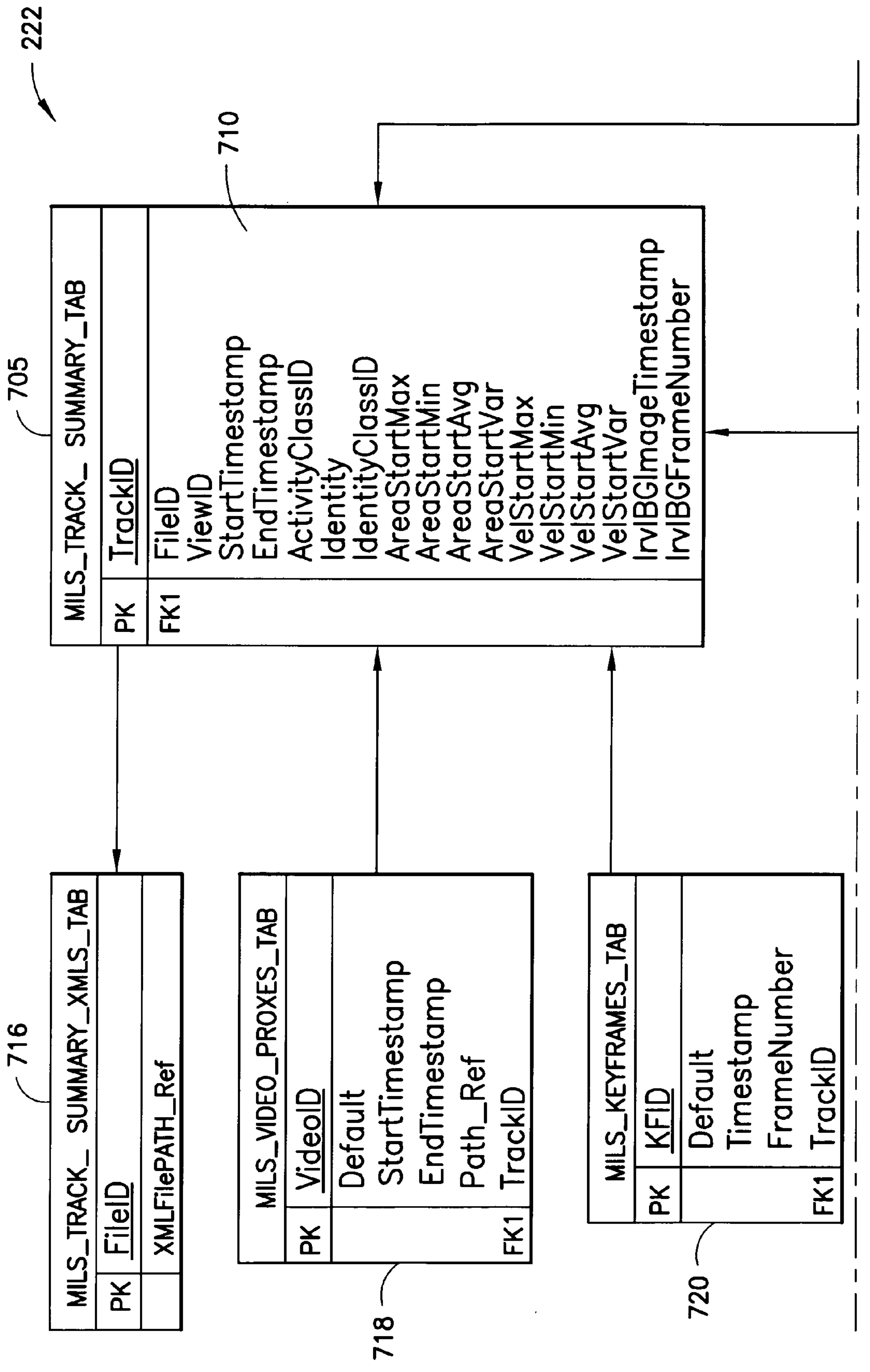
FIG. 17 depicts a schematic representation of the data organization of an electronic database system operating in accordance with the present invention.
Figures 17, 17B:
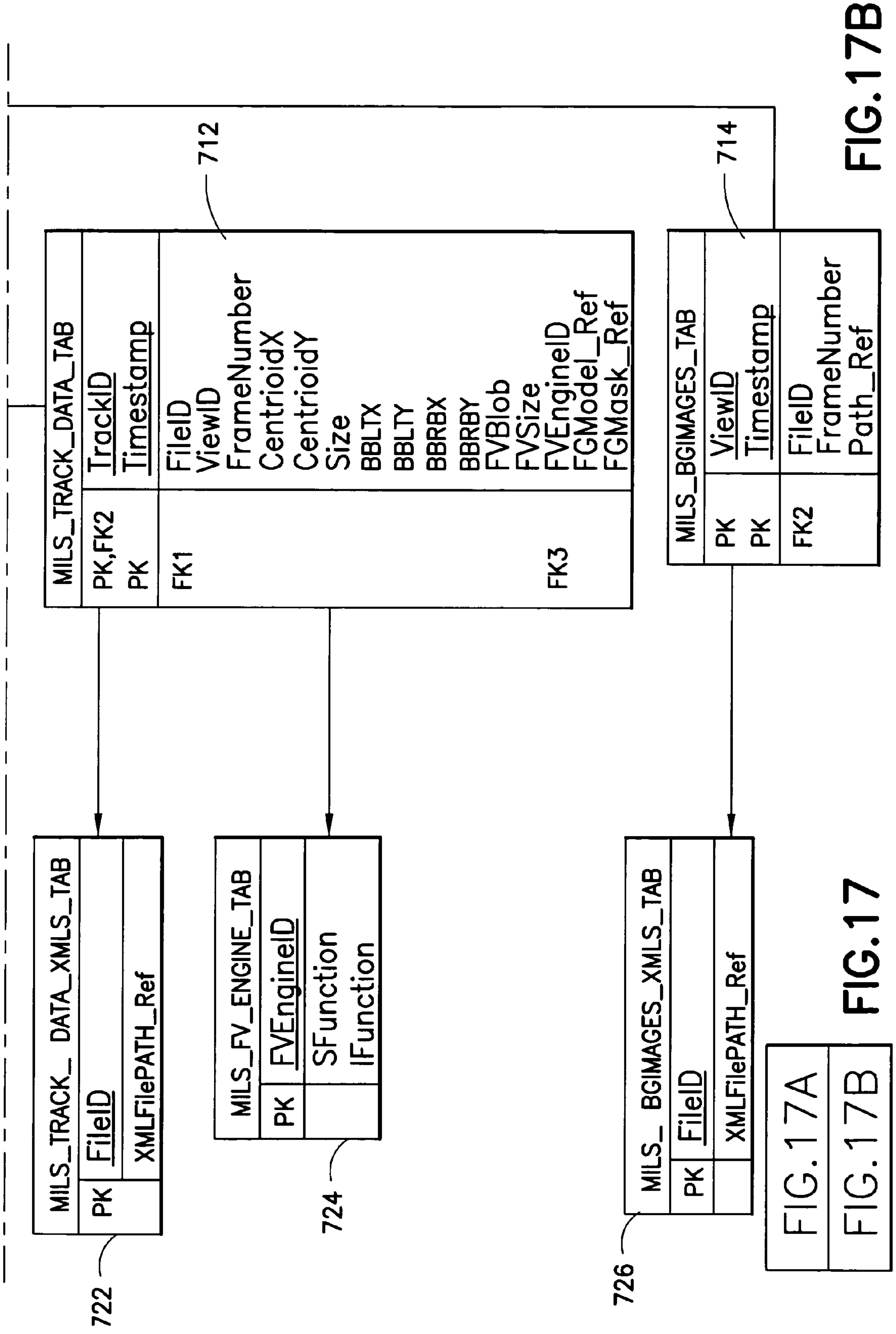

A schematic depiction of the table architecture 705 of a database server 222 made in accordance with the methods and apparatus of the present invention is depicted in FIG. 17. As is apparent from the schematic representation, there are tables corresponding to track summary information 710; track data information 712 and background image information 714. In certain embodiments, the XML documents from which the track summary; track data and background information was culled are saved. In these embodiments, tables 716, 722 and 726 contain pointers to the original track summary 520; track data 530; and background image XML documents. In addition, the database server also contains tables 718, 720 comprised of pointers to video segments and keyframes, respectively. Further, the database server contains raw data 724 created by the video analysis engine 214. Video surveillance analysts in certain situations may desire to perform searches of data created by the video analysis engines 214.

Figure 18:
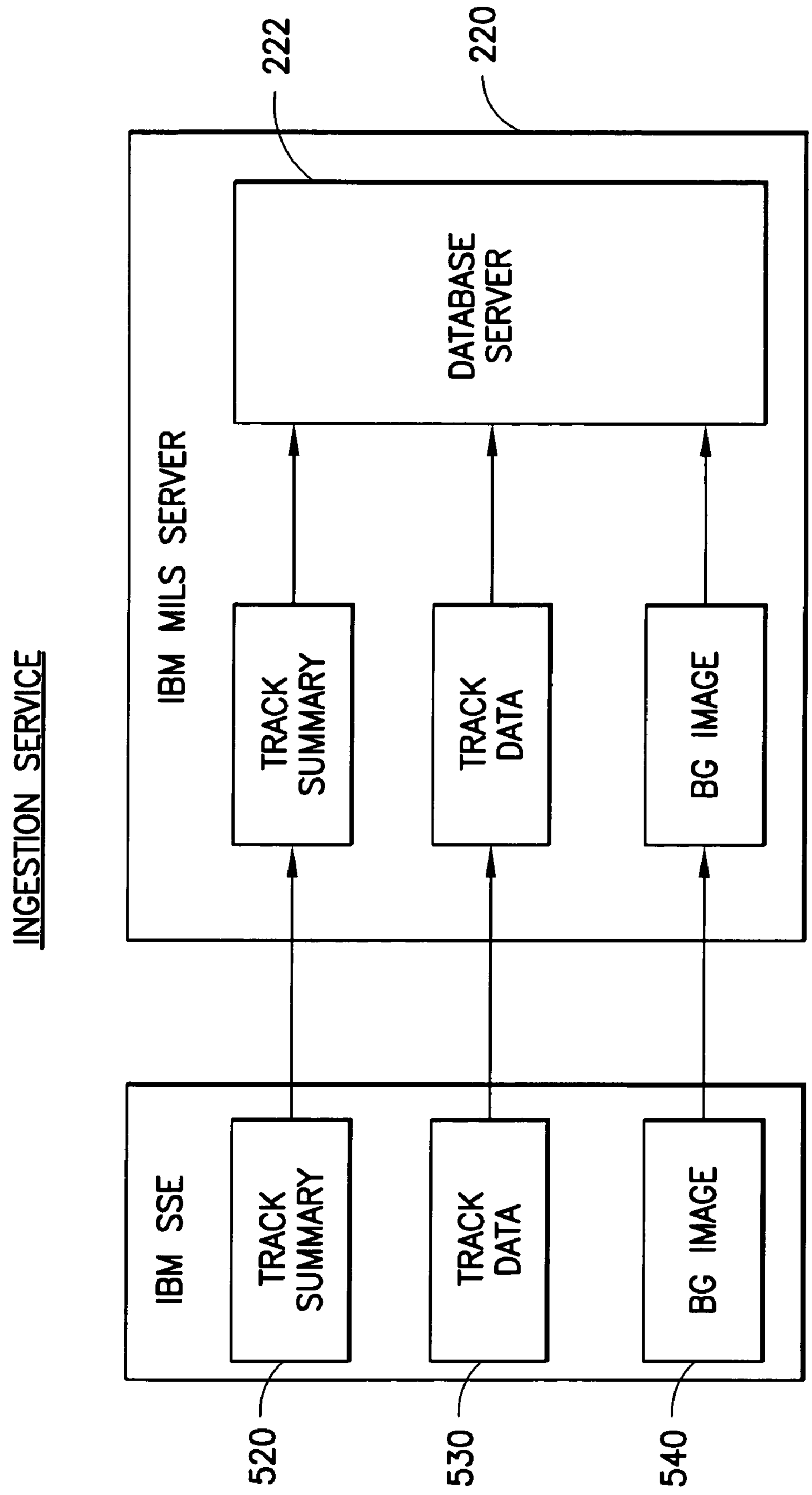
FIG. 18 depicts in schematic representation of data flow from a video analysis engine to an electronic database system in an electronic video surveillance system operating in accordance with one embodiment of the present invention.
Figure 19:
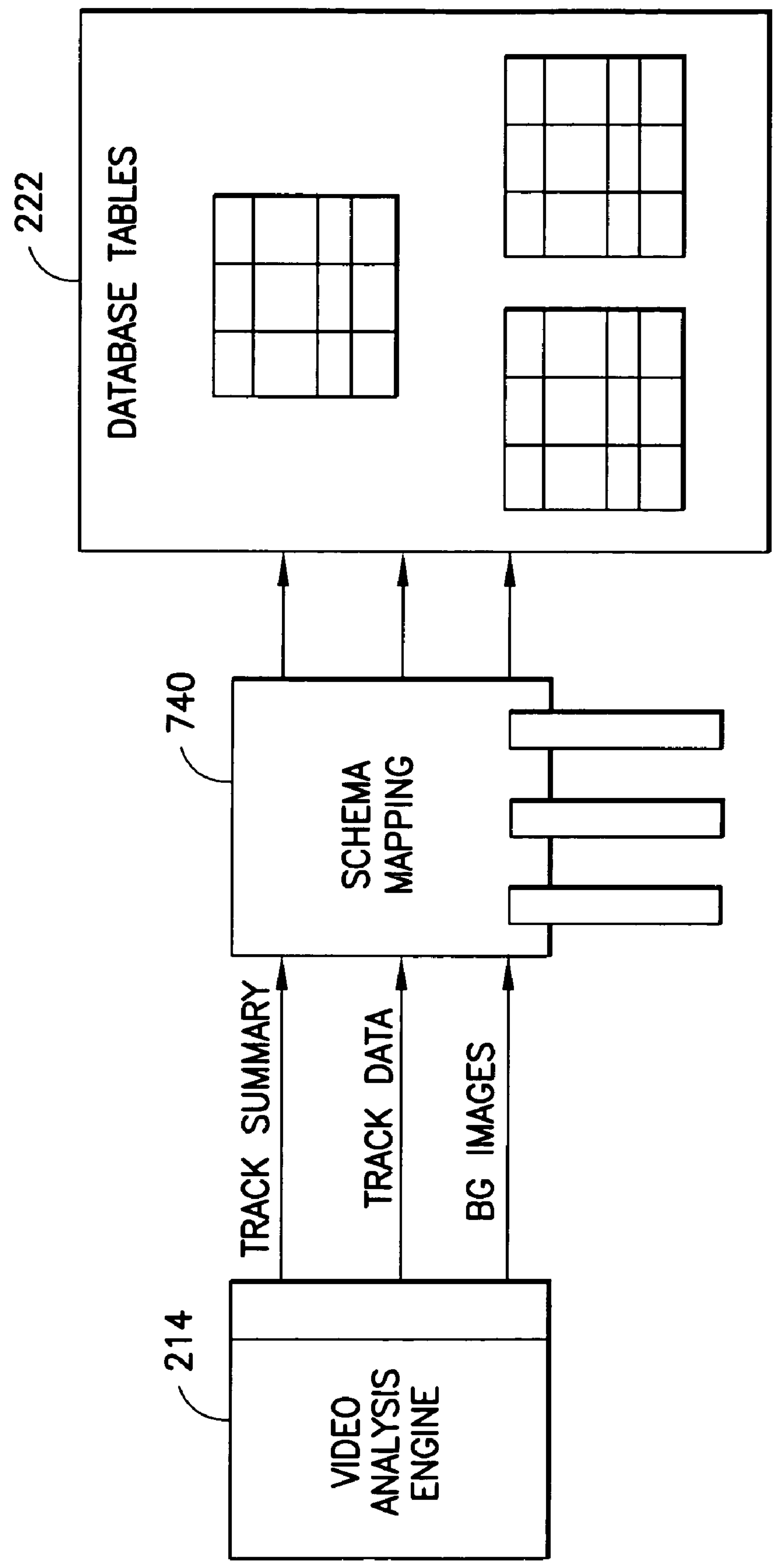
FIG. 19 depicts the flow of data from a video analysis engine to an electronic database system that in certain embodiments may occur in real- or near-real-time in a video surveillance camera system operating in accordance with the present invention.

The ingestion of data created by the video analysis engine 214 into the database server of the electronic database system is depicted in FIGS. 18-19. As is apparent track summary 520; track data 530; and background image 540 XML documents are transmitted to the database server 220 where the data contained in the documents is remapped into the tables of the database server 222 according to schema mapping 740.

A particular advantage of the present invention is the ability to "push" data generated by the video analysis engines 214 to a video surveillance analyst in real- or near-real-time. In FIG. 19 certain categories of high-priority data are transmitted continuously to the database server of the electronic database system in near-real-time. The information received is mapped to the database tables by the schema mapping 740 established in accordance with the methods described with reference to FIGS. 14-16. This data is then available for operation on by, for example, alarm applications depicted in FIG. 4. For example, in one particular embodiment, vehicle velocity data can be transmitted in near-real time continuously to the database server 222. When a speed limit criterion is exceeded, the vehicle speed limit alarm application generates an alarm condition that is transmitted to the video surveillance analyst. The alarm can take many forms in accordance with the present invention; for example, an alarm associated with a keyframe containing the offending vehicle; an alarm associated with a text message identifying the offending vehicle; or an alarm associated with a looping video clip of the vehicle exceeding the speed limit.

Figure 20:
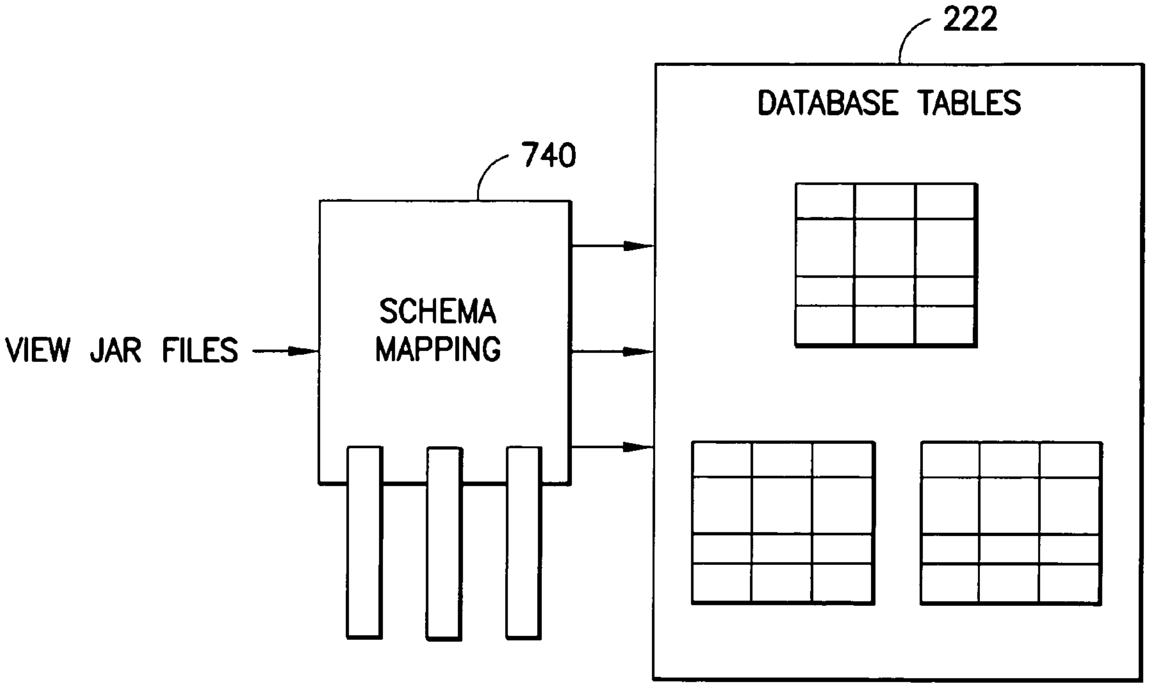
FIG. 20 depicts the flow of data from a video analysis engine to an electronic database system that in certain embodiments may occur in background mode or off-peak hours in a video surveillance camera system operating in accordance with the present invention.

Not all data created by the video analysis engines of a video surveillance system needs to be transmitted to the database server 222 of the electronic database system 220 in real time. In such situations data can be stored locally in accordance with the methods described with respect to FIG. 13. For example, all non-crucial data created by the video analysis engine 214 for a given day can be saved to ajar file for local storage on a hard disk associated with the video analysis engine. At a pre-selected off-peak time of the day, the jar file is transmitted to the database server as depicted in FIG. 20. The data comprising the jar file is then remapped by schema mapping 740 for storage in the database server 222.

The local archiving of data is controlled by a data archiving service manager operating either as part of the video analysis engine or independently. The data archiving service manager actively monitors a view result; archives data; and manage data ingestion into the local temporal-based database. The service relies on user-specified policy parameters to indicate how data should be archived and/or when an archival ingestion should happen. For example, a video surveillance analyst could specify that only data from today should be kept and the rest of the data should be archived, and at the end of today to send the electronic database system a view jar file of today to ingest. The following basic functions can be used to implement the service:

Jar-File JarView(Root-View-Path)

Jar-File JarTemporalView(Root-View-Path, BGIMGES|FGIMAGES|VIDEOS|KEYFRAMES|XMLS, Temporal-Path-1, Temporal-Path-2

Jar-File ListTemporalView(Jar-File, BGIMGES|FGIMAGES|VIDEOS|KEYFRAMES|XMLS, Temporal-Path-1, Temporal-Path-2)

Jar-File ExtractTemporalView(Jar-File, BGIMGES|FGIMAGES|VIDEOS|KEYFRAMES|XMLS, Temporal-Path-1, Temporal-Path-2)

Jar-File MergeTemporalView(Jar-File-1, Jar-File-2)

UnjarTemporalView(Jar-File, BGIMGES|FGIMAGES|VIDEOS|KEYFRAMES|XMLS, Temporal-Path-1, Temporal-Path-2

The immediately preceding description concerned data archiving in accordance with the methods and apparatus of the present invention. The next feature to be described concerns event retrieval. A particular advantage of the present invention is the rich database of object and activity statistics and track data. This information can be accessed in near-real-time to assist in, for example, policing activities, or much later in time to assist in, for example, investigative activities. The event retrieval feature of the present invention automates the retrieval of event and object data in response to automatic triggers and surveillance analyst queries.

Figure 21:
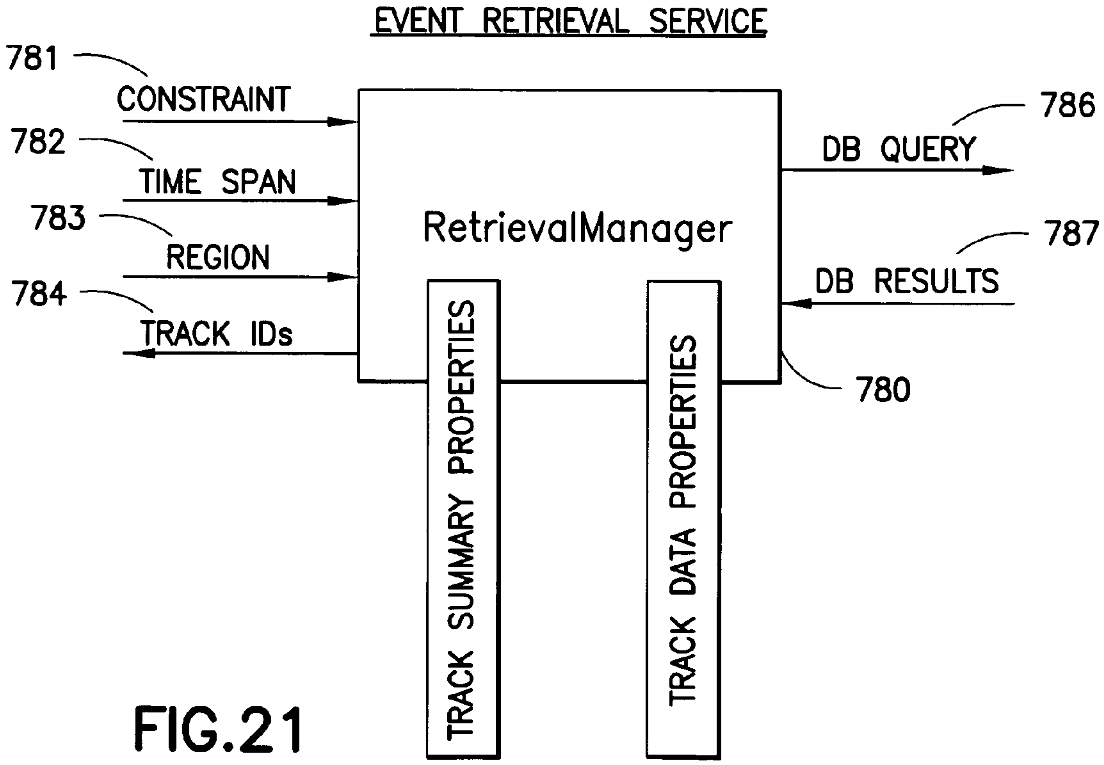
FIG. 21 depicts a conceptual block diagram of the control flow in an event retrieval module incorporated in a distributed video surveillance camera system operating in accordance with the present invention.

After receiving a query, the event retrieval service performs a search of the database to retrieve information stored in the database server responsive to the request. The data and control flow associated with this activity is illustrated in the block diagram depicted in FIG. 21. In the data and control flow diagram, the event retrieval manager receives a surveillance analyst queries that generally concern an object or event constraint 781; or a time span 782; or a region under surveillance 784 and formulates a database query 786 based on the original user query. The database server then returns the results at 787 and the track data is forwarded to the video surveillance analyst at step 784.

Figure 22:
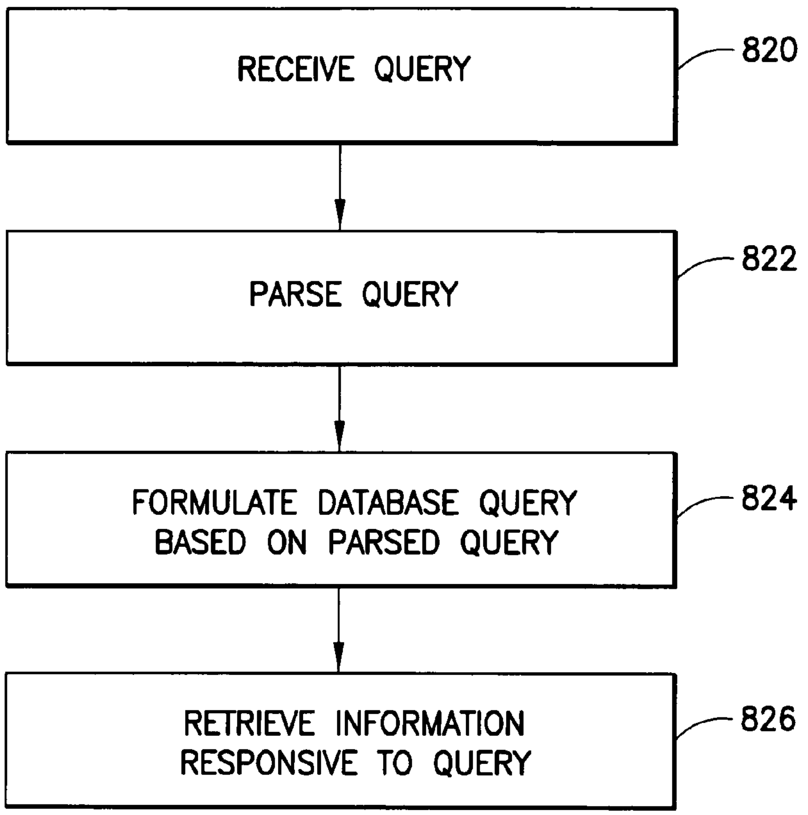
FIG. 22 depicts steps of a method for retrieving event information from an electronic database system of a video surveillance camera system operating in accordance with the present invention.

FIG. 22 depicts the steps of a method for performing event and object data retrieval in a video surveillance system operating in accordance with the present invention. At step 820, the event retrieval manager 780 receives a query. Then at step 822, the event retrieval manager parses the query, and formulates at step 824 a new query in a format expected by the database server 222. Next, at step 826, based on the database query, responsive information is retrieved.

Figure 23:
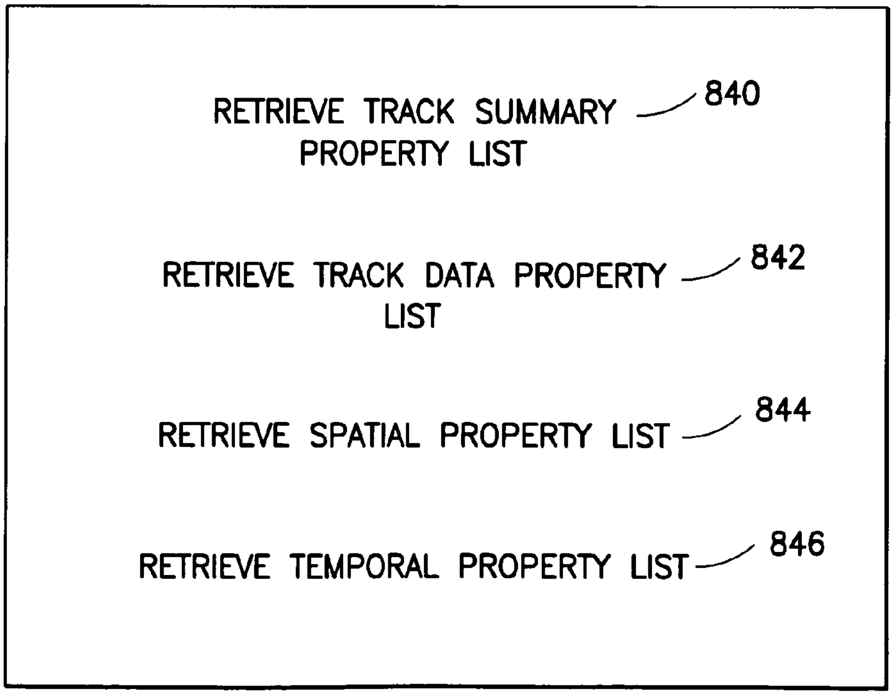
FIG. 23 depicts additional operations available for managing the retrieval of event information from an electronic database system of a video surveillance camera system operating in accordance with the present invention.

FIG. 23 illustrates other operations that can be performed by the electronic database server. Those operations are retrieve track summary property list 840; retrieve track data property list 842; retrieve spatial property list; and retrieve temporal property list 846.

Various user queries can be formulated by a video surveillance analyst. For example, the following are three examples of property-based queries that may be created by video surveillance analysts and received by the event retrieval manager at step 820:

DoSummaryQuery("PCS($p_1$, $p_2$, $p_3$, . . . , $p_m$)")

DoDataQuery("PCD($p_1$, $p_2$, $p_3$, . . . , $p_n$)")

DoSDQuery("PCS($p_1$, $p_2$, $p_3$, . . . , $p_m$)", ("PCD($p_1$, $p_2$, $p_3$, . . . , $p_n$)")

The "DoSummaryQuery" is a request for track summary information, and $p_1$, etc. are search parameters relating to, for example, object classes; object characteristics; or event class. The "DoDataQuery" is a request for track data information comprising, for example, object trajectory information. The "DoSDQuery" is a combination request seeking track summary and track data information.

The following are examples of temporal-based queries:

DoTSummaryQuery("PCS($p_1$, $p_2$, $p_3$, . . . , $p_m$)", "TC (start_time, end_time)")

DoTDataQuery("PCD($p_1$, $p_2$, $p_3$, . . . , $p_n$)", "TC(start_time, end_time)")

DoTSDQuery("PCS($p_1$, $p_2$, $p_3$, . . . , $p_m$)", "PCD($p_1$, $p_2$, $p_3$, . . . , $p_n$)", "TC(start_time, end_time)")

These requests are formulated similar to the property-based requests except they are further delimited by a time criterion "TC(start_time, end_time)".

The following are example of spatial-based queries:

DoSSummaryQuery("PCS($p_1$, $p_2$, $p_3$, . . . $p_m$)", "SC($l_1$, $l_2$, $l_3$, . . . , $l_1$)")

DoSDataQuery("PCD($p_1$, $p_2$, $p_3$, . . . $p_n$)", "SC($l_1$, $l_2$, $l_3$, . . . , $l_1$)")

DoSSDQuery("PCS($p_1$, $p_2$, $p_3$, . . . $p_m$)", ("PCD($p_1$, $p_2$, $p_3$, . . . $p_n$)", "SC($l_1$, $l_2$, $l_3$, . . . , $l_1$)")

Spatial-based queries concern specific portions of a field of view of a video surveillance camera and seek information concerning objects entering the specified portion of a field of view, or events or activities occurring in the specified field of view. In embodiments with this capability the video analysis engine 214 creates data concerning where in a field of view an object entered or an event occurred.

The following is an example of a spatial-temporal based query:

DoSTSummaryQuery("PCS($p_1$, $p_2$, $p_3$, . . . , $p_m$)", "SC($l_1$, $l_2$, . . . , $l_1$), "TC(start_time, end_time)"

This request is a combination temporal-spatial request seeking information concerning activities or events occurring in specified portion of a field of view over a specified time period.

Various queries can be posed to the database of video track information. For example, after the event retrieval manager 780 has parsed the user query, and reformulated the query in a format the database server can understand, the event retrieval manager may issue one of the following queries. For example, the following query will retrieve tracks identifying all members of a particular class observed by the video surveillance system:

Select Track ID
From MILS_Track_Summary_Tab
Where IdentityClassID=

The following query finds tracks containing a specific object (for example, a particular automobile) or a specific individual (for example, a particular person):

Select TrackID
From MILS_TRACK_SUMMARY_TAB
Where Identity=

The following query finds tracks associated with activity of a specified type (for example, tracks of all people entering a particular building):

Select TrackID
From MILS_TRACK_SUMMARY_TAB
Where ActivityClassID=

The following query finds tracks containing automobiles and other vehicles traveling faster than a specified speed:

Select TrackID
From MILS_TRACK_SUMMARY_TAB
Where AreaStatMax>

The following query finds tracks containing automobiles and other vehicles with a minimum speed slower than a given value:

Select TrackID
From MILS_TRACK_SUMMARY_TAB
Where VelStatMin<

The following query finds tracks containing similar properties:

Select TrackID, SFunction(?. FVBlob)
From MILS_TRACK_SUMMARY_TAB
Order By SFunction(?, FVBlob) ASC The following query can be very useful to detect loitering when duration is very long and detect noise (caused by, for example, sudden camera movements, swing trees, rain drops) when the duration is very short:

Select TrackID
From MILS_TRACK_SUMMARY_TAB
Where EndTimestamp-StartTimeStamo<

This query finds all tracks with centroid passing through a bounding box:

Select TrackID
From MILS_TRACK_SUMMARY_TAB
Where CentroidX> and
CentroidX< and
CentroidY> and
CentroidY<

When the track identifiers responsive to any of these example queries are returned, they are forwarded to whatever process or person requested them.

Figure 24:
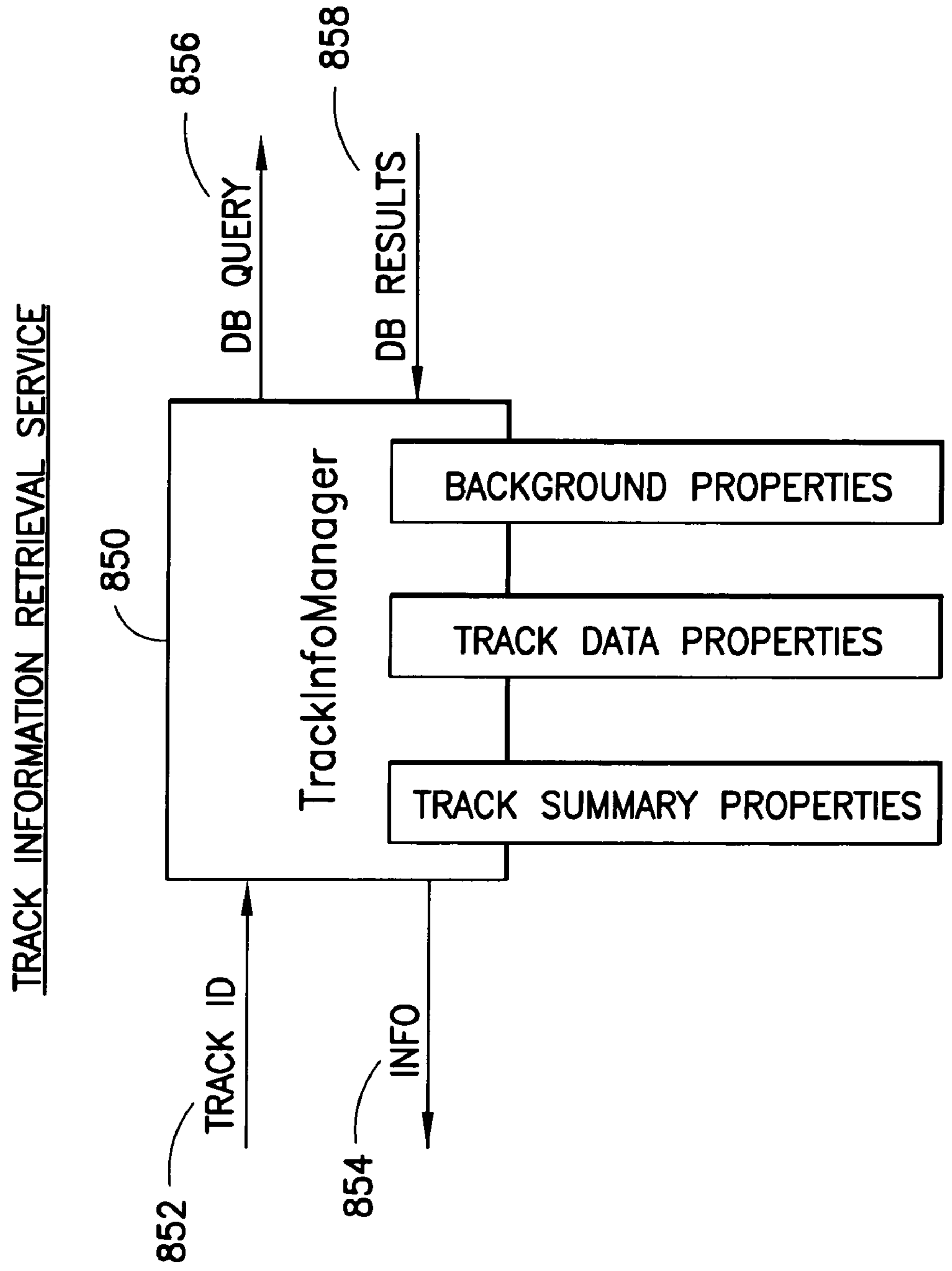
FIG. 24 depicts a conceptual block diagram of the control and data flow in a track information retrieval service incorporated in a distributed video surveillance camera system operating in accordance with the present invention.

FIG. 24 depicts the control and data flow associated with another feature of the present invention, the track information retrieval service. As is apparent from the control and data flow, the track information manager 850 receives a request 852 for information associated with a particular track identifier and issues a database query 856 to retrieve information associated with that track identifier. The track information manager receives in return information 858 associated with the track identifier, which may consist of track summary properties; track data properties; and background properties. In addition, the information may further comprise pointers to keyframes, videos or statistics related to that track identifier. The information returned is then transmitted 854 to the video surveillance analyst.

Figure 25:
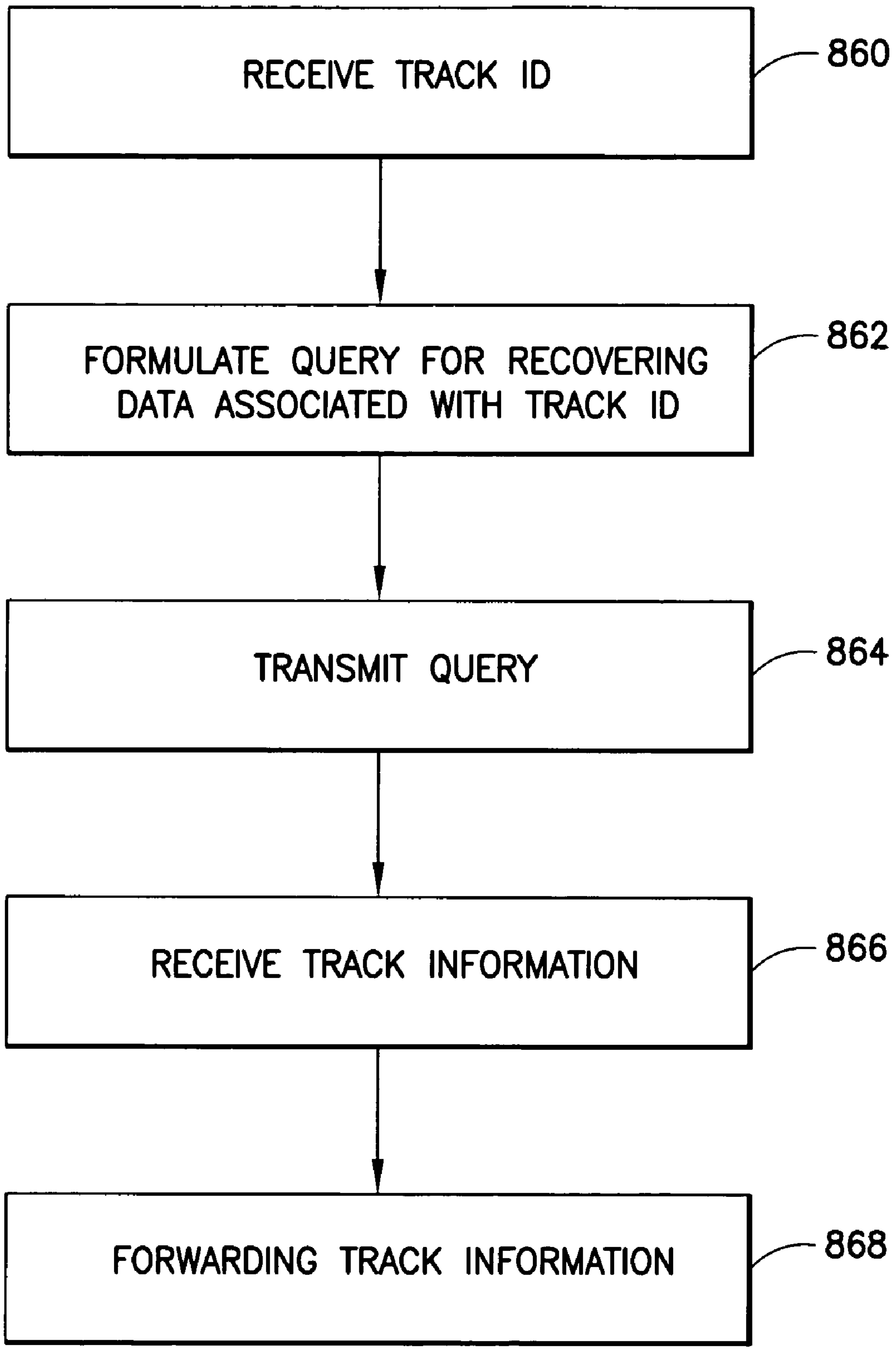
FIG. 25 depicts the steps of a method for managing track information retrieval in a distributed video surveillance camera system operating in accordance with the present invention.

FIG. 25 depicts the steps of a method for performing track information retrieval in a distributed video surveillance system operating in accordance with the methods and apparatus of the present invention. At step 860, the track information retrieval manager receives a track identifier 860. Then at step 862, the track information retrieval manager formulates a database query for retrieving information associated with the track identifier. Next, at step 864 the query is transmitted to the database server 222. Then, at step 866 the track information retrieval manager receives track information responsive to the query, which is then forwarded to the process or person that requested the information at step 868.

Figure 26:
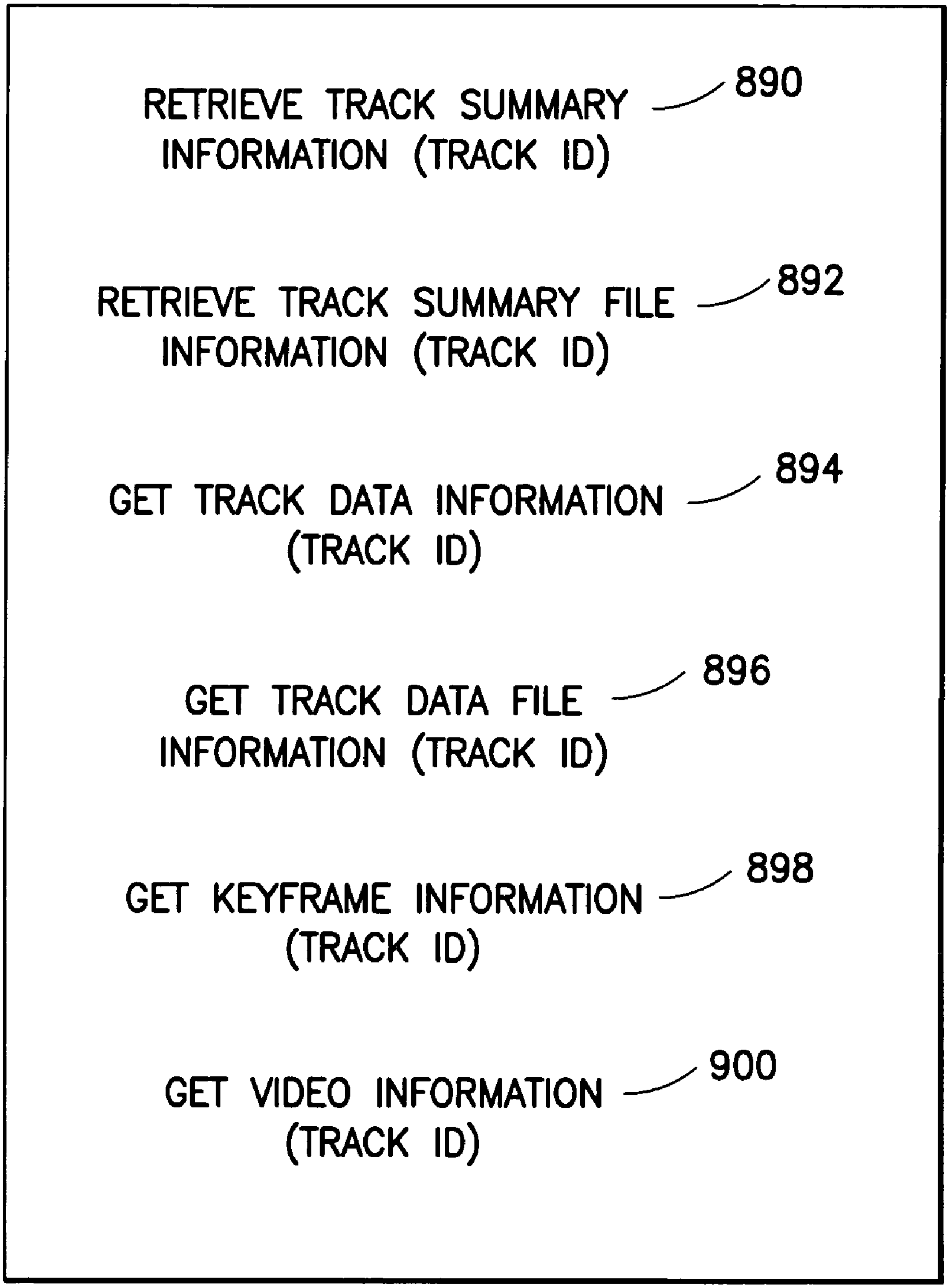
FIG. 26 depicts additional operations available for managing track information retrieval in a distributed video surveillance camera system operating in accordance with the present invention.

FIG. 26 depicts additional operations that may be performed by the track information retrieval service, for example, retrieve track summary information 890; retrieve track summary file information 892; retrieve track data information 894; retrieve track data file information 896; retrieve keyframe information 898; and retrieve video pointer information 900.

Figure 27:
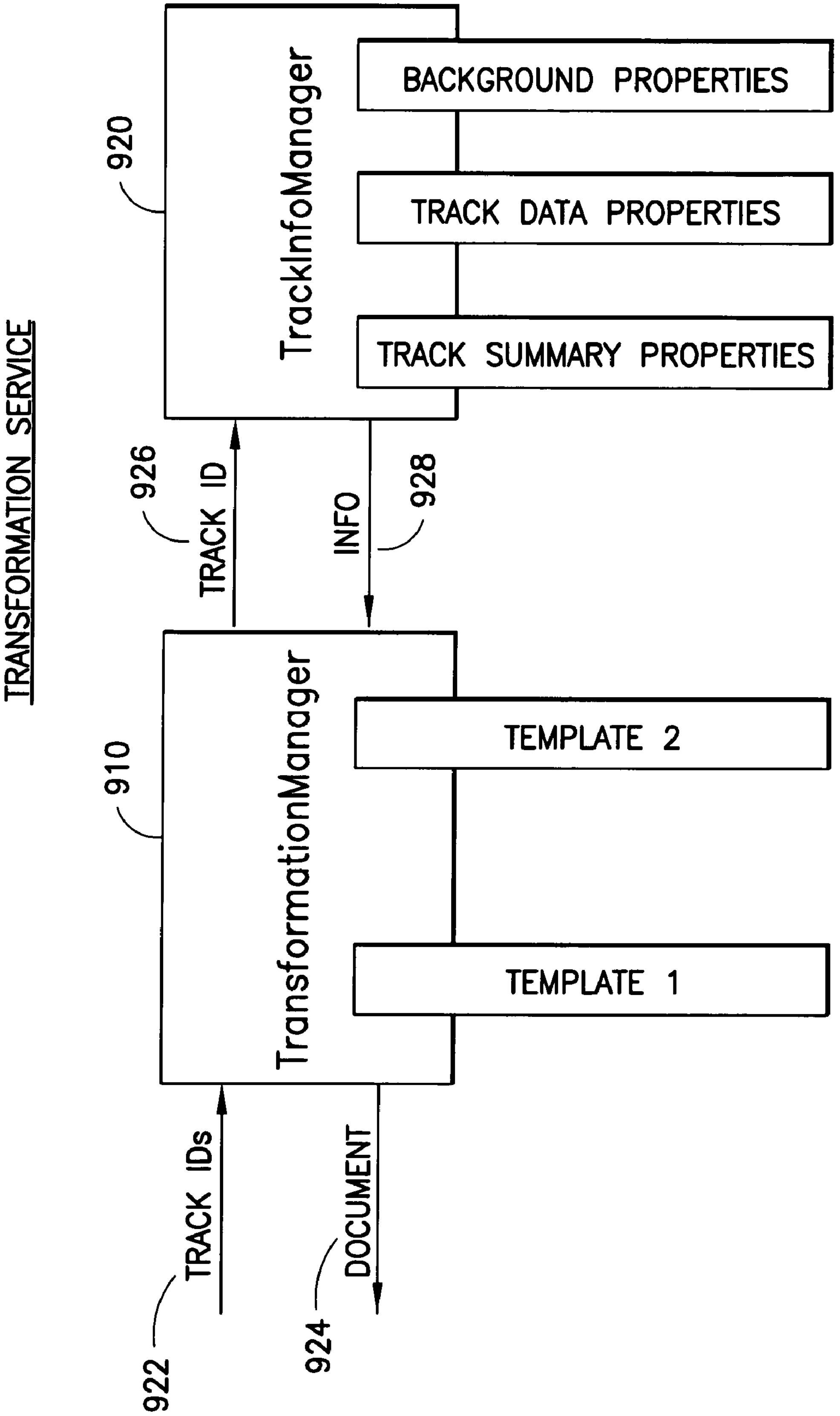
FIG. 27 depicts the control and data flow of a data transformation service incorporated in a distributed video surveillance camera system operating in accordance with the present invention.

FIG. 27 depicts the transformation service of the present invention. In response to queries from video surveillance analysts, the database server and video server will be retrieve information responsive to the queries. Typically the information will not be in a format suitable for presentation to the video surveillance analyst in its native format in which it is stored in the database server. Accordingly, the transformation manager 910 receives information in the format in which it is stored in the electronic database from the track information manager 920 and formats the information for presentation to the video surveillance analyst. This formatting typically comprises several diverse operations to accommodate the various formats stored in the database.

Figure 28:
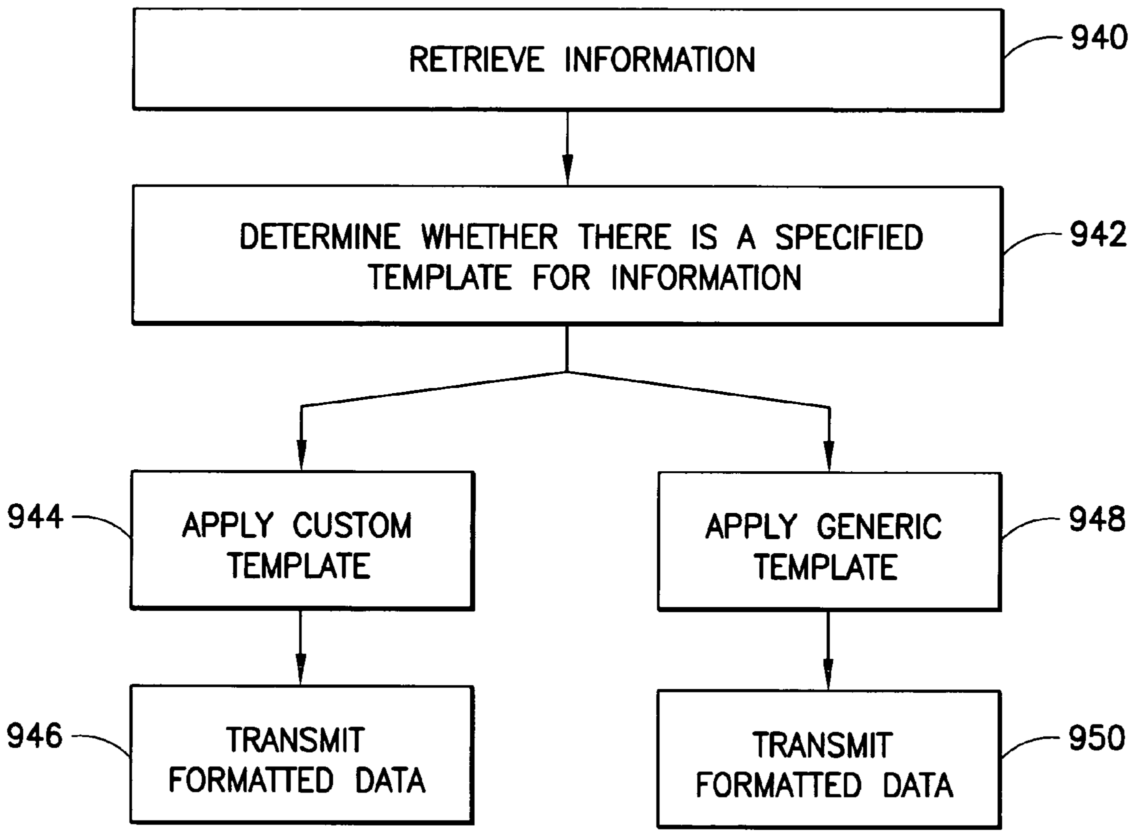
FIG. 28 depicts the steps of a method for transforming the format of data retrieved from the electronic database system in a distributed video surveillance camera system operating in accordance with the present invention.

FIG. 28 depicts the steps of a method associated with the transformation service of the present invention. In the first step 940, the information is retrieved from the electronic database. Then, at step 942 the transformation application determines whether a custom presentation template has been specified for the retrieved information. If so, the custom template is applied at step 944. If not, a standard template is applied at step 948. In either case, the information is then transmitted to the video surveillance analyst at steps 946 or 950.

Figure 29:
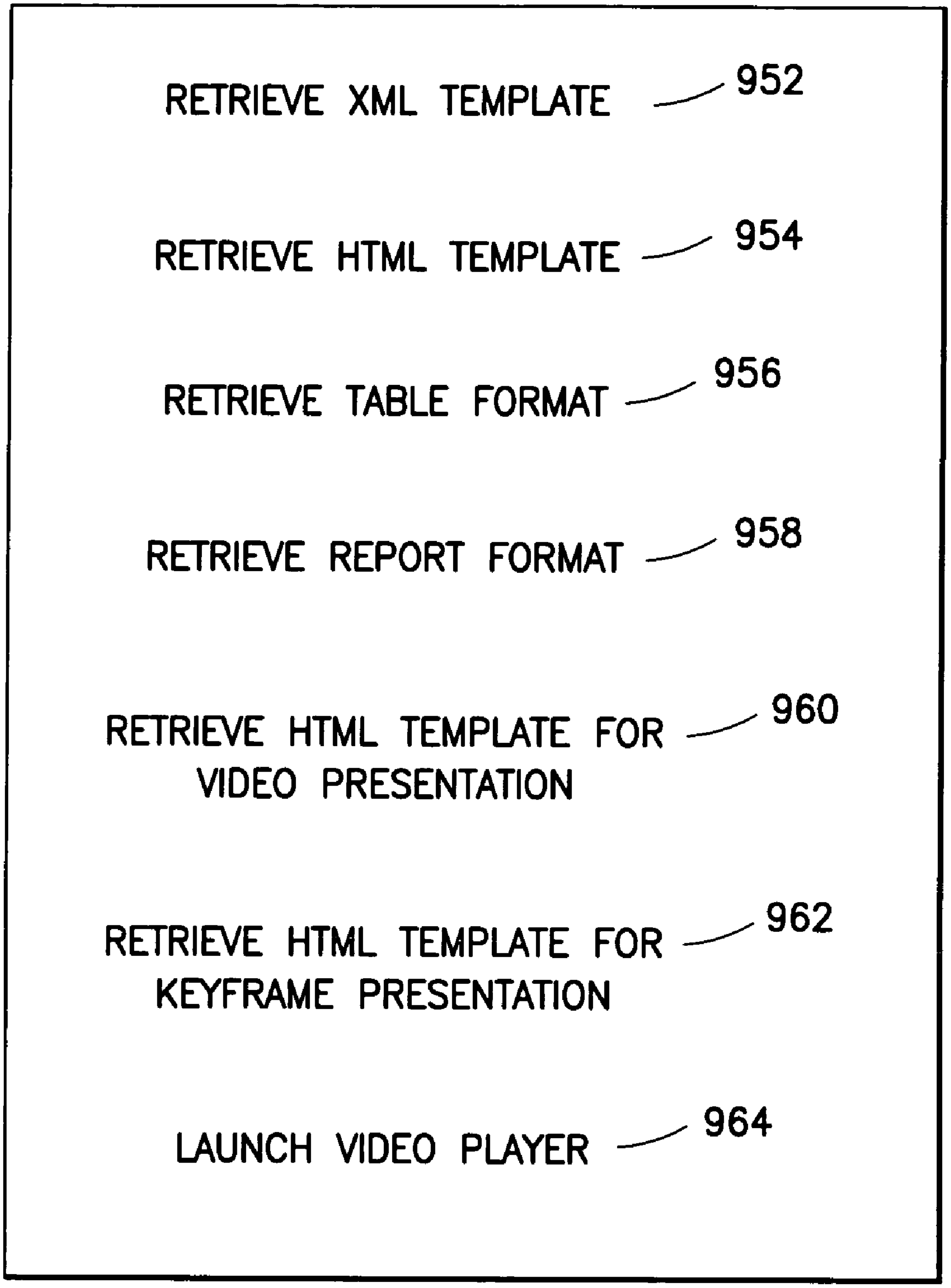
FIG. 29 depicts additional operations available in the transformation service of the present invention.

FIG. 29 depicts particular transformation options available in accordance with the present invention. For example, in certain embodiments the desired transformation operation 952 comprises formatting the data into an XML document. This may occur in situations where the information will be used by another video surveillance system component expecting data formatted according to a particular XML standard. In other embodiments, the information will be displayed to a video surveillance analyst. In such situations, the transformation service will perform an operation 954 to retrieve an HTML template for application to the data prior to display. In particular situations, this may comprise retrieving particular table 956 or report formats 958. In other situations, this may comprise retrieving the HTML format for keyframe 962 or video presentations 960. Finally in situations where video is to be played back, a video player will be launched 964.

Figure 30:
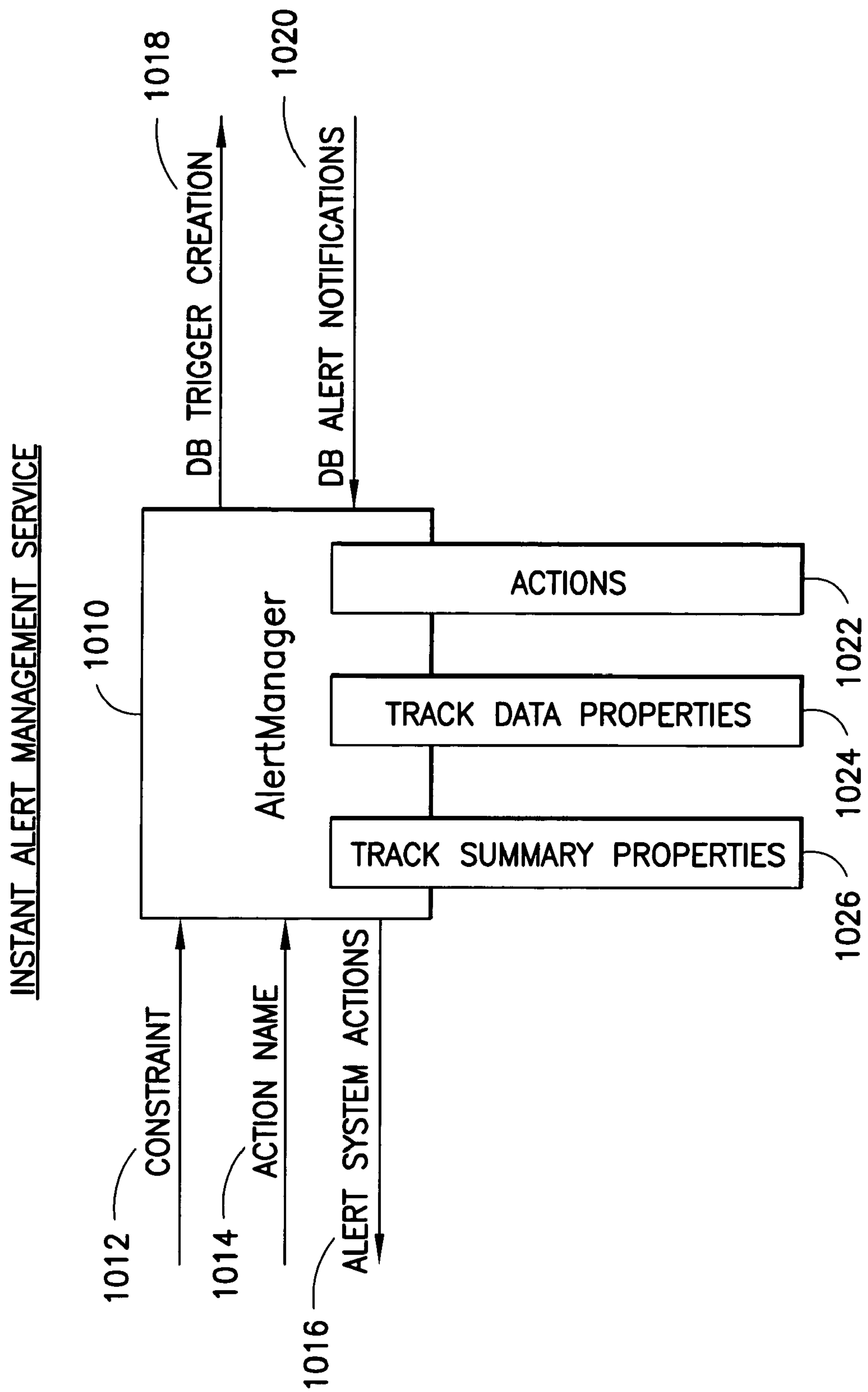
FIG. 30 is a block diagram depicting the control and data flow of an instant alert management service incorporated in a video surveillance system operating in accordance with the present invention.

Another feature of the present invention is the instant alert management service. As expressed throughout this specification, a particular advantage of a distributed electronic video surveillance system operating in accordance with the present invention is the ability of the system to perform real-time or nearly-real-time alerts based on video analysis performed by the electronic video surveillance system. FIG. 30 is a block diagram depicting the control flow associated with the instant alert management service of the present invention. An alert is implemented in the following manner. A video surveillance analyst programs the alert manager through alert constraints or criteria 1012 and desired action and name of action at 1014. As indicated in the control flow diagram, the instant alert manager 1010 interacts with the database server 222. The instant alert manager creates a trigger in the database server at 1018, and once the trigger is established, receives alert notifications from the database at 1020. The instant alert manager 1010 is also programmed to take system actions 1022 and possibly return track data 1024 and track summary properties 1026 when issuing alert actions at 1016.

Figure 31:
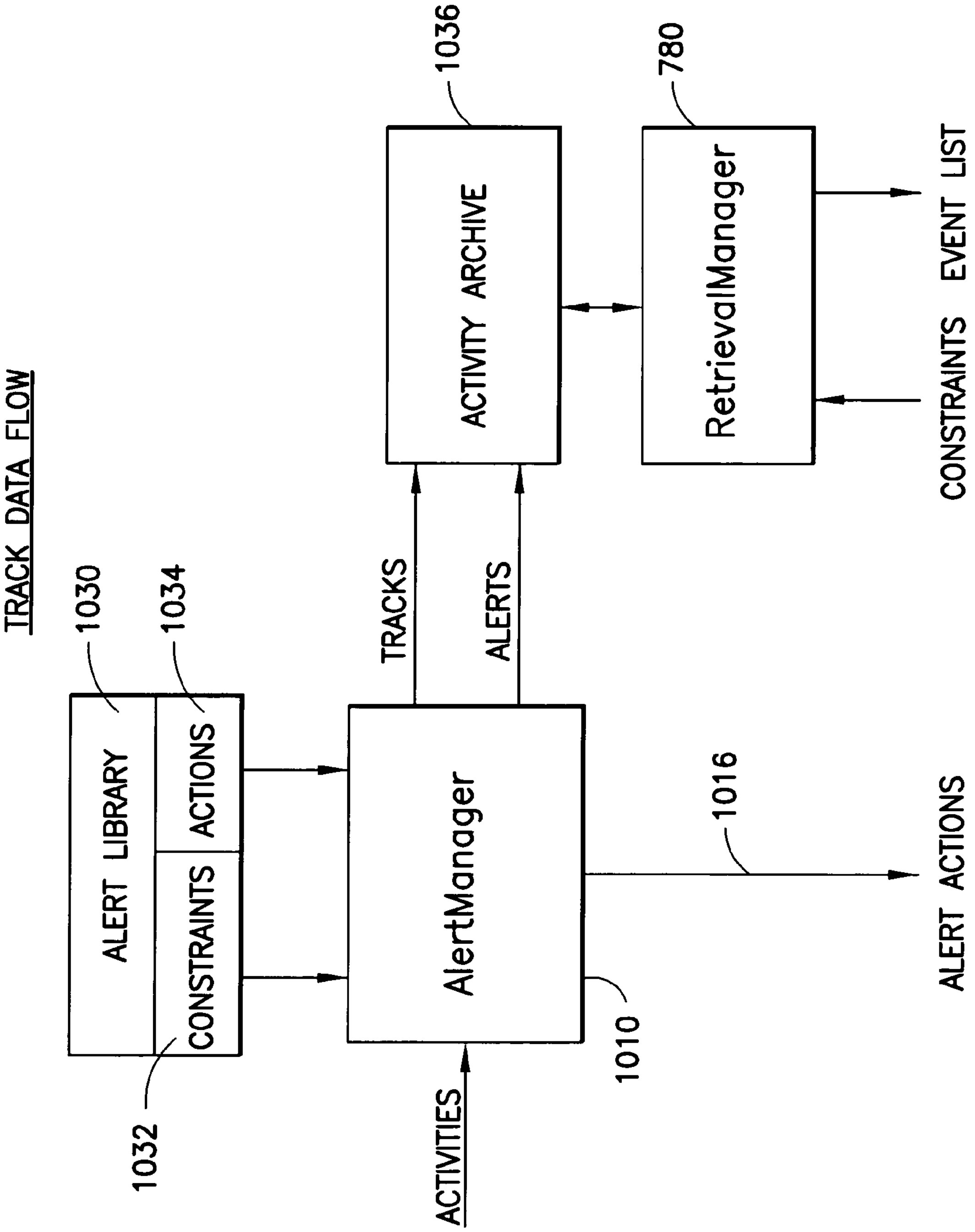
FIG. 31 is a block diagram depicting the track data flow in an instant alert management service operating in accordance with the present invention.

FIG. 31 is a block diagram depicting the track data flow associated with the instant alert manager service in a video surveillance system operating in accordance with the present invention. The instant alert manager 1010 acts upon pre-programmed alerts stored in instant alert library 1030. The pre-programmed alerts comprise alert constraints or criteria 1032 and actions 1034 to be taken upon occurrence of the alert criteria. Activities shown flowing into the instant alert manager comprise activity reporting by the database server 222, and may further comprise pre-programmed triggers. Trigger events need not be specifically programmed in the database server; rather in some embodiments the instant alert manager 1010 may monitor a data stream received from the database server 222. As alerts are issued, the alert event and track data associated with the alert event are stored in an alert activity archive 1036. The alert event and track data associated with the alert event can be retrieved by the event retrieval manager 780.

Figure 32:
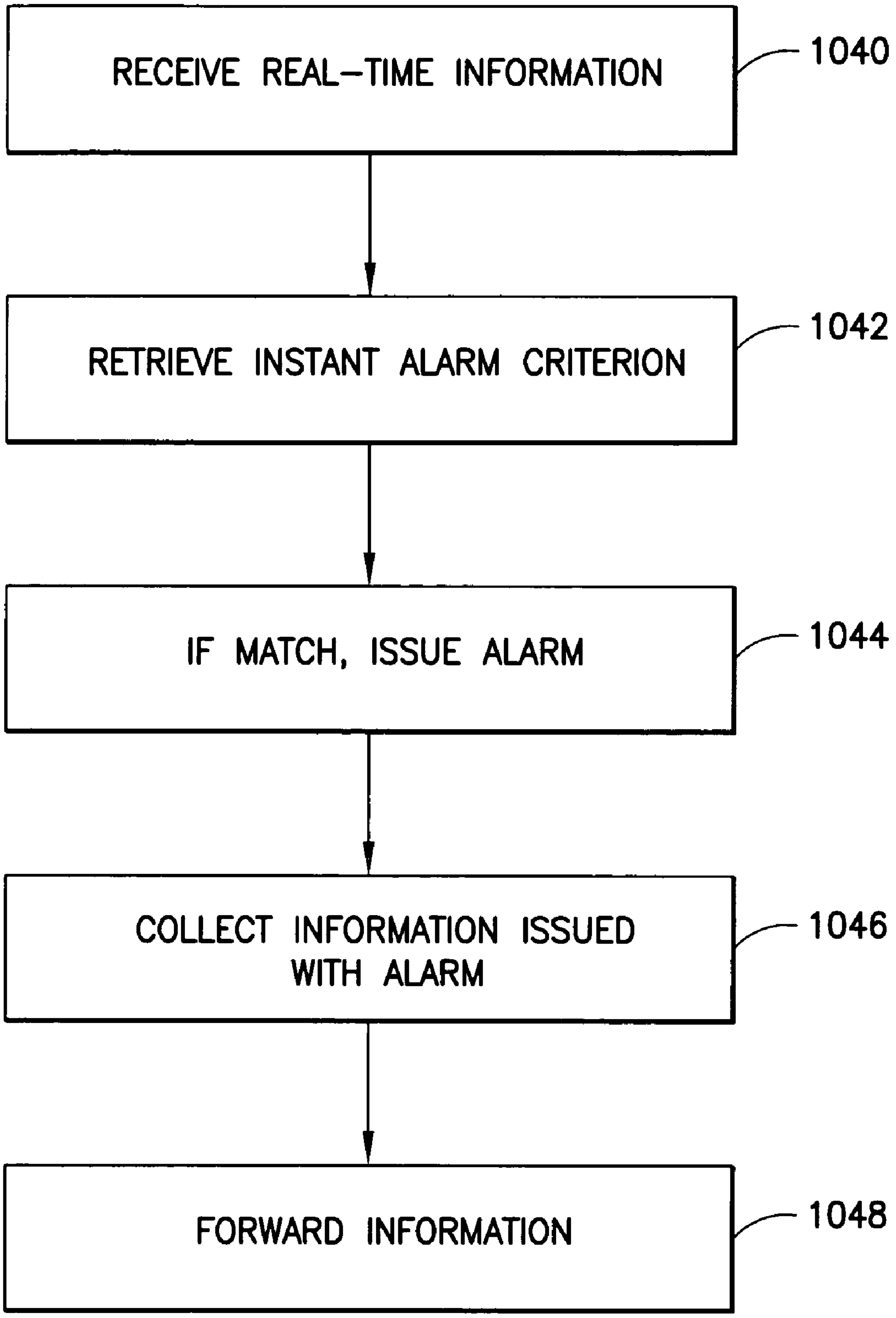
FIG. 32 depicts the steps of a method performing the instant alert management service of the present invention.

A method in accordance with the instant alert service is depicted in FIG. 32. At step 1040, the instant alert service manager receives information that has been forwarded by the video analysis engine 214 in real- or near-real time. Then at step 1042, the instant alert service manager retrieves the instant alert alarm criterion which is typically expressed in terms of some data condition, for example, "vehicle speed is greater than x mph", and compares the data received in real time. If there is a match, an alarm is issued at step 1044. In an alarm condition, the information that is typically issued in association with the alarm is collected at step 1046 and forwarded to the process or video surveillance analyst to be alerted at step 1048.

Figure 33:
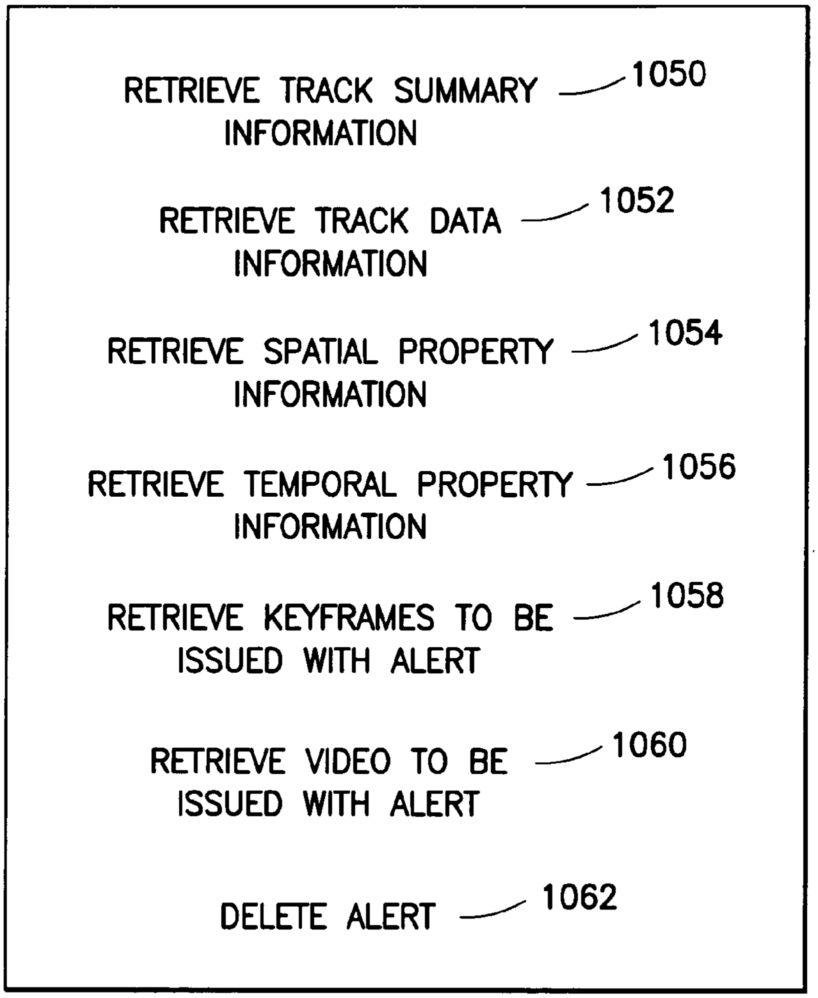
FIG. 33 depicts additional operations available in the instant alert management service of the present invention.

Additional operations that may be performed by an instant alert manager operating in accordance with the present invention are depicted in FIG. 33 and comprise retrieving track summary information to be issued with the alert 1050; retrieving track data information to be issued with the alert 1052; retrieving spatial property information to be issued with the alert 1054; retrieving temporal property information to be issued with the alert 1058; retrieving keyframes to be issued with the alert 1058; retrieving video to be issued with the alert 1060; and deleting the alert 1052.

Figure 34:
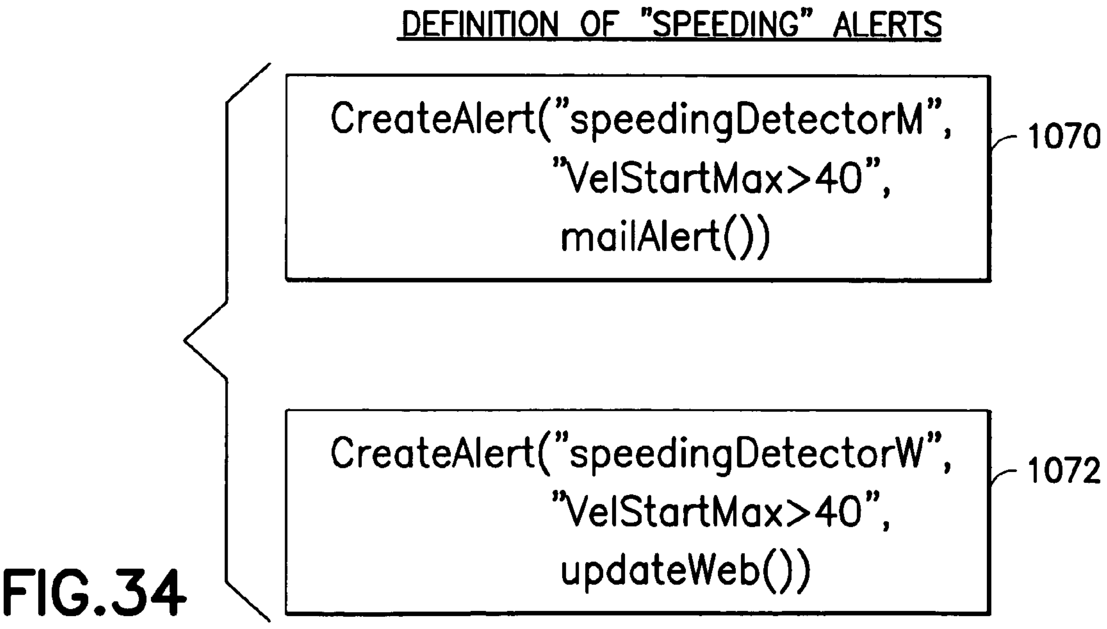
FIG. 34 depicts the establishment of a speeding alert definition for use by the instant alert management service of the present invention.
Figure 35:
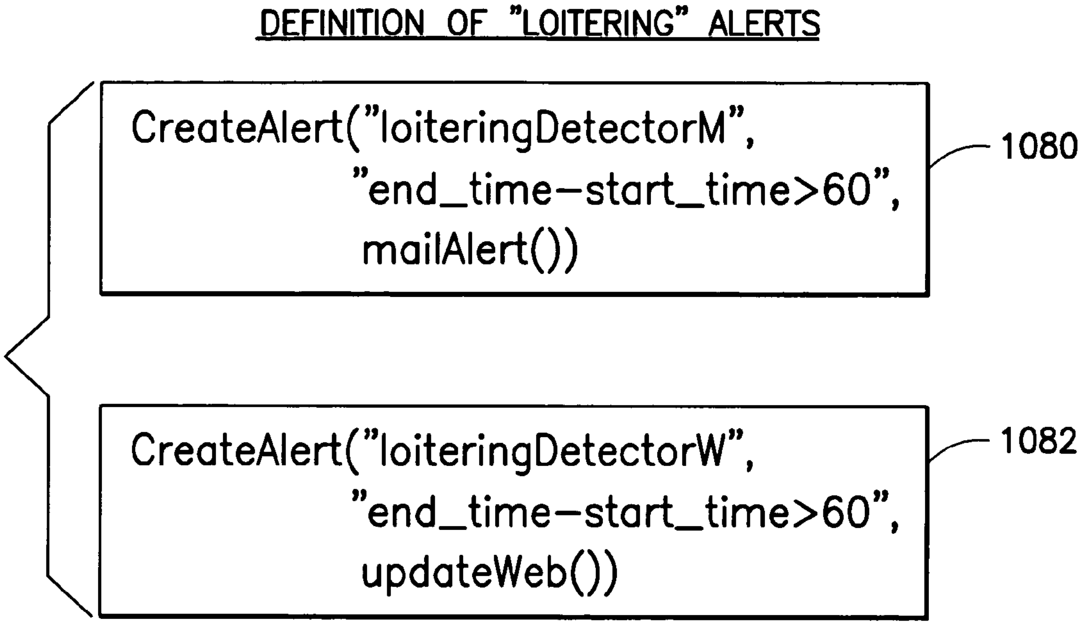
FIG. 35 depicts the establishment of a loitering alert definition for use by the instant alert management service of the present invention.

FIGS. 34 and 35 depict definitions of alerts formulated by a video surveillance technician and implemented in the video surveillance system by the instant alert manager 1010. As is apparent from consideration of the format of the "create alert" instruction, it is comprised of an alert name; an alert condition; and an action to be taken upon occurrence of the alert condition.

In the speeding alert instructions 1070, 1072 depicted in FIG. 34 the respective names for the alerts are "speedingDetectorM" and "speedingDetectorW". The respective alert conditions are the same—"velStatMax>40"—meaning that a vehicle has exceeded 40 mile per hour. The alert action in 1070 is to e-mail an alert, and in 1072 to update a browser page.

In the loitering alert instructions 1080, 1082 depicted in FIG. 35 the respective names for the alerts are "loiteringDetectorM" and "loiteringDetectorW". The respective loitering conditions are the same—"end_time—start_time>60"—meaning that a person has been loitering in a field of view of a video surveillance camera for longer than sixty minutes. The alert action in 1080 is to e-mail an alert, and in 1082 to update a browser page.

Figure 36:
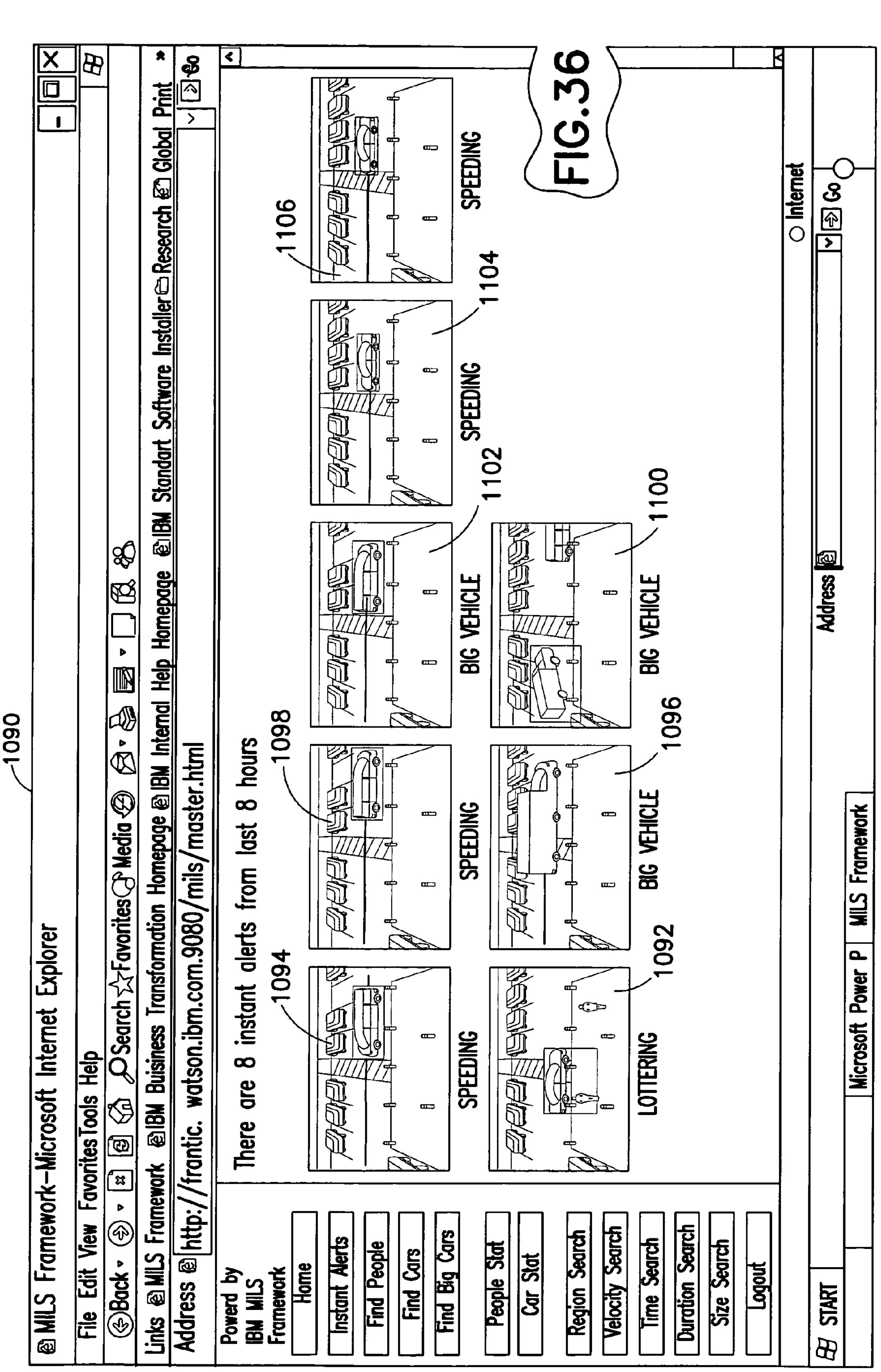
FIG. 36 depicts a browser page comprising an instant alert summary generated by the instant alert management service of the present invention.

FIG. 36 depicts web-based alerts issued by an instant alert manager operating in accordance with the present invention. As is apparent, the alerts were accumulated in a browser page 1090. The individual alerts were added as they occurred to the browser page 1090. The individual alerts comprise a title and keyframe. For example there are four speeding alerts recorded in the browser page 1094; 1098; 1104 and 1106; three large vehicle alerts 1096; 1100 and 1102; and one loitering alert 1092.

In the embodiment depicted in FIG. 36 alerts are issued accompanied by keyframes. In alternate embodiments, alert information may comprise a text message indicating time of occurrence; type of alert; and track identifier. In other embodiments, a video segment may be replayed. In any case, all data associated with the alert can be instantly retrieved. For instance, in the embodiment depicted in FIG. 36, when a video surveillance analyst places a cursor over the keyframe, additional information may be displayed in a bubble message. In other embodiments, a drop-down menu may appear with various options; for example, to recover track summary or track data information; to retrieve velocity information derived from video analysis; to retrieve other categories of temporal or spatial statistics describing the appearance and activities of an object or person; or to retrieve a video segment capturing the event which caused the alert.

Figure 37:
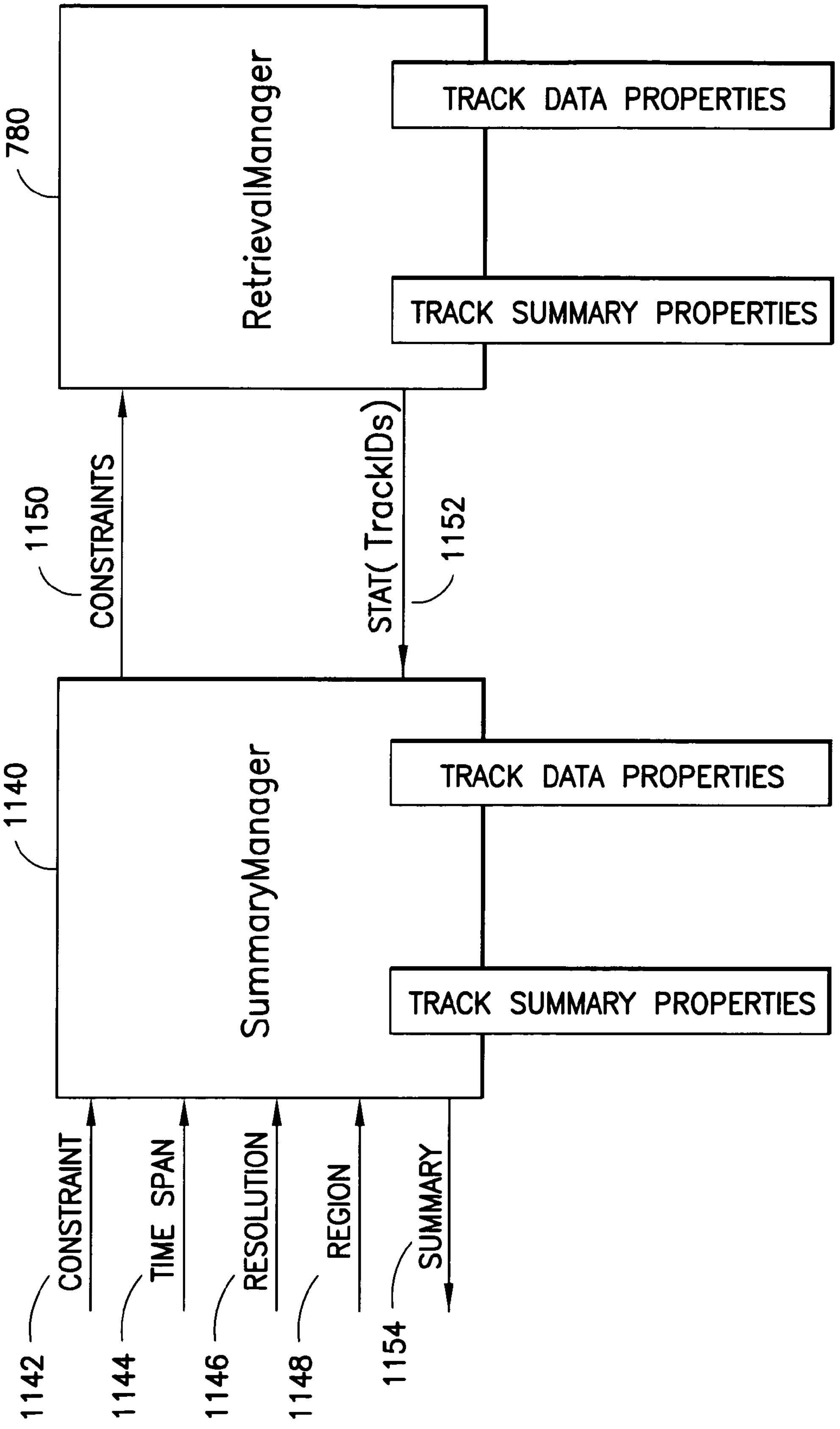
FIG. 37 is a block diagram depicting the control and data flow of a summary management service operating in accordance with the present invention.

FIGS. 37-48 depict the activity summary service of the present invention. Another advantage of the present invention is the ability to provide a wide range of summary information summarizing activities under video surveillance and video analysis. FIG. 37 is a block diagram depicting the control and data flow associated with the summary information manager 1140. As is apparent from FIG. 37, the summary manager 1140 receives queries for summary information subject to various conditions, for example object or activity constraints 1142; time span 1144; resolution 1146; and region 1148. Resolution 1146 refers to time increments and Region refers to a specific portion of a field of view under surveillance. The summary queries are generally formulated by video surveillance analysts interested in statistical information that may be derived from track and other categories of information generated by video analysis engines 214.

Based on queries received from video surveillance analysts, the activity summary manager 1140 relays the constraints 1150 to the event retrieval manager 780; this begins the information collection process by retrieving track identifiers satisfying the constraints. The track identifiers are returned at 1152. In addition, in other embodiments not depicted, the activity summary manager can retrieve track information associated with the track identifiers if this additional information is required to create the statistics sought by the video surveillance analyst. After the information necessary to generate the statistics has been retrieved, the activity summary manager generates the statistics and issues a summary at 1154.

In further embodiments, the activity summary manager interacts with the information transformation manager 910 to format the activity summary information in a manner specified by the video surveillance analyst.

Figure 38:
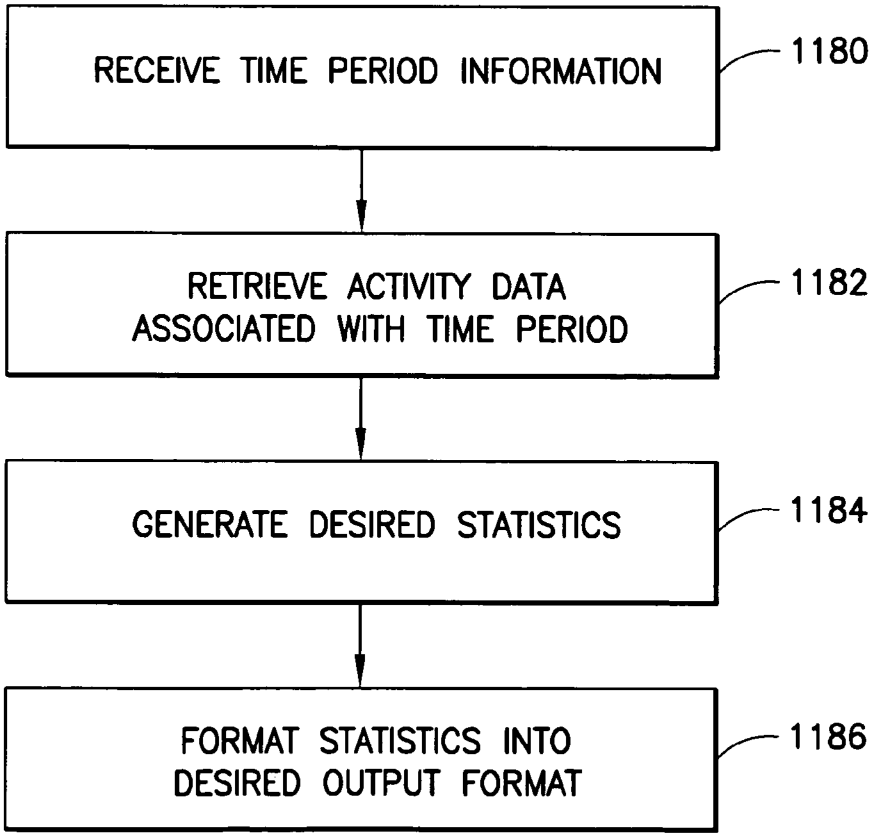
FIG. 38 depicts the steps of a method performing the summary management service of the present invention.

A method for performing activity summarization is depicted in FIG. 38 and comprises at least the following steps. At step 1180, the activity summarization service receives a time period selection from a process or video surveillance analyst desiring activity summary data corresponding to that time period. The activity summarization service then retrieves the activity data associated with the selected time period from the database server at step 1182. The activity summarization service then generates the desired statistics at step 1184, and formats the statistics into the desired output format at step 1186.

Additional operations that may be performed by the activity summary manager are depicted in FIG. 39 and correspond to retrieving a track summary property list 1210; retrieving a track data property list 1212; retrieving a spatial property list 1214; retrieving a temporal property list 1216; retrieving a temporal summary 1218 subject to start time, end time, resolution and region constraints; retrieving a spatial summary 1220 subject to start time, end time, region and resolution constraints; and retrieving a property summary 1222 subject to property, start time, end time and region constraints.

Figure 40:
FIG. 40 depicts a chart and browser page of keyframes generated by the summary management service of the present invention summarizing human activity.
Figure 40A:
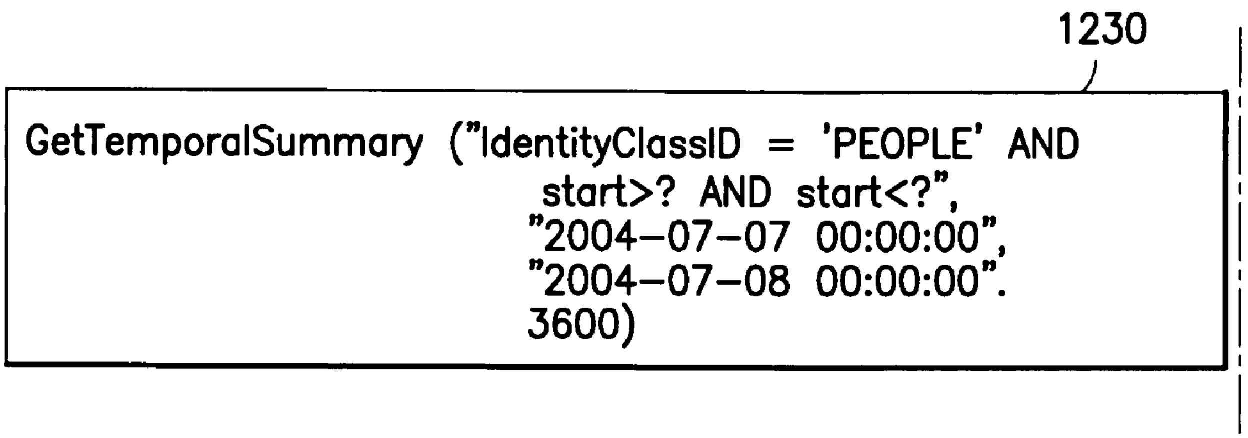
Figure 40B:
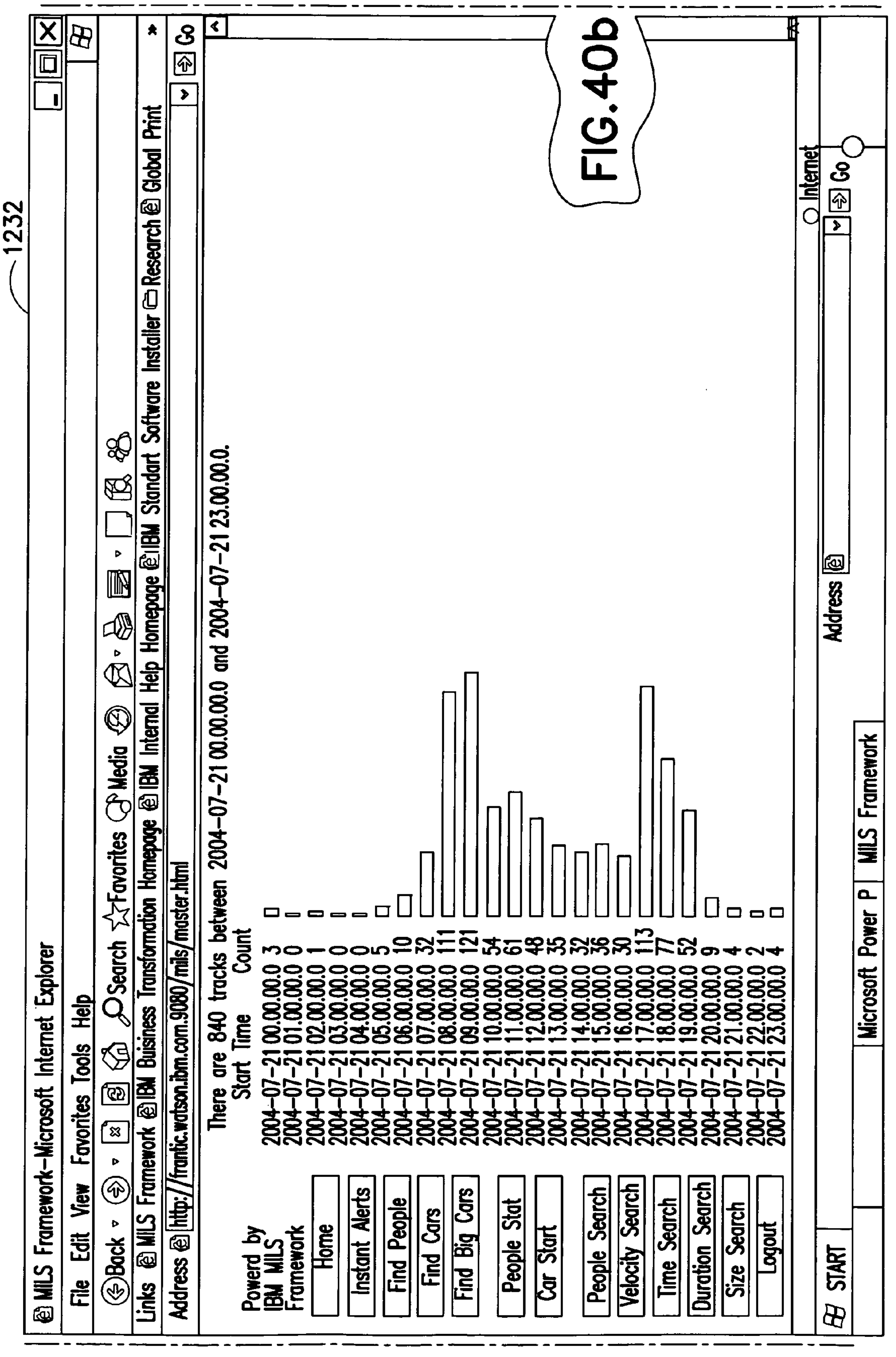
Figure 40C:
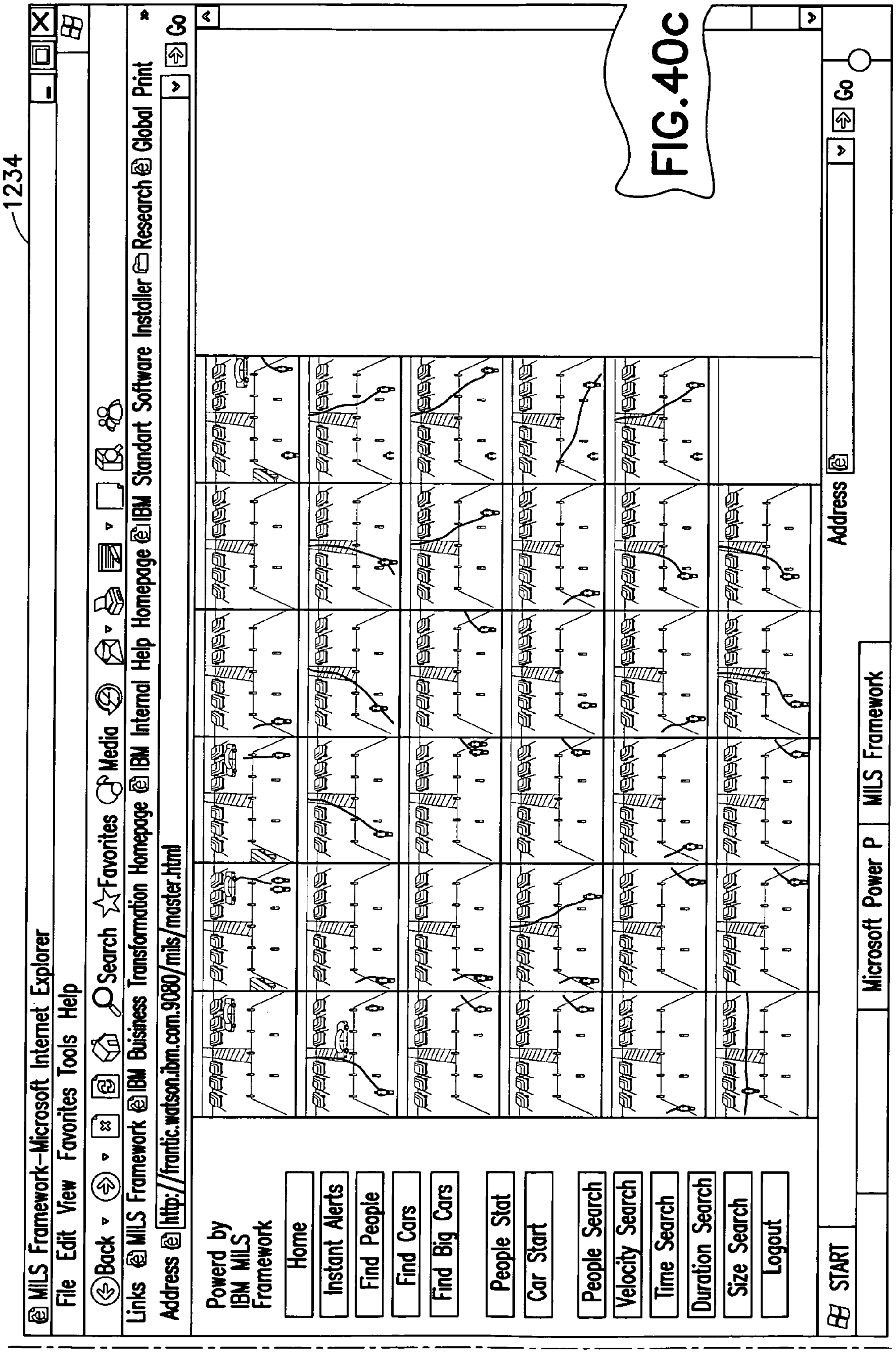

FIG. 40 depicts browser pages 1232, 1234 returned in response to a query 1230 for a summary of human activity over the course of day divided by hour. The browser page 1232 on the left is a chart depicting the number of persons passing through a field of view of a video surveillance camera on a given day divided by hour. The browser page 1234 on the right side is a collection of keyframes that correspond to one of the hour segments from the chart on the left. In the present embodiment, a track is created whenever a specified surveillance criterion is satisfied. In the particular embodiment depicted in FIG. 40, a track is created whenever a person enters the field of view, and a keyframe of the event is generated as well. The track contains track summary information, and the track summary information comprises at least a pointer to the keyframe.

Accordingly, in the video surveillance system of FIG. 40, a video analysis criterion had been specified by a video surveillance analyst to monitor the appearance of persons over the course of a day for a particular camera view. As a person entered the field of view, a track was created, as well as a keyframe. In order to recover the information depicted in FIG. 40, a video surveillance analyst poses a query 1230 as depicted in FIG. 40, and the summary service acts on the track information generated through application of the specified criterion. The keyframes memorializing human activity can be recovered by selecting one of the bars of the bar chart. For example, if the video surveillance analyst selected the first bar, three keyframes would be depicted in the browser on the right. In 1234, a different time period has been selected.

Figure 41B:
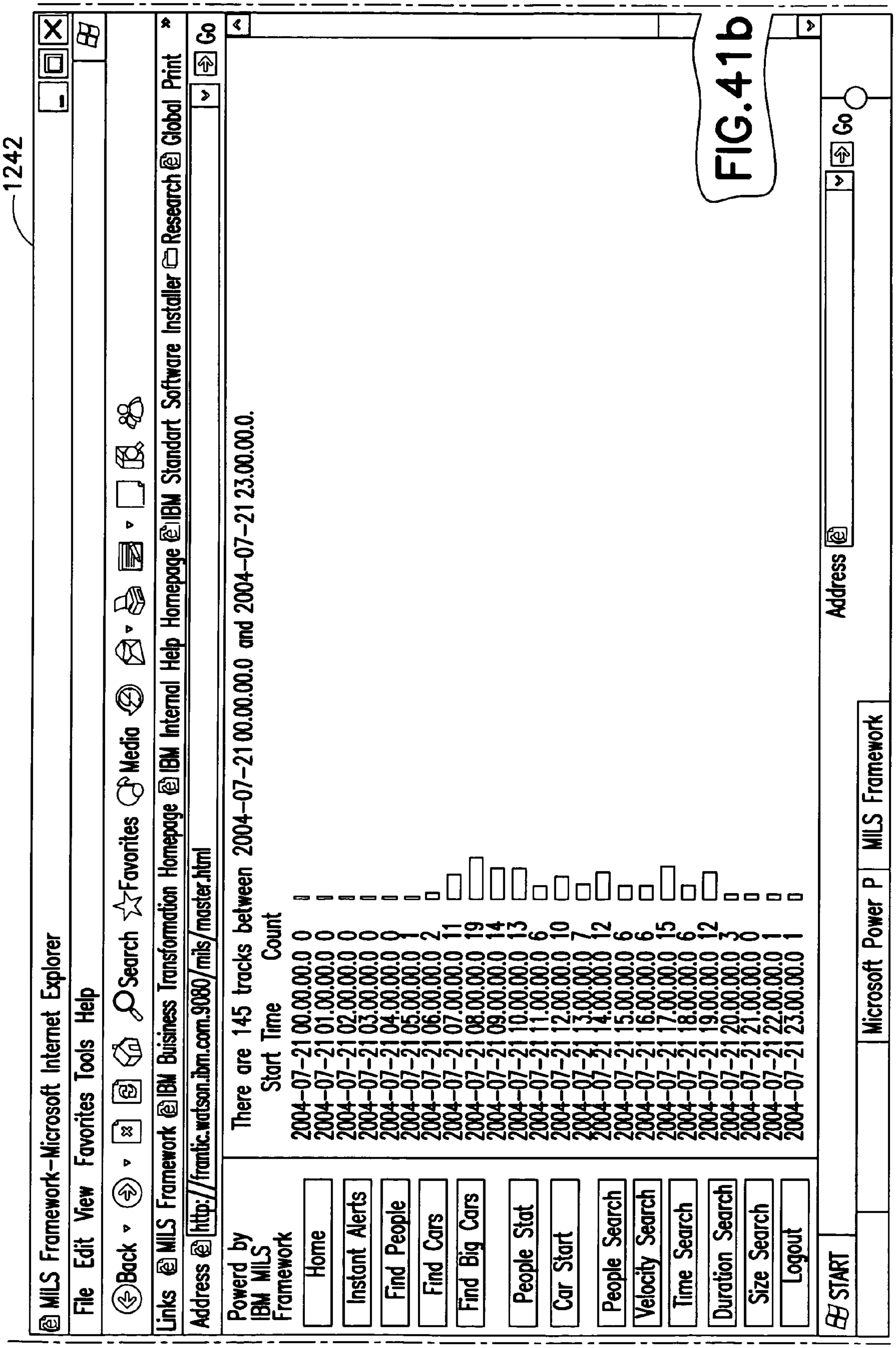
FIG. 41 depicts a chart and browser page of keyframes generated by the summary management service of the present invention summarizing hourly automobile activity.
Figure 41C:
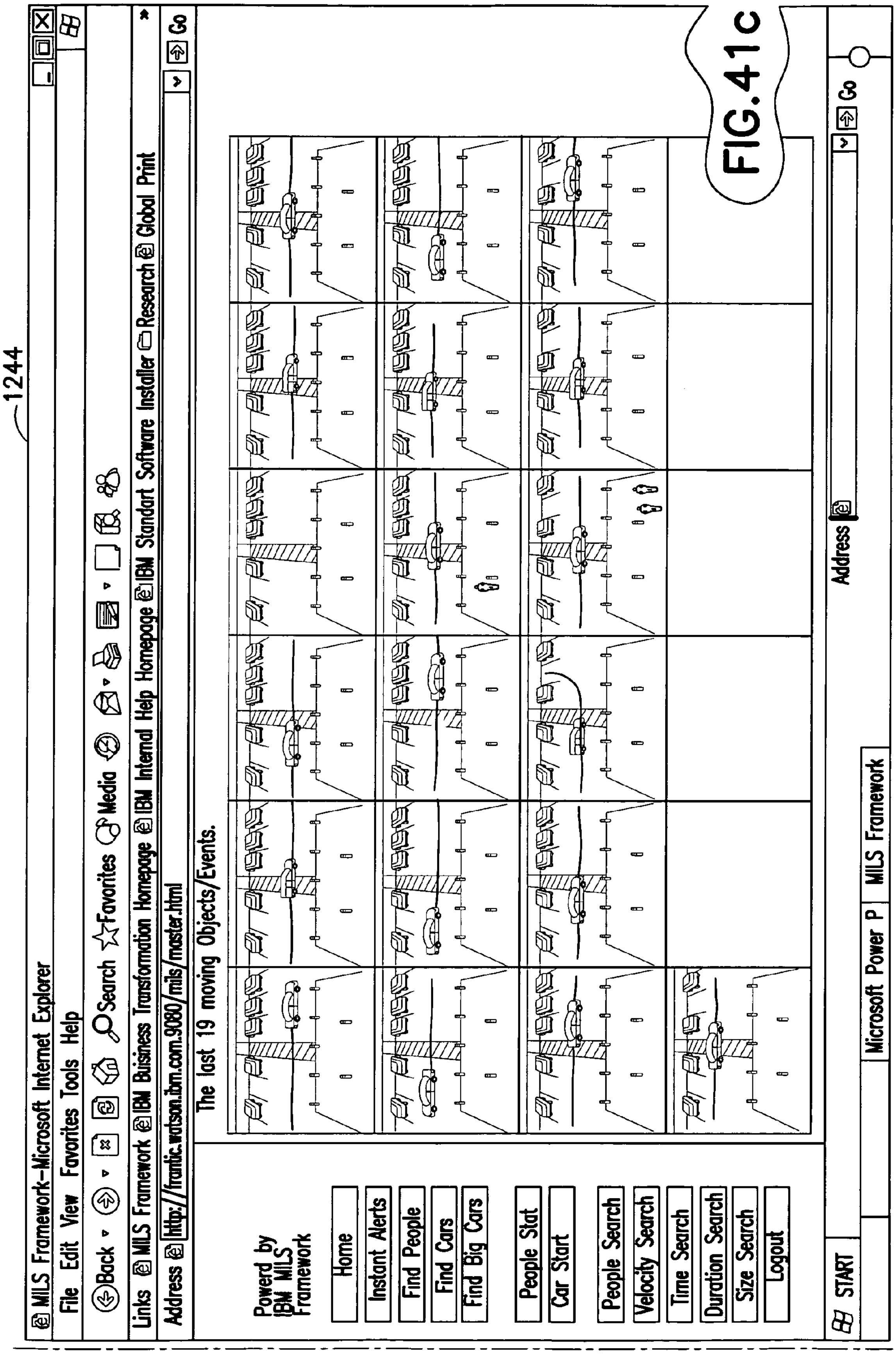

FIG. 41 depicts a summary query 1240 and information returned by the video surveillance system in response to the summary query. In this example, the video surveillance analyst requested information summarizing car activity for a given day on an hour-by-hour basis. In contrast to FIG. 40, where all keyframes were recalled and displayed memorializing the event of an appearance of a human in the field of view of the video surveillance camera for a given hour of a given day, the browser page 1244 on the right simply shows keyframes of the last nineteen automobiles to be detected by the video surveillance system. The browser page 1242 on the left displays a chart containing the desired statistics.

Figure 42B:
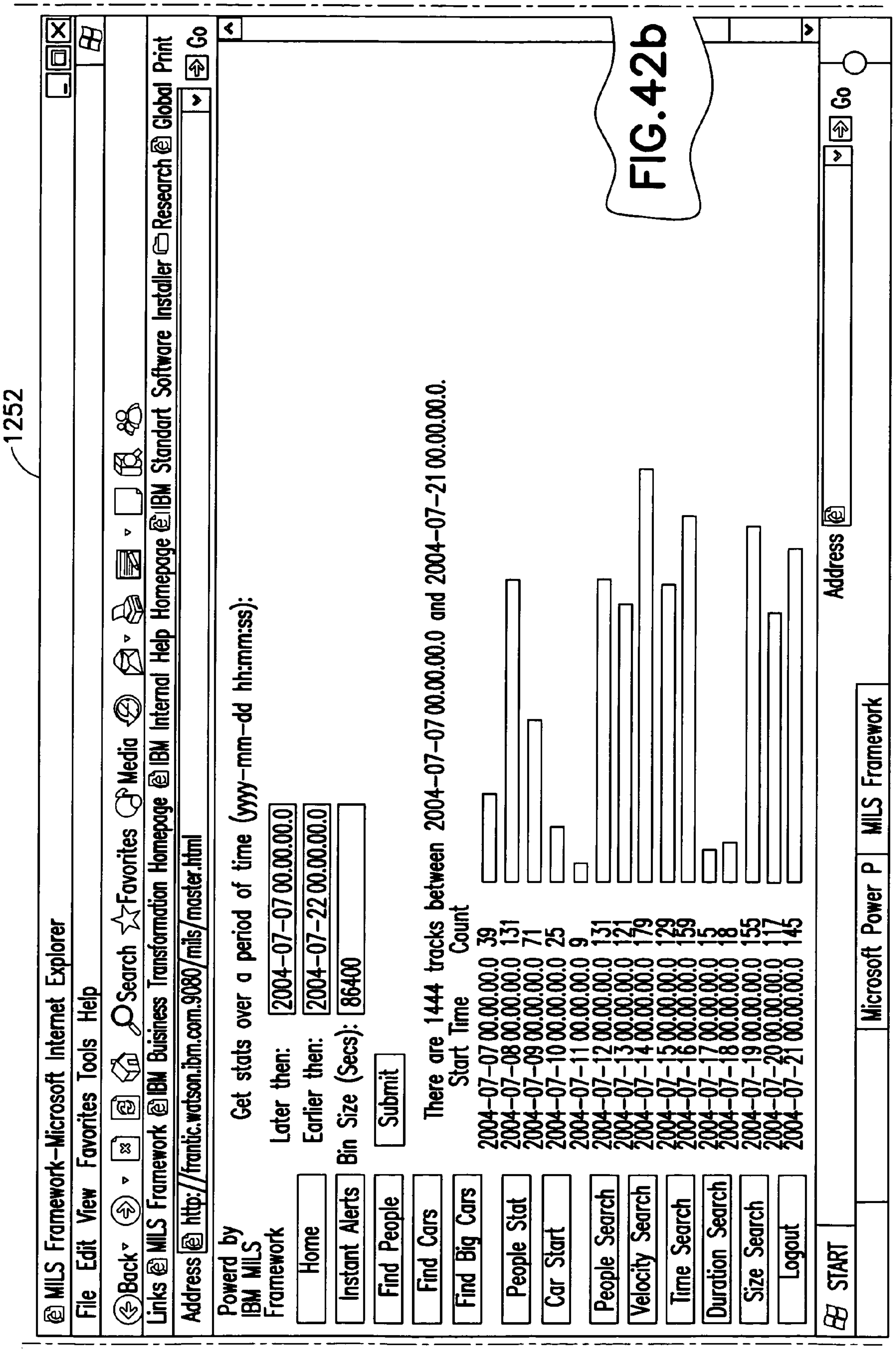
FIG. 42 depicts charts generated by the summary management service of the present invention summarizing daily object activity.
Figure 42C:
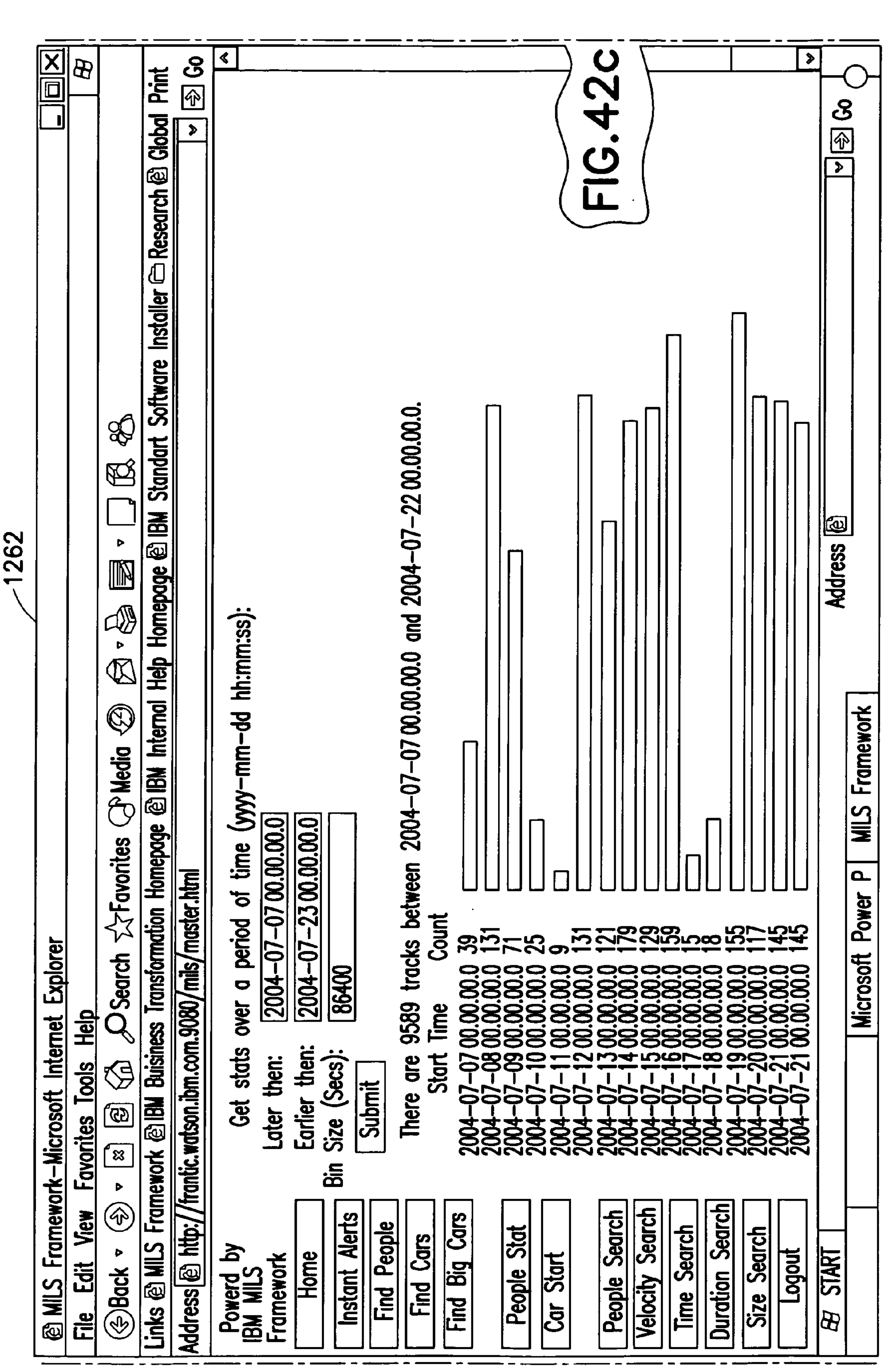

FIG. 42 depicts two summary queries 1250, 1260 that request summary information on a day-by-day basis. The statistical information returned is depicted in the browser pages 1252 and 1262.

Figure 43:
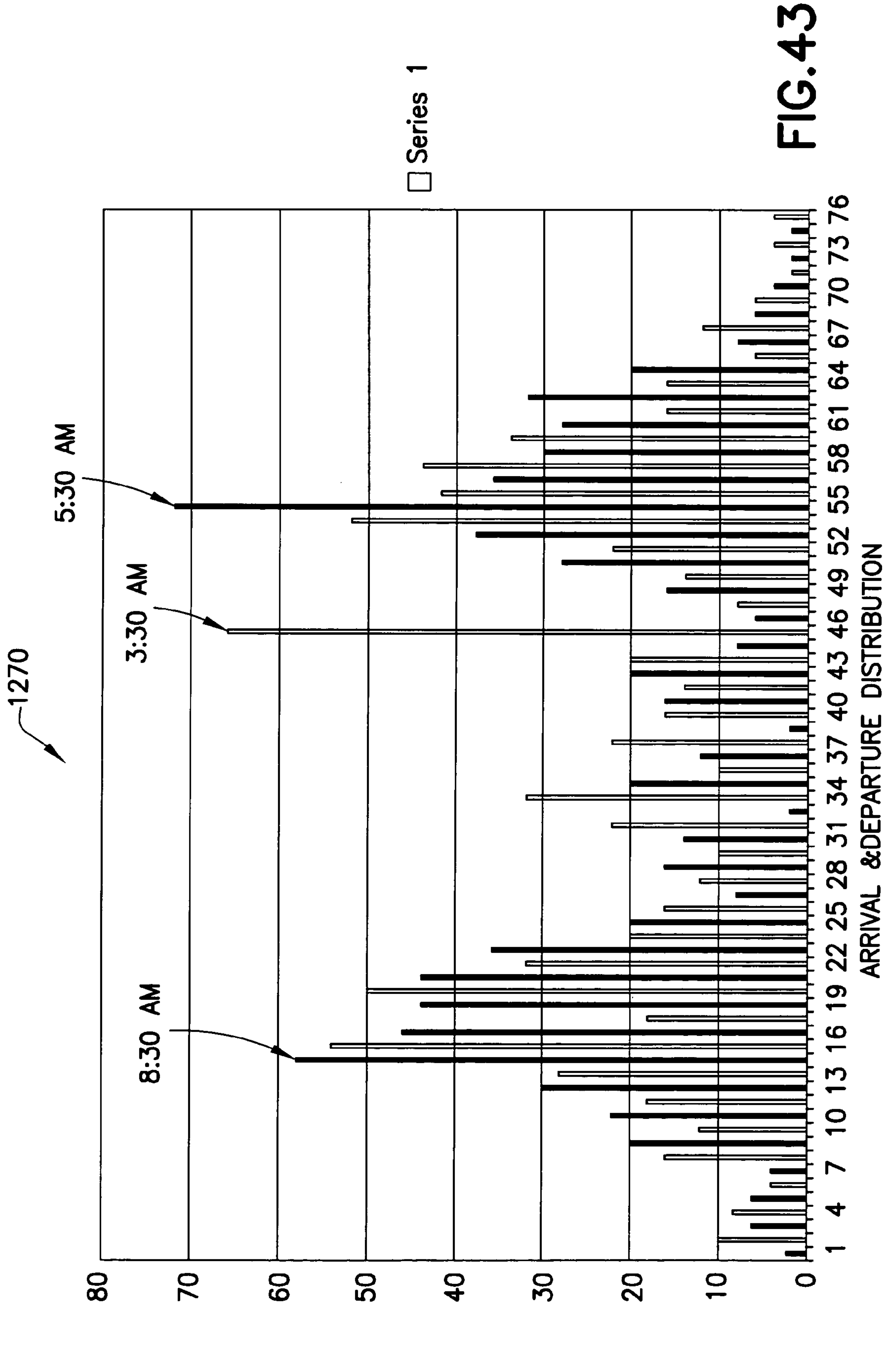
FIG. 43 depicts a chart generated by the summary management service of the present invention summarizing arrival and departure times.

FIG. 43 depicts a table 970 summarizing arrival and departure statistics returned in response to a query. The information was first retrieved from the database server, and then the transformation service applied the pre-selected table format to the data.

Figure 45:
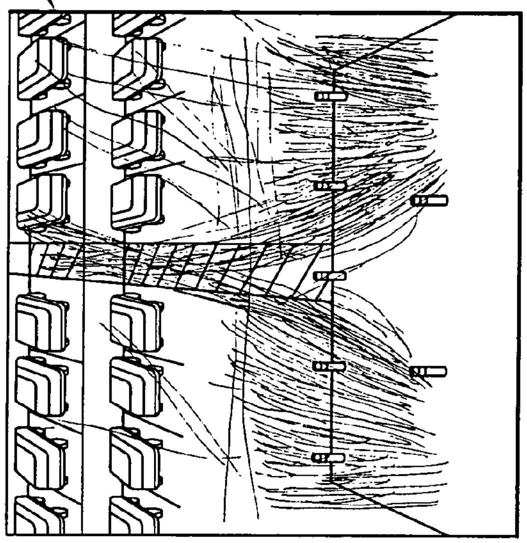
FIG. 44-46 are background images depicting object movement tracks generated by the summary management service of the present invention.
Figure 44:
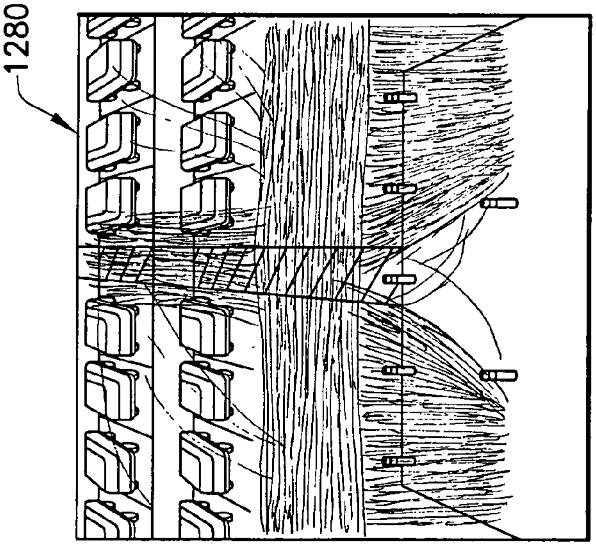
Figure 46:
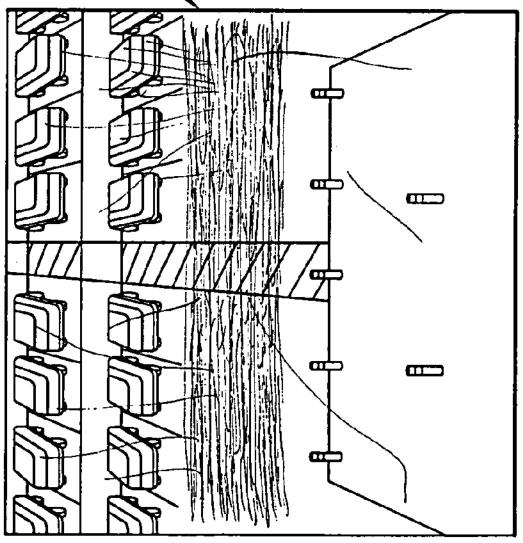

Another category of information that may be generated by the activity summary service is illustrated by FIGS. 44-46. FIGS. 44-46 show background images 1280, 1290, and 1330 with object tracks indicating movement superimposed. This feature of the present invention is particularly useful for capturing traffic flow patterns and depends on the ability of a video analysis engine operating in accordance with the present invention to recover object trajectory information from a video stream.

Figure 47:
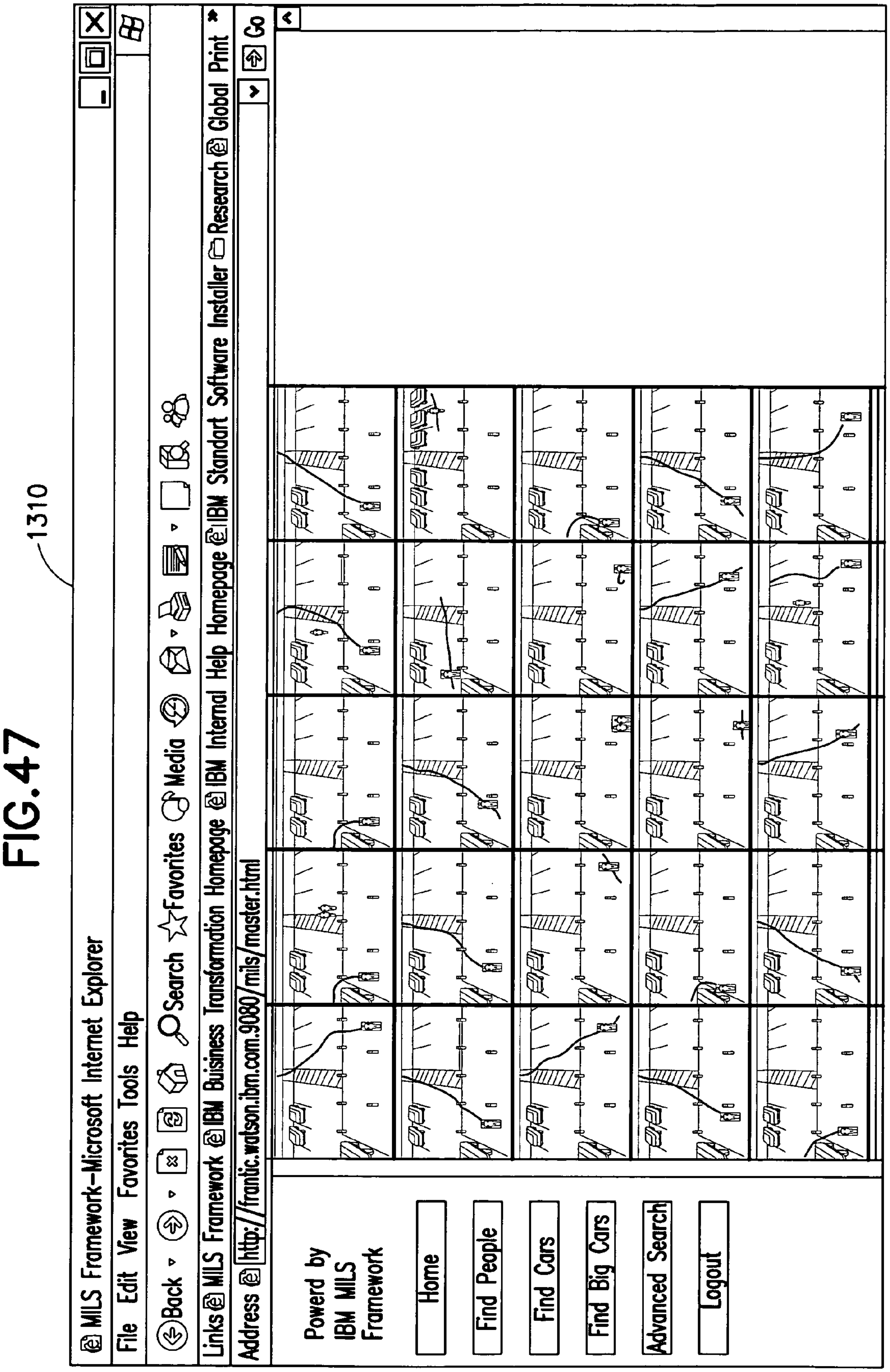
FIG. 47 is a browser page comprised of keyframes associated with human activity generated by the summary management service of the present invention.
Figure 48:
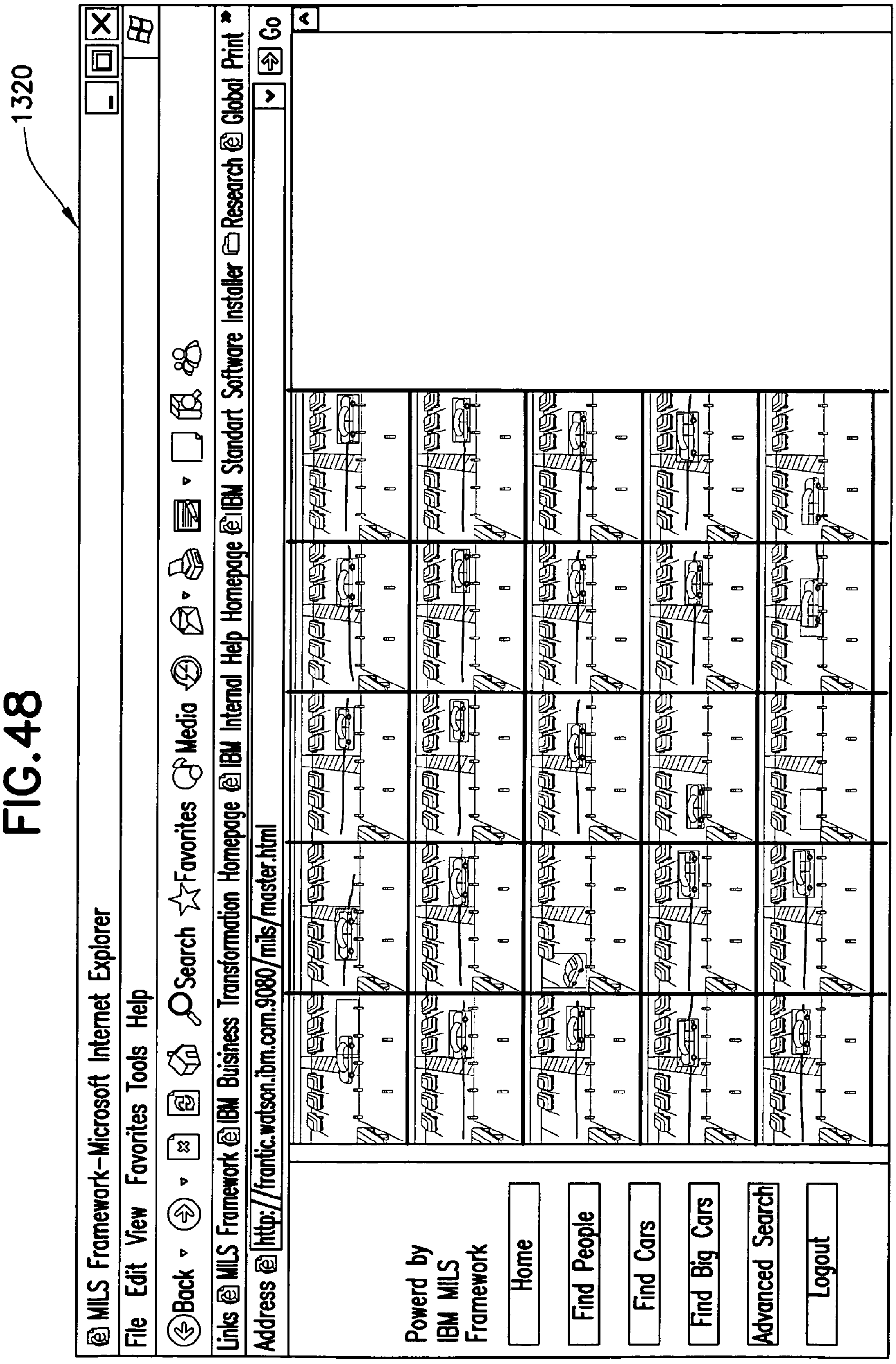
FIG. 48 is a browser page comprised of keyframes associated with automobile activity generated by the summary management service of the present invention.

FIG. 47 depicts an HTML document 1310 returned in response to a query for people entering and leaving the building under surveillance. In the HTML document, keyframes corresponding to particular video segments are inserted into the document. If the video surveillance analyst desired to watch a video segment corresponding to a keyframe, the video surveillance analyst could select a particular keyframe displayed. The video surveillance system would then retrieve the video segment for playback. FIG. 48 depicts a similar HTML document 1320 returned in response to a query for mid-sized cars passing through the field of view observed by the video surveillance camera.

In other embodiments alternate and more sophisticated presentation strategies can be employed. For example, in each keyframe comprising an HTML document an object could be outlined with a color-coded boundary box and contains a color-coded trajectory overlying the original keyframe image. The keyframe is the representative frame of the track video clip best depicting an object viewed by a surveillance camera. Optionally, there can be more than one keyframe for each track or event. The additional keyframes can be obtained by directing active surveillance cameras to capture the close-up appearance of a tracked object. By clicking a keyframe, an associated video track clip is played back immediately.

Thus it is seen that the foregoing description has provided by way of exemplary and non-limiting examples a full and informative description of the best method and apparatus presently contemplated by the inventors for implementing a distributed video surveillance system. One skilled in the art will appreciate that the various embodiments described herein can be practiced individually; in combination with one or more other embodiments described herein; or in combination with interactive tabular query interfaces differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A video surveillance system comprising:

at least one video surveillance system module comprising:

a video surveillance camera, wherein the video surveillance camera is remotely programmable;

a video encoder to encode video gathered by the video surveillance camera; and a video analysis engine coupled to the video surveillance camera to analyze video gathered by the video surveillance camera and to create data derived from the video, where the video analysis engine comprises a track creation system to generate at least one track in dependence on at least one user-specified video analysis criterion, wherein the at least one track comprises at least one pointer to a portion of the video gathered by the video surveillance system satisfying the specified video analysis criterion;

at least one video surveillance system network coupled to the at least one video surveillance system module;

at least one database and application system coupled to the at least one video surveillance system network to store video gathered by the video surveillance camera and data created by the video analysis engine, and to receive and process queries for the video and data;

a video surveillance system control interface coupled to the at least one video surveillance system network to control the operations of the video surveillance system; and a video surveillance application and control interface coupled to the at least one video surveillance system network for controlling video surveillance activities, the video surveillance application and control interface comprising:

a program for controlling video surveillance activities;

a display for displaying video gathered by the video surveillance camera and data created by the video analysis engine; and at least one input device for creating queries of the database and application system.

2. The video surveillance system of claim 1 wherein:

the video analysis engine further comprises:

a track identification system for assigning a unique identifier to the at least one track.

3. The video surveillance system of claim 2 wherein the track further comprises track summary information.

4. The video surveillance system of claim 3 where the track identification system applies the unique identifier assigned to the at least one track to the track summary information associated with the at least one track.

5. The video surveillance system of claim 4 where the track summary information further comprises a pointer to a video segment.

6. The video surveillance system of claim 4 where the track summary information further comprises a pointer to a keyframe.

7. The video surveillance system of claim 3 wherein the track summary information further comprises timestamp information memorializing a creation time of the track.

8. The video surveillance system of claim 3 wherein the track summary information further comprises object class information specifying an object class.

9. The video surveillance system of claim 8 where the object class corresponds to a vehicle class.

10. The video surveillance system of claim 8 where the object class corresponds to a human class.

11. The video surveillance system of claim 3 where the track summary information further comprises object area information.

12. The video surveillance system of claim 3 where the track summary information further comprises object velocity information.

13. The video surveillance system of claim 3 where the track summary information further comprises activity class information.

14. The video surveillance system of claim 13 where the activity class information corresponds to loitering activity.

15. The video surveillance system of claim 3 where the track summary information is formatted as an extensible markup language (XML) document.

16. The video surveillance system of claim 2 wherein the track further comprises track data information.

17. The video surveillance system of claim 16 where the track identification system applies the unique identifier assigned to the at least one track to the track data information associated with the at least one track.

18. The video surveillance system of claim 16 where the track data information further comprises trajectory information.

19. The video surveillance system of claim 16 where the track data information is formatted as an extensible markup language (XML) document.

20. The video surveillance system of claim 2 wherein the track further comprises background image information.

21. The video surveillance system of claim 20 where the track identification system applies the unique identifier assigned to the at least one track to the background image information associated with the at least one track.

22. The video surveillance system of claim 20 where the background image information is formatted as an extensible markup language (XML) document.

23. The video surveillance system of claim 2 wherein:

the video surveillance application and control interface further comprises:

a track creation criterion specification system for permitting a user to specify the track creation criterion which controls when a track is created.

24. The video surveillance system of claim 2 wherein the video analysis engine performs the following operation:

creating tracks in dependence on the at least one specified criterion, wherein each track is assigned a unique identifier which is used to identify all information related to that specific track.

25. The video surveillance system of claim 24 wherein the at least one database and application system performs the following operation:

saving tracks created when the specified criterion is satisfied using the unique identifiers assigned to each track.

26. The video surveillance system of claim 2 wherein the at least one database and application system further comprises:

a database server to save the at least one track using the unique identifier.

27. The video surveillance system of claim 26 where the video surveillance application and control interface further comprises:

a track query formulation application to formulate queries to locate tracks saved in the database server satisfying a user-specified criterion.

28. The video surveillance system of claim 27 where the database and application system further comprises:

an event retrieval system to accept user-specified track location queries and to locate tracks satisfying the criterion contained in the user-specified queries.

29. The video surveillance system of claim 28 where the database and application system further comprises:

a track identifier forwarding system to forward track identifiers satisfying the user-specified query to the user requesting the track identifiers.

30. The video surveillance system of claim 29 where the video surveillance application and control interface further comprises:

a track information request application to request track information associated with forwarded track identifiers.

31. The video surveillance system of claim 30 where the at least one database and application system further comprises:

a track information retrieval application to retrieve track information associated with track identifiers.

32. The video surveillance system of claim 31 where the at least one database and application system further comprises:

a transformation application for transforming the track information into a desired output format.

33. The video surveillance system of claim 32 where the desired output format is an extensible markup language (XML) document.

34. The video surveillance system of claim 32 where the desired output format is an HTML document.

35. The video surveillance system of claim 31 where the at least one database and application system further comprises:

a track information forwarding system for forwarding track information retrieved from the at least one database and application system to the video surveillance application and control interface.

36. The video surveillance system of claim 30 wherein the track information further comprises track summary information.

37. The video surveillance system of claim 30 wherein the track information further comprises timestamp information memorializing a creation time of the track.

38. The video surveillance system of claim 30 wherein the track information further comprises object class information specifying an object class.

39. The video surveillance system of claim 38 where the object class corresponds to a vehicle class.

40. The video surveillance system of claim 38 where the object class corresponds to a human class.

41. The video surveillance system of claim 30 where the track information further comprises object area information.

42. The video surveillance system of claim 30 where the track information further comprises object velocity information.

43. The video surveillance system of claim 30 where the track information further comprises activity class information.

44. The video surveillance system of claim 43 where the activity class information corresponds to loitering activity.

45. The video surveillance system of claim 30 where the track information further comprises a pointer to a video segment.

46. The video surveillance system of claim 30 where the track information further comprises a pointer to a keyframe.

47. The video surveillance system of claim 30 wherein the track information further comprises track data information.

48. The video surveillance system of claim 30 where the track information further comprises trajectory information.

49. The video surveillance system of claim 30 wherein the track information further comprises background image information.

50. The video surveillance system of claim 2 where the video surveillance system further comprises:

a local storage database associated with the at least one video surveillance system module and coupled to the at least one video surveillance system network for storing data created by the video analysis engine.

51. The video surveillance system of claim 50 further comprising:

an off-peak forwarding application to forward data stored in the local storage database to the at least one database and application system during off-peak periods.

52. The video surveillance system of claim 1 where the at least one database and application system further comprises:

an alert system, wherein the alert system further comprises:

an alert criterion specification system to specify an alert based on data created by the video analysis engine; and an alert action specification system to specify alert actions to be taken when the alert criterion is satisfied.

53. The video surveillance system of claim 52 where the alert criterion concerns vehicle speed.

54. The video surveillance system of claim 52 where the alert criterion concerns loitering activity.

55. The video surveillance system of claim 52 where the alert action comprises an e-mail issued to a video surveillance analyst.

56. The video surveillance system of claim 52 where the alert action comprises a browser page comprising alert information.

57. The video surveillance system of claim 56 where the alert information comprises a keyframe.

58. The video surveillance system of claim 56 where the alert information comprises track identifiers.

59. The video surveillance system of claim 56 where the alert information comprises a video segment capturing activity that satisfied the alert criterion.

60. The video surveillance system of claim 1 further comprising:

a summary system to create statistical data based on video analysis data generated by the video analysis engine.

61. The video surveillance system of claim 1 where:

the video surveillance camera has a multiple programmable view feature, the video surveillance camera further comprising:

a view programming system for programming views of the video surveillance camera; and the video surveillance system control interface further comprises:

a video surveillance camera view programming system to program views of the video surveillance camera by interacting with the view programming system of the video surveillance camera.

62. The video surveillance system of claim 61 where the video analysis engine further comprises:

a video surveillance camera view selection system to select a particular view of the video surveillance camera having the multiple programmable view feature and to analyze video associated with the view.

63. The video surveillance system of claim 62 wherein:

the video analysis engine further comprises:

a track identification system for assigning a unique identifier to the track created by the video analysis engine where the unique identifier references at least the selected view of the video surveillance camera.

64. The video surveillance system of claim 63 where the at least one database and application system performs the following operation:

saving the track to a database server of the at least one database and application system.

65. The video surveillance system of claim 64 where the at least one database and application system performs the following operation:

performing a query of the database server for tracks, wherein the query seeks tracks associated with the selected view of the video surveillance camera.

66. The video surveillance system of claim 1 wherein the at least one database and application system performs the following operation:

saving the at least one tracks generated when the at least one user-specified video analysis criterion is satisfied.

67. The video surveillance system of claim 66 wherein the video surveillance system application and control interface performs the following operations:

receiving a query for tracks corresponding to the at least one user-specified video analysis criterion; and transmitting the query for the tracks to the at least one database and application system.

68. The video surveillance system of claim 67 wherein the at least one database and application system performs the following operations:

receiving the query for the tracks corresponding to the specified criterion; and locating tracks corresponding to the at least one user-specified video analysis criterion.

69. The video surveillance system of claim 68 wherein the at least one database and application system performs the following operation:

transmitting the tracks satisfying the at least one user-specified video analysis criterion to the video surveillance system application and control interface.

70. The video surveillance system of claim 69 wherein the video surveillance system application and control interface performs the following operation:

displaying the tracks received from the at least one database on the display.

71. The video surveillance system of claim 68 wherein the at least one database and application system performs the following operations:

locating the video corresponding to the tracks; and transmitting the video satisfying the at least one user-specified video analysis criterion to the video surveillance system application and control interface.

72. The video surveillance system of claim 71 wherein the video surveillance application and control interface performs the following operations:

displaying the video satisfying the at least one user-specified video analysis criterion.

73. The video surveillance system of claim 2 wherein the video surveillance system module further comprises:

a keyframe generation system to create a keyframe of a specific field of view viewed by the video surveillance camera satisfying the specified video analysis criterion.

74. The video surveillance system of claim 73 where the keyframe generation system further comprises:

a keyframe zoom system for creating a keyframe comprising an enlarged view of an object in the field of view of the video surveillance camera.

75. The video surveillance system of claim 73 where the track further comprise a pointer to the keyframe.

76. The video surveillance system of claim 75 wherein the keyframe generation system performs the following operation:

generating a keyframe satisfying the at least one specified video analysis criterion; and the video analysis engine performs the following operation:

creating tracks in dependence on the at least one specified video analysis criterion.

77. The video surveillance system of claim 76 wherein the at least one database and application system performs the following operation:

saving the keyframe and track created when the specified criterion is satisfied.

78. The video surveillance system of claim 77 wherein the video surveillance application and control interface performs the following operations:

receiving a query for tracks corresponding to the specified criterion; and transmitting the query for the tracks to the at least one database and application system.

79. The video surveillance system of claim 78 wherein the at least one database and application system performs the following operations:

receiving the query for tracks corresponding to the specified criterion; and locating tracks corresponding to the specified criterion.

80. The video surveillance system of claim 79 wherein the at least one database and application system performs the following operations:

locating the keyframe corresponding to the specified criterion by using the tracks; and transmitting the keyframe satisfying the specified criterion to the video surveillance application and control interface.

81. The video surveillance system of claim 80 wherein the video surveillance application and control interface performs the following operations:

displaying the keyframe satisfying the specified criterion.

82. The video surveillance system of claim 81 wherein the video surveillance application and control interface further comprises:

a keyframe-initiated video request system for requesting video corresponding to the specified criterion when the keyframe is of interest to a user.

83. The video surveillance system of claim 82 wherein the video surveillance application and control interface performs the following operations:

receiving a request for video corresponding to the specified criterion from the keyframe-initiated video request system; and transmitting the request to the at least one database.

84. The video surveillance system of claim 83 wherein the at least one database and application system performs the following operations:

locating the video corresponding to the specified criterion; and transmitting the video to the video surveillance application and control interface.

85. The video surveillance system of claim 84 wherein the video surveillance application and control interface performs the following operation:

displaying the video corresponding to the specified criterion on the display.

86. The video surveillance system of claim 2 wherein the video analysis criterion corresponds to an object appearing in the video gathered by the video surveillance camera.

87. The video surveillance system of claim 86 wherein the video analysis engine performs the following operation:

creating class data by identifying and categorizing an object appearing in the video gathered by the video surveillance camera.

88. The video surveillance system of claim 86 wherein the video analysis engine performs the following operation:

creating a track for the object appearing in the video gathered by the video surveillance camera.

89. The video surveillance system of claim 88 wherein the track further comprises time stamp data identifying the time the object appeared in the video gathered by the video surveillance camera.

90. The video surveillance system of claim 88 wherein the track further comprises mask data for specifying locations of the object in frames of the video gathered by the video surveillance camera.

91. The video surveillance system of claim 2 wherein the video analysis criterion corresponds to an event appearing in video gathered by the video surveillance camera.

92. The video surveillance system of claim 2 wherein the video analysis criterion corresponds to an activity appearing in video gathered by the video surveillance camera.

93. The video surveillance system of claim 1 wherein:

the video analysis engine further comprises:

a data formatting system to accept data created by the video analysis engine and to format the data in machine readable data documents.

94. The video surveillance system of claim 93 wherein:

the at least one database and application system further comprises:

a data document transcription system to recover data stored in the machine readable data documents generated by the data formatting system and to convert the data to at least one format used by the database and application system.

95. The video surveillance system of claim 1 wherein the video surveillance system module further comprises:

a video identification system to assign unique identification information to video gathered by the video surveillance camera; and wherein the video analysis engine further comprises:

a data association system to associate data created by analyzing the video gathered by the video surveillance camera with the video using the unique identification information.

* * * * *